United States Patent [19]
Palm

[11] Patent Number: 5,748,199
[45] Date of Patent: May 5, 1998

[54] METHOD AND APPARATUS FOR CONVERTING A TWO DIMENSIONAL MOTION PICTURE INTO A THREE DIMENSIONAL MOTION PICTURE

[75] Inventor: Charles S. Palm, Westlake Village, Calif.

[73] Assignee: Synthonics Incorporated, Westlake Village, Calif.

[21] Appl. No.: 576,922

[22] Filed: Dec. 20, 1995

[51] Int. Cl.$^6$ .................................................. G06T 15/00
[52] U.S. Cl. ........................ 345/473; 345/419; 345/433; 352/50
[58] Field of Search ................................ 395/119, 118, 395/340, 339, 326; 345/168, 156, 418–19, 433–39, 473–5, 949–54, 122; 352/50, 57, 86–90

[56] References Cited

U.S. PATENT DOCUMENTS

| | | | |
|---|---|---|---|
| 4,734,756 | 3/1988 | Butterfield et al. | 348/43 |
| 5,159,361 | 10/1992 | Cambier et al. | 351/218 |
| 5,510,832 | 4/1996 | Garcia | 348/56 |
| 5,511,153 | 4/1996 | Azarbayejani et al. | 345/419 |
| 5,644,651 | 7/1997 | Cox et al. | 382/154 |

OTHER PUBLICATIONS

Quan, et al, "Towards Structure from Motion for Linear Features through Reference points", *Visual Motion IEEE Workshop*, pp. 249–254 May 1991.

Jones, et al, "A New Shape Representation for Fast 3D Reconstruction from Multiple 2D Perspective Images", *IEEE Colloq. (1995) No. 092: New Developments in 3D Image Capture & Application*, pp. 1–4, Aug. 1995.

Mohr, et al, "Relative 3D Reconstruction Using Multiple Uncalibrated Images", *Computer Vision and Pattern Recognition*, pp. 543–548 (1993).

David Pogue, "POSER 1.0", Fractal Design Corp 3–D illustration, v12, n10, Oct. 1995, p. 63.

Foley et al., "Computer Graphics: Principles and Practice", Addison–Wesley Publishing Co., 1990, 2nd ed., pp. 491–504.

Mike Jones et al., "A New Shape Representaiton for Fast 3D Reconstruction From Multiple 2D Perspective Images", IEEE Colloq. New Developments in 3D Image Capture and Application, Digest No. 1995/092, pp. 4/1–3.

Jun Ohya et al., "Real–Time Reproduction of 3D Human Images in Virtual Space Teleconferencing", Virtual Reality, 1993 International Symposium, IEEE, pp. 408–414.

R. Hsu et al., "Human Arm Modeling for Analysis/Synthesis Image Coding", Robot and Human Communication, 1993 International Workshop, pp. 352–355.

John A. Ellis et al., "Multimedia Tips Techniques", Multimedia Producer, Oct. 1994, S–6.

"Autodesk 3D Studio Tutorials", AutoDesk, Inc., Feb. 8, 1991, pp. 1–52 and 311–334 (see pp. 4–9, 39–44 and 323–330).

(List continued on next page.)

*Primary Examiner*—Joseph H. Feld
*Assistant Examiner*—Rudolph Buchel
*Attorney, Agent, or Firm*—Lowe, Price, LeBlanc & Becker

[57] ABSTRACT

Techniques for converting a two-dimensional motion picture into a three dimensional stereo motion picture are disclosed. Wire frames of objects in the motion picture are constructed using the frames of the two-dimensional motion picture, substituted for the two dimensional view of the object, photorealistically rendered and stereo views generated of the rendered wireframes to create stereo views of the scenes of the original motion picture. Key frame sequences can be generated in stereo automatically from stereo set up of the key frame.

18 Claims, 80 Drawing Sheets

OTHER PUBLICATIONS

Sean Wagstaff, "Strata Studiopro Animator Layers on 3–D Capabilities; All–In–One Application Models, Animates With Splines", MacWeek, v7, n48, Dec. 13, 1993, (Strata Inc.), Coastal Associates Publishing L.P., pp. 62–64.

Jon Watson, "Molding Models With Pixelputty Solo", Computer Graphics World, v. 18, n5, May 1995, (PixelPutty Solo 1.2 for Macintosh), pp. 69–71.

George Maestri, "Improvements to the Studio: Autodesk 3D Studio Release 4—Great Program Just Got Better. With Inverse Kinematics, Camera Control, Perspective Matching and Custom Scripting 3D Studio . . . ", v3, n3, Mar. 1, 1995, (Autodesk's 3D Studio), pp. 62–66.

"Datapro Software Directory", Creation Date: 10 Aug. 1995, 3D Studio Release 4, (Autodesk, Inc.).

Scott Billups, "Silicon Stars", Videography, v20, n4, Apr. 1995, (Fractal Design's Poser), Product Analysis Review, pp. 110–114.

3D DATABASE

| LEFT HAND IMAGE | | | RIGHT HAND IMAGE | |
|---|---|---|---|---|
| GRID POINT | | CALCULATED DEPTH | CORRELATION RESULTS | |
| $X_L$ | $Y_L$ | $Z_L$ | $W_R$ | $Y_R$ |
| 0.1 | 0.1 | 6.3 | a | b |
| 0.2 | 0.1 | 6.0 | c | d |
| 0.3 | 0.1 | 5.4 | e | f |
| ..... | ..... | ..... | ..... | ..... |

Figure 7

DATA BASE

| POINT (VERTEX) | COORDINATES IN OBJECT SPACE | FIRST VERTEX OF TRIANGLE | BITMAP POINTER FOR TRIANGLE IMAGE, X VALUE, Y VALUE |
|---|---|---|---|
| 1 | $X_1 Y_1 Z_1$ | 125 | 1, 095, 142 |
| 2 | $X_2 Y_2 Z_2$ | | |
| 3 | $X_3 Y_3 Z_3$ | | |
| 4 | | | |
| 5 | | | |
| 6 | | | |
| 7 | | | |
| . | | | |
| . | | | |
| . | | | |
| . | | | |
| N | | | |

Figure 31

POINT DATABASE

| POINT NUMBER | LEFT IMAGE | RIGHT IMAGE | REAL WORLD | PREDECESSOR | SUCCESSOR |
|---|---|---|---|---|---|
| . . . | . . . | | | | |
| 32 | (45, 125) | (48, 129) | (12.5, 14.1, 22.0) | 31 | 33 |

Figure 70

METHOD AND APPARATUS FOR CONVERTING A TWO DIMENSIONAL MOTION PICTURE INTO A THREE DIMENSIONAL MOTION PICTURE

TECHNICAL FIELD

The invention relates to the field of image processing and more particularly to methods and apparatus for converting a two dimensional motion picture into a three dimensional motion picture.

CROSS REFERENCE TO RELATED APPLICATIONS

This application relates to applications Ser. No. 08/318, 047, filed Oct. 4, 1994 by Bruce W. Binns et al. and entitled "METHOD AND APPARATUS FOR INTERACTIVE IMAGE CORRELATION FOR 3-DIMENSIONAL IMAGE PRODUCTION"; Ser. No. 08/481,993, filed Jun. 7, 1995 by Charles S. Palm et al. now U.S. Pat. No. 5,651,518, and entitled "METHODS AND APPARATUS FOR THE CREATION AND TRANSMISSION OF 3-DIMENSIONAL IMAGES"; Ser. No. 08/327,471, filed Oct. 21, 1994 by Bruce W. Binns et al. and entitled "METHODS AND APPARATUS FOR RAPIDLY RENDERING PHOTO-REALISTIC SURFACES ON 3-DIMENSIONAL WIRE FRAMES AUTOMATICALLY"; Ser. No. 08/483,551, filed Jun. 7, 1995 by Charles S. Palm et al. and entitled "METHODS AND APPARATUS FOR ZOOMING DURING CAPTURE AND REPRODUCTION OF 3-DIMENSIONAL IMAGES", Ser. No. 08/414,651, filed Mar. 31, 1995 by Charles S. Palm and entitled "METHODS AND APPARATUS FOR USING IMAGE DATA TO DETERMINE CAMERA LOCATION AND ORIENTATION"; and Ser. No. 08/437,771, filed May 9, 1995 by Charles S. Palm and entitled "METHOD AND APPARATUS FOR THREE-DIMENSIONAL STEREO MORPHING".

BACKGROUND ART

Since the invention of the stereoscope in 1847, inventors have attempted to replicate three dimensional (3D) images found in nature. Two dimensional images lack realism due to the absence of depth queues. Many techniques have been devised for producing 3D images with varying degrees of success.

Stereoscopic photographic cameras are known which utilize a single camera body and two objective lenses separated by a fixed distance, usually corresponding to the interocular distance. Other such cameras use a single objective and external arrangements which form two image areas on film positioned on the camera's image plane. Still other arrangements use two separate cameras separated by a fixed distance to form images corresponding to a left and right eye view of the scene being photographed. Still other arrangements use a single camera moved from one location to another to obtain stereo images.

Another technique for capturing stereophotography is to use a single camera and move the camera from one location to another to obtain stereo images.

Once stereoscopic photographic images of the prior art are developed, they are often viewed through separate eye pieces, one for each eye. Each eye piece projects a view of a respective one of the developed images which the user's eyes would have seen had the eyes viewed the scene directly. Depth is clearly discernable when viewing a stereoscopic image.

There are several problems with prior art techniques for generating three dimensional images. First, the requirement that there be a fixed camera to camera or objective to objective separation limits flexibility in the construction of cameras. The requirement for two objective lenses or two cameras dictates special apparatus in order to capture stereoscopic images.

Another problem with the prior art is that complicated lens arrangements are necessary to view stereoscopic images. Further, in the stereoscopic photographic systems of the prior art, depth was not readily quantifiable.

Calculations of depth is a difficult task when using images captured from different positions vis-a-vis the scene being photographed because the planar relationships which result from projection of a three dimensional scene onto a two dimensional plane do not undergo a linear transformation or mapping compared with the same points projected onto a different image plane. A scene viewed from one point is seen differently from the same scene viewed from another point. As one changes viewing positions, some object portions become hidden as the view point changes. Planes which are viewed normally in one view are reduced in extent when viewed obliquely. The prior art does not allow for rapid and interactive correlation of two images of the same scene captured from different perspectives.

Automated image processing techniques are known for correlating portions of images with known patterns. For example, vertical views (pictures) of a tractor at different rotations may be scaled to reflect a view of the tractor from 1,000 feet above the tractor. These vertical views can then be respectively compared with a picture of farmland with the same tractor on it taken at 1,000 feet by sliding each vertical view, one at a time, over all possible portions of such a picture until alignment occurs. When such an alignment occurs, one may conclude that a tractor is located at the point on the image of the farmland at which the best match occurs and that the tractor has the particular orientation corresponding to the rotation of the vertical view which produces the best correlation.

Color separation of stereo images has been utilized for over fifty years in the production of photographs, 3-D movies and the printed page. In prior art devices such as shown in U.S. Pat. No. 3,712,119, stereo images are separated by mutually extinguishing filters such as a blue-green lens filter over one eye and a red filter over the other eye. With this combination, a full true color image is not obtained, and this color combination may cause eye fatigue, and color suppression.

In the prior art an object of a single pure color matching the filter color e.g. red or blue-green, would be transmitted only to one eye and so would not appear in stereo. However, pure colors are rare, and most objects are off-white, or pastel shades and so contain all three primary colors. Thus, most objects will have some component of each color and this enables the separation of right and left stereo images.

Prints, drawings or representation that yield a 3-D image when viewed through appropriately colored lenses are called anaglyphs.

An anaglyph is a picture generally consisting of two distinctly colored, and preferably, complementary colored, prints or drawings. The complementary colors conventionally chosen for commercial printings of comic books and the like are orange and blue-green. Each of the complementary colored prints contains all elements of the picture. For example, if the picture consists of a car on a highway, then the anaglyph will be imprinted with an orange car and highway, and with a blue-green car and highway. For reasons explained below, some or all of the orange colored elements of the picture are horizontally shifted in varying amounts in the printing process relative to their corresponding blue-green elements.

An anaglyph is viewed through glasses or viewers having lenses tinted about the same colors used to prepare the anaglyph (hereinafter, "3-D glasses"). While orange and blue-green lenses are optimally used with an orange and blue-green anaglyph, red and blue lenses work satisfactorily in practice and apparently are conventionally used.

The orange elements in the picture are only seen through the blue lens, the red lens "washing out" the orange elements. For the same reason, the green-blue elements are only seen through the red lens. Hence, each eye sees only one of the two colored pictures. But because the different colored elements are horizontally shifted in varying amounts, the viewer's eyes must turn inward to properly view some elements, and turn outward to properly view others. Those elements for which the eyes turn inward, which is what the viewer does to observe a close object, are naturally perceived as close to the viewer. Elements for which the viewer's eyes turn outward are correspondingly perceived as distant. Specifically, if the blue lens covers the viewer's right eye, as is generally conventional, then any blue-green element shifted to the left of its corresponding orange element appears to the viewer as close. The element appears closer the greater the leftward shift. Conversely, as a green-blue element is shifted only slightly leftward, not at all, or even to the right of its corresponding red element, that element will appear increasingly more distant from the viewer.

In addition to horizontally shifting the element pairs relative to each other, some users of anaglyphy for comic books also vertically shift the element pairs a slight amount relative to each other. Those users believe that the slight vertical shift improves the 3-D effect.

Normally 3-D images appear monochromatic when viewed through 3-D glasses.

Three dimensional techniques are closely related to the psychology and physiology of an observer's cognitive processes. Subtle changes in selection of portions of the spectrum presented to each eye can result in significant changes in the observer's perception. Even when viewing the same 3-dimensional image through the same viewers, different observers may perceive a 3-dimensional image in different ways.

Many viewers have difficulty when viewing 3-dimensional images and cannot view the images for any significant length of time without unpleasant side effects, such as headaches.

The transmission of programming, in particular, video programming where wide bandwidth is required, has been known to include a variety of compression techniques. Modern decoders of compressed video information will adapt their operating modes in dependence upon the properties of the incoming signal. It is also often the case that video programming is distributed in multiplexed format which requires that either the decoder or an associated demultiplexer be aware of where in the multiplexed stream particular programs are located.

One of the widely accepted standards for the distribution of video programming is that promulgated by the Organisation Internationale de Normalisation (International Organization for Standardization) under Standard ISO/IEC JTC1/SC29/WG11 entitled "Coding of Moving Pictures and Associated Audio". The particular working group responsible for that standardization effort is also known as the Motion Picture Experts Group.

MPEG compression and decompression standards have been evolving. The current advanced version is generally known as MPEG-2. The MPEG-2 standard is hereby incorporated by reference in its entirety. In the language of the MPEG-2 standard, a "program" is comprised of typically a source of video and a source of audio which share a common time base. One or more elementary digital streams (e.g. video or audio), as well as other data, are combined into single or multiple streams which are suitable for storage or transmission. System coding follows the syntactical and semantic rules imposed by the MPEG-2 specification and provides information to enable synchronized decoding without either overflow or underflow of decoder buffers over a wide range of retrieval or receipt conditions.

Under the MPEG-2 standard, an incoming individual video signal and related audio signal are encoded and packetized into a respective Video Packetized Elementary Stream (PES) and Audio Packetized Elementary Stream. The video and audio PES from one or more programs are combined into a transport stream for transmission or storage.

The transport stream is designed for use in environments where errors are likely, such as storage or transmission in lossy or noisy media. Transport stream packets are 188 bytes in length. Transport stream packets are generally divided into two sections. The first section constitutes header information and the second constitutes payload. Header information includes, inter alia, a synchronization byte, transport scrambling control and a thirteen bit program identification (PID) indication. PID value 0 is reserved as an indication that the packet includes program association table data. PID value 1 is reserved for conditional access such as encryption. PID value 0x1FFF is reserved for administrative (no-op) packets utilized for synchronizing the link. Other program identification numbers are utilized to identify transport packets with the program source from which they originate.

FIG. 11 depicts a transport stream utilizing the MPEG-2 standard. As indicated above, each transport packet in the transport stream carries a program identification number (PID). PID 0 carries program association table information. As illustrated in FIG. 11, a program association table maps a particular program source with the location of the PID associated with a program map related to that source. Thus, the program association table defines the location of program maps for each source of programming in the transport stream. The program map for CBS is found in PID 132; the program map for NBC is found in PID 87 and so forth.

The program map for CBS illustrated in FIG. 11 as that associated with PID 132 identifies the PID numbers for the packetized elementary streams (PES) for the video and audio channels associated with the program. One should note at this time that more than two PID's may be associated with a program. For example, there could be a data channel associated with the program which would include data for closed captioning for the hearing impaired. There could be a number of audio elementary streams for, for example, respective different languages. Thus the programming map provides some flexibility beyond that required for merely associating a single video and audio elementary streams.

Once the program map is known, the program decoder can be set to extract the desired elementary streams (e.g PID 56 in FIG. 11 and PID 74 shown in FIG. 11) for decoding and presentation. Transport packets of PID =56 represents the video elementary stream associated with CBS' MPEG video system. Within CBS' video elementary stream are video sequence headers which define things like frame rate, resolution, and the coordinates on the screen where display of the image should begin. Such coordinates are useful, for example, in defining pictures within a picture when multiple pictures are superimposed. After the video header sequence, the normal video syntax occurs which, in the case of MPEG, includes the normal frames associated with video compression such as I frames and B frames used in MPEG.

The elementary stream with PID=74 is the audio stream associated with the video shown in transport packets with PID=56 as defined in program map at PID=132.

A typical MPEG-2 transport demultiplexer and decoder is shown in FIG. 12. The data link specific interface 210 converts the incoming data link format (e.g. optical fiber encoded data) to a form (e.g. electrical) for demultiplexing and decoding. Transport stream demultiplexer 220 monitors the PID's of the incoming transport stream packets to identify those selected for decoding and routes those to respective video (230) and audio (240) decoders. Since the video and audio associated with the same program are derived from a common clock, clock control 250 drives both decoders. Note that the transport stream demultiplexer includes functionality, such as that described in connection with the description of the transport stream of FIG. 11, necessary to identify the particular PID's needed to extract information from the transport stream to present the desired program to the user.

Referring again to FIG. 11, when a subscriber tunes, for example, to CBS for the first time, before decoding can take place, a program association table and the program map for the selected channel must be received in the stated order from the transport stream. Thereafter, a packet from the video elementary stream must arrive with header information about the frame rate, resolution and coordinates for display of the image and the like before the decoder can be set up to actually decode the payload data associated with the video elementary stream.

Returning to the three dimensional imaging, one problem common to most observers arises when viewing a pure red or pure blue region of a 3-dimensional image through red/blue 3-dimensional glasses. In such circumstances, one eye will perceive black and the other eye will perceive nothing. This has a psychological and/or physiological impact on the viewer which most viewers find disturbing.

Further, when observing 3-dimensional images in which the left and right images are captured using complementary filters, the images reproduced in the colors of the filters, and viewed through viewers of the same colors (e.g. red/blue glasses) which separate the images, 3-dimensional images appear only in black and white. That is, color information is lost in the preparation of the 3-dimensional image. This is characteristic of most 3-dimensional images.

When processing color images using computers, it is common to separate an image into (e.g.) red, green and blue image components. Commonly each color component is referred to as an image plane. In the display of color images on a color cathode ray tube it is common to apply information from each color image plane to a respective electron gun of the cathode ray tube.

Normally, in the past, when preparing 3-dimensional motion pictures, the anaglyph frames were prepared in the post production suite.

When color images are captured, it sometimes occurs that one of the colors utilized for representing the image may be overexposed or underexposed as reflected, inter alia, in an inadequate dynamic range for that color. That is, anytime the color appears at all, it appears at maximum value or anytime it appears it appears at some minimum value instead of being spread over the entire dynamic range of representation. This adversely affects the quality of 3-D image produced.

In certain instances, for example in some video games, perspective views are generated from 3-dimensional wireframes. It would be desirable to be able to selectively implement either 2-dimensional perspective views of 3-dimensional stereo views or 3-dimensional stereo views.

The prior art generally required complex specialized equipment for the transmission of 3-dimensional images. This inhibited the use of 3-D technology because much capital investment has been devoted to equipment for handling regular 2-dimensional images. It would be desirable to utilize 2-dimensional transmission equipment to produce 3-dimensional images. It would also be desirable to have simple transmission equipment and reception equipment which would be suitable for distributing 3-dimensional images.

Representing 3-dimensional objects for computer manipulation using a wire frame representation is well known in the art. In these techniques, a number of points on the surface of the object to be represented are identified and a calculation or measurement made of the position of each of those points to identify their location in some 3-dimensional coordinate system. Typically, each identified point is joined with its nearest neighbors by lines or "wires". This process can be analogize to pressing chicken wire against a 3-dimensional surface and allowing it to deform so that the intersections of the wires represent points on the surface of the 3-dimensional object. An object may be represented with whatever degree of fidelity desired by the changing the spacing of the points; in other words, by adapting the resolution with which points on the surface are stored. Continuing the analogy, the areas enclosed by wire boundaries correspond to elemental surface elements. Depending on how the chicken wire is constructed, these elements may be triangular, rectangular, hexagonal or in the shape of any other polygon.

Once a 3-D representation of an object is captured by recording the coordinates of each point (vertex) of the wire frame, and displayed as a wire frame image, the wire frame can be utilized to do a number of interesting things. For example, the 3-dimensional representation may be rotated, the perspective from which the object is viewed changed, or specific parts of the wireframe changed incrementally as part of creating an animation of the object.

When viewing a wire frame, the prior art has evolved a number of techniques for making the wire frame appear more realistic. These include eliminating the transparent nature of a wire frame so that a viewer sees only the portion of the wire frame which would be visible when viewing the wire frame from a particular perspective and eliminating those lines and vertices which would be hidden by the surface in front. Even with that problem solved, the appearance of an object represented as a wire frame is singularly unnatural.

To make a wire frame representation appear more natural it is possible in the prior art to import the wire frame into a software package such as 3D Studio™ by AutoDesk™, select particular surface elements one at a time and apply a surface texture to the surface elements in a process called rendering. Typically, the wire frame surface element will be selected and painted with a pattern of pixels which approximated a desired surface texture for the area. A number of standard textures are typically defined in prior art rendering packages which would represent a palette from which a particular texture could be selected and applied to surface elements of the wire frame.

The process of rendering a surface over a wire frame was extremely labor intensive. A particular surface element was selected and a particular texture linked to it. The linking proceeded surface element by surface element until the entire image was covered.

Images rendered in this way suffered a loss of detail that made them appear unnatural. An unnatural appearance was particularly noticeable when creating and rendering wire frames of a human face. The limited textures available, gave a human face an unnatural plastic like appearance which failed to capture the many details and imperfections that rendered individuals uniquely human. The rendering techniques of the prior art did not result in photographic quality. They resulted in loss of detail and an unnatural appearance which limited their use in computer animations of human representations.

When capturing and reproducing 3-dimensional images in the prior art, information from one camera of a stereo pair of cameras was depicted as one color (e.g. orange) or band of colors and information from the other camera of the pair was depicted in a complimentary color or color band. When viewing such images through 3-dimensional viewers, such as red/blue glasses, the reproduced image would not be perceived in color.

The orange elements in the picture are only seen through the blue lens, the red lens "washing out" the orange elements. For the same reason, the green-blue elements are only seen through the red lens. Hence, each eye sees only one of the two colored pictures. But because the different colored elements are horizontally shifted in varying amounts, the viewer's eyes must turn inward to properly view some elements, and turn outward to properly view others. Those elements for which the eyes turn inward, which is what the viewer does to observe a close object, are naturally perceived as close to the viewer. Elements for which the viewer's eyes turn outward are correspondingly perceived as distant. Specifically, if the blue lens covers the viewer's right eye, as is generally conventional, then any blue-green element shifted to the left of its corresponding orange element appears to the viewer as close. The element appears closer the greater the leftward shift. Conversely, as a green-blue element is shifted only slightly leftward, not at all, or even to the right of its corresponding red element, that element will appear increasingly more distant from the viewer.

When 3-dimensional images are captured, corresponding points of the left image are displaced from the same points in the right image horizontally. A measurement of the amount of displacement is called "disparity". In the prior art when stereo images are made, the disparity for all subject matter visible in both images is fixed. In digital images, disparity can be measured in terms of the number of pixels an object is displaced in the right image relative to its position in the left image. Fixed focal length lenses are customarily used for the cameras In an object with zero disparity, the corresponding pixels for the left and right images are perfectly superimposed and the object appears to be located on the screen. Zero disparity objects are seen most clearly when the eyes are crossed just enough to focus on the plane of the screen. Negative disparity objects appear to come out of screen toward the viewer and are seen most clearly when the eyes are more crossed. Positive disparity objects appear to be more distant than the screen and are seen most clearly when the eyes are less crossed.

The eyes cross or uncross in order to get similar image features on or near the fovea of each eye. The "farthest" object that can be seen in an anaglyph is limited by the observers ability to comfortably uncross the eyes. (The usual limit to distant viewing is set by the condition where the eyes look along parallel axes, but such "wall-eyed" condition is rarely comfortable to the observer.)

In an anaglyph, the disparity for all objects is fixed and is measured in terms of pixels of displacement. When one "zooms-in" on a computer image to see more detail, the pixels get larger and the center-to-center spacing between pixels becomes larger. Therefore, constant disparity (measured in pixels) image components become physically farther apart on the screen. In order for the human visual system to fuse image components and produce the sensation of true stereo vision the eyes have to uncross more for each step of "zoom-in". Eventually, the physical separation between corresponding image components becomes so great that the eyes cannot "uncross" comfortably any more (wall-eyed condition) and stereo depth is lost to the observer.

Some stereo images cover such a great range of depth and will have such widely varying values (even without a "zoom-in") that some portions of the image will always be out of range of the observer's ability to see the stereo effects, regardless of how the anaglyph was formed.

The depth location of the point at which the left and right image points for objects at that distance coincided constitutes a "neutral plane" and when observing a fixed disparity 3-dimensional image, the neutral plane would be found at the surface of the medium of reproduction (i.e. paper or CRT display). Items that appear closer than the medium surface and those points in the image which appear behind the neutral plane would have different disparity. The loss of depth perception when disparity exceeds a certain value generally means that when zooming-in on part of a stereo image pair that disparity will become so great that depth perception will be lost. This is a serious drawback when, for example, attempting to use medical images captured in stereo for instructional purposes. Typically, one would need to examine parts of an object in detail by going close up. This problem is analogous to having a fixed focal length microscope and being unable to see close up features which do not lie directly in the focal plane.

Also in the prior art, when capturing 3-dimensional images on film, magnetic tape or the like, there is no way to visually monitor the combined impact of the separate images being captured. As a result there is no way of adjusting disparity or automatically tracking an object and adjusting disparity automatically.

In the prior art, there was no way to control an image so as to position it either in front of or behind a neutral plane in a controllable fashion. This limits the ability to create 3-dimensional animations.

Also in the prior art, there was no way to adjust the views of 3-dimensional images captured on a static medium, such as CD/ROM.

In the prior art, when viewing stereo images, particularly for extended periods of time, viewers experience a certain amount of discomfort, such as eye strain and headaches. It would be desirable to minimize or eliminate such discomfort.

In the process of zooming in upon an object using stereo cameras, to avoid a loss of stereo effect as disparity exceeds the limits of the human mind to fuse the two images together into a 3-dimensional view, in the prior art cameras were "toed in" toward the object being zoomed upon. This produces certain undesirable results which should be avoided.

When using cameras fixed as to separation and orientation, for scenes that are too far away there may be too little and for scenes too close there may be too much disparity leading to a loss of stereo effect. This, too, is undesirable.

The prior art lacked the ability to zoom-in on portions of a scene when capturing the scene from one location. In order to zoom-in on a scene in the prior art, a stereo camera pair with fixed focal length had to be physically relocated closer to the object being captured.

Calculation of depth is a difficult task when using images captured from different positions vis-a-vis the scene being photographed because the planar relationships which result from projection of a three dimensional scene onto a two dimensional plane do not undergo a linear transformation or mapping compared with the same points projected onto a different image plane. Different portions of a scene viewed from one point relate differently to corresponding points from the same scene viewed from another point. As one changes viewing positions, some portions of a scene become hidden as the view point changes. Planar surfaces which are viewed normally in one view are reduced in extent when viewed obliquely.

In the prior art, methods and apparatus are known for surveying a plot of land to identify the locations of significant features of the plot. Typically, this involves a team of surveyors who go to the plot and make physical measurements of distance and angle using a surveyor's transit theodolite and calibrated standards for measuring distance. Surveys using these techniques are typically baselined against a national grid of survey markers. This technique is subject to errors of various kinds in reading the instruments and in performing calculations Aerial surveying is also known. Images are captured from an airplane or other vehicle in transit over an area to be surveyed at positions which are precisely known by modern navigation techniques. Position of significant ground features can then be calculated using sophisticated image processing techniques which often require supercomputers. Aerial surveying techniques have the advantage that they can be accomplished without the need to place people on the ground in the area to be surveyed. Inaccessible terrain can also be surveyed in this way. However, expensive image capture equipment is required and even with very good optics and image processing, the resolution is not always as good as one might like. Also, accurate measurements in the vertical direction are even more difficult to take using aerial techniques.

In forensic investigations such as those of a crime scene or archeological dig, spatial relationships are very important. Such investigations often occur under conditions where some urgency or public necessity exists to vacate the scene of the investigation in a short period of time. If a freeway is blocked for an investigation during rush hour, the need to resume traffic flow is a political necessity. In crime scene analysis, if details are not observed and recorded immediately, valuable evidence may be lost. In such circumstances, there is not time for a careful manual survey and aerial techniques generally lack needed resolution or are too expensive for general application to police investigations.

In a manufacturing environment, it is often desirable to determine the physical details of a product "as built" either for inspection purposes or for documentation with substantial accuracy.

In manufacturing, it is often desirable to capture the physical dimensions of complex objects for purposes of creating a three dimensional (3-D) representation, such as a wireframe, for use in computer assisted design or computer assisted manufacturing (CAD/CAM). In entertainment, it is desirable to use such a 3-D representation for creating animations which result in changes to the position or viewing perspective of a 3-D object.

There is thus a need to accurately capture 3-D information about objects and scenes in ways which are convenient and economical and which don't require sophisticated computing equipment. There is also a need to accurately capture physical dimensions of objects in the vertical direction which might be inaccessible to a physical survey.

Every recorded image, whether it be a photograph, a video frame, a true perspective drawing or other form of recorded image, has associated with it a viewing location and viewing look angles that exactly describe the orientation of the recording mechanism relative to the recorded scene.

When making distance calculations from images captured using cameras, it is necessary to know the location of the camera at the time the picture was taken, or more precisely the front principal point of the camera lens or system of lenses at the time the picture was taken. To calculate distances accurately, it is also desirable to know the azimuth, elevation and rotation angle of the optical axis of the lens or lens system as it emerges from the camera.

In the prior art, camera location was either estimated or known a priori by locating the position from which the picture was taken using surveying techniques. Typically, rotation angle was assumed to be 0 (horizontal) and elevation and azimuth were either measured with varying degrees of accuracy or estimated. Clearly, such surveying and measurement increase the set up time required before capturing images for analysis, often to the point where any hope of accurate measurements would be abandoned in favor of qualitative information which could be gleaned from images captured under uncontrolled conditions.

The need for accurate viewing parameters is being expressed by an ever increasing population of computer users who use digital and analog images for a wide range of purposes, from engineering measurement applications to marketing and sales presentations.

For example, stereo photographs are frequently used to investigate and document accident or crime scenes. The accuracy of the documentation depends to a high degree on knowing exactly the viewing parameters of the cameras at the time the photographs were taken.

Computer-generated renderings are often merged with actual photographs to convey an image of a completed construction project while still in the planning and review stages. In order to make the computer rendering blend into and match the photograph in a visually convincing manner, it is necessary for the viewing parameters of the computer rendering to be exactly the same as the viewing parameters of the camera that took the photograph.

Typically, the viewing parameters for any given recorded image are unknown and difficult to determine with a high degree of accuracy, even when the camera positions are physically measured relative to some established coordinate system. The difficulties arise from the fact that the camera lens principle points are usually located inside the lens structure and therefore inaccessible for purposes of direct measurement. The measurement of viewing angles is even more difficult to accomplish without the use of surveying type tripods, levels and transits.

Photogrammetry is a science that deals with measurements made from photographs. Generally, photogrammetrists use special camera equipment that generates fiducial marks on the photographs to assist in determining the viewing parameters. Non-photogrammetric cameras can be used in some analyses, however the associated techniques generally require knowing the locations of a large number of calibration points (five or more) that are identifiable in the recorded scene. Generally, the three-dimensional location of five or more calibration points need to be known in terms of some orthogonal, reference coordinate system, in order to determine the viewing parameters. The Direct Linear Transform (DLT) is a five-point calibration procedure that is sometimes employed by photogrammitrists. It is usually difficult and expensive to establish the locations of these points and it is certainly complicated enough to deter a nontechnical person from attempting to determine the viewing parameters. Unless a tightly controlled calibration coordinates system is established prior to taking the photographs, it is necessary for the user to know a minimum of nine linear dimensions between the five points. This requirement limits the use of the technique considerably.

In some specialized cases, such as certain aerial surveying applications, conventional photogrammetry can be employed to determine camera parameters using as few as three calibration points. In particular, the Church resection model may be used when the optical axis of an aerial camera lens is within four or five degrees of looking vertically down on the terrain. Angular displacements from the vertical of more than a few degrees results in noticeable mathematical nonlinearities that are associated with transcendental trigonometric functions. Under these conditions, the Church resection model is no longer valid and the three-point calibration procedure no longer applies.

All of the calibration techniques discussed above suffer from a number of disadvantages:

(a) They required calibrated camera equipment;

(b) They require calibration targets consisting of too many points to make the procedures practical for common everyday use by non-professionals;

(c) Techniques which use a three-point calibration target are valid only over a very limited range of off normal camera look angles; and (d) All of the previous methods for solving viewing parameters employ matrix operations operating on all point data at the same time, thus allowing one poorly defined measurement parameter to inject errors in a relatively unknown and indeterminable sense due to parameter cross-talk effects.

In computer assisted design, it is convenient to be able to create computerized representations of objects ranging in size from very large buildings to automobiles to components having microgeometries. In computer animation, it is desirable to have a three-dimensional representation of an object when preparing perspective views of three-dimensional scenes. Typically, three-dimensional objects are represented for computerized manipulation and use as a "wire frame." A wire frame consists of a number of vertices (i.e., points) in three-dimensional space specified with reference to a coordinate system. The points in three-dimensional space are typically joined by lines to create sets of linked or related polygons. Each polygon usually represents a generally flat surface element depicting a portion of the object being represented. Preferably, for certain applications, the surface polygons are triangular because one can guarantee that three points will lie in the same plane. Certain commercial software packages, however, utilize a rectangle or polygons of order higher than 4 as long as the vertices lie in the same plane.

The resolution of a wire frame is determined by the number of vertices and their spacing. If a large number of surface elements are utilized and each surface element is very small, then the three-dimensional wire frame will approximate very closely the surface of the object being represented. On the other hand, if there are few points and the surface elements are large, the representation of the object will miss details which are smaller than the minimum size of the surface element. This is analogous to trying to represent a chair utilizing one foot square pieces of cardboard linked together. Such a representation would be very crude at best. However, if one were to represent a chair using the rectangular areas bounded by the thread of a slip cover, the representation would be much finer and would capture much more detail than would be permitted by the one foot squares of cardboard.

One of the problems of representing wire frames has to do with identifying point locations on a smoothly varying contour. On a smooth contour there are no reference points which are easily identifiable from image views taken from different perspectives. Therefore, it is difficult to identify corresponding points on two images for calculating depth.

In the prior art, there is some difficulty generating life-like wire frame representations of faces. This is because some judgment is required as to the selection of which points to utilize as vertices for the representation and also because the rendering of a 3-D surface of wire frame of a face (that is, the placement of a "skin" over a wire frame) does not result in a realistic presentation. The traditional rendering techniques simply pick a solid color and texture and render it with various lighting and shadow differences. The color is so uniform as to be patently artificial. Further, in the prior art, there is a trade-off between the coarseness of the wire frame and the rendering techniques utilized. Very high resolution wire frames permit traditional rendering techniques to create a more acceptable rendition than coarse wire frames. A coarse wire frame adds unnatural discontinuities at surface element boundaries to the artificiality of uniform texture and color.

Further, the prior art does not possess the capability to change camera (viewer) view point such as by zooming during a morphing sequence in which one stereo image is changed into another.

In the current marketplace there is considerable emphasis on entertainment programming, commonly referred to as "content". Older technology, such as that utilized to make black and white movies, has been upgraded utilizing a colorization process. Through the application of colorization, the useful life of previously produced content is extended. It is extended because people who found black and white objectionable because they have become accustomed to color representations, could continue to enjoy older movies which have now upgraded to color.

Virtual reality is now beginning to become popular. Virtual reality displays capable of true 3-dimensional stereo presentations to a user are becoming less expensive and are being readily adopted. Several types of virtual reality muldimedia type headsets are available. With respect to imaging, some of these utilize field sequential technology with polarizing glasses. One field of an image is transmitted for the left eye followed by one transmitted for the right eye. Polarization of each field is oriented to be orthogonal with the other field so that polarized glasses will allow one frame through the left eye piece and one through the right eye piece by switching the polarization to either block or admit light from a field being produced.

Full two-channel virtual reality displays are also available in which a separate video signal is displayed for each eye.

Older technology utilizes the red/blue glasses for viewing anaglyph type representations. One may expect that red/blue glasses will continue to be the entry level 3-dimensional stereo viewer of choice because of its low cost.

As nearly as can be determined, the prior art does not disclose or suggest any method for converting a motion picture filmed in two dimensional technology into a form suitable for three dimensional stereo viewing without refilming the motion picture.

It would accordingly be very desirable to be able to upgrade the existing 2-dimensional film-making technology, to permit viewing of those movies in a true virtual reality/3-dimensional stereo experience. It would even be more desirable to do this without needing to reshoot any of the film originally produced.

DISCLOSURE OF THE INVENTION

The invention permits one to convert a motion picture filmed using two dimensional technology into a three dimensional motion picture without having to reshoot the movie. The technique makes use of the fact the many objects filmed as part of a movie appear in more than one frame of the movie. The plural views of the object can be utilized to generate a wireframe of the object which can then be used to replace parts of the original two dimensional frame of the movie with a wireframe representation containing depth information. The wireframe can be rendered with photorealistic bit maps captured from either or both of the original images from which the wireframe is generated.

The camera location and orientation (camera parameters) from which each frame of the two dimensional movie is captured are determined. Stereo views of the wireframe are created by capturing one view of the wireframe using the determined location and orientation. A second view of the wireframe is can be achieved by capturing a view from a location and orientation offset from the first view. The two views of the wireframe constitute a stereo pair which can be viewed using virtual reality viewers such as a helmet with separate displays for each eye.

The wireframe can be automatically adjusted to follow frame to frame changes in position of parts of the wireframe by determining the amount of differential shift in position which occurs from frame to frame by correlation detection. The position of vertices of a wireframe can be adjusted to maintain the same relative position vis a vis surface pixels as the amount the surface pixels move is detected by correlation detection.

The advantages and objects of the invention are achieved by providing a method for converting at least one two dimensional first image comprising part of a motion picture into a three dimensional stereo representation of the first image, by (for at least one object within the first image) identifying a view of the object from a second image of the motion picture; using the first image and the second image to construct a three dimensional wireframe representation of the object; transforming that wireframe representation to approximately match the size and orientation of the object in the first image; replacing the object of the first image with a transformed wireframe representation of the object to produce a composite image; and capturing two views of the composite image to form a three dimensional stereo representation of the first image.

Two views of the wireframe portion of the composite image can be rendered with surface textures taken from bit maps from the first or second images or both and the bit maps may be photorealistic.

A plurality of images of a motion picture constituting a key frame sequence are converted to three dimensional stereo repreof the key of the images of the key frame sequence, by using the first image as the key frame of the key frame sequence and by generating images subsequent to said first image are by modifying the composite image of a previous frame in the key frame sequence by changing camera position from which the views of the composite image are captured and by morphing the three dimensional wireframe representation of the object from that previous frame.

Modifying the composite image of a previous frame can be done by identifying a plurality of pixels in the neighborhood of at least one wireframe vertex of the composite image of that previous frame; finding corresponding pixels in the bit map of an image subsequent to that first image; and moving said at least one wireframe vertex of said composite image to a corresponding location in relationship to the corresponding pixels in said image subsequent to that first image as said vertex had with respect the said pixels in the neighborhood of the at least one wireframe vertex of the composite image to form a modified composite image which represents a composite image of the image subsequent to that first image. This is conveniently done using correlation detection.

Changing camera position from which the views of the composite image are captured is done by determining the location and orientation of a camera used to capture each image for all images of a motion picture automatically. Once the location and orientation of the camera is determined for each frame of a key frame sequence, cameras can be placed at separated locations to capture respective stereo views of the composite image for each frame.

The separation of said first and second cameras is determined by the amount an object is desired to be in front of or behind a neutral plane.

Constructing a three dimensional wireframe representation from the two images can be done using the software package 3D Maker™ from Synthonics, Inc.™ At least one of the steps of (1) transforming said wireframe representation to approximately match the size and orientation of said object in said first image; (2) replacing said object of said first image with a transformed wireframe representation of said object to produce a composite image; and (3) capturing two views of said composite image to form a three dimensional stereo representation of the first image are accomplished using the software package 3D Studio™ from AutoDesk™. The step of changing camera position from which the views of the composite image are captured is accomplished using 3D Animator™ from Synthonics™, Incorporated. Rendering two views of the wireframe portion of the composite image with surface texture taken from bit maps is accomplished using the software package QuickLook Rendering™ from Synthonics, Inc.™

The two views of said composite image which form a three dimensional stereo representation of the first image are displayed using separate display media, one for each eye of a viewer or they are combined so that when the combined views are displayed, at least portions of said two views may be directed to separate eyes of the viewer.

Symmetry may be used to construct a three dimensional wireframe representation of said object using symmetry of said object for inferring portions of said wireframe which cannot be directly determined from said first and second images.

The invention is also directed to a method for converting at least one two dimensional first image comprising part of a motion picture into a three dimensional stereo representation of the first image, comprising, for at least one object within said first image, defining points or surfaces of said object to coincide with mathematical planes located in three dimensional object space, said planes having a depth characteristic and assigning a depth value to at least one point on said object, said depth value being determined by the depth value of a point where a ray extending from said one point on said object to the focal point of a camera intersects one of said mathematical planes.

Still other objects and advantages of the present invention will become readily apparent to those skilled in the art from the following detailed description, in which only the preferred embodiment of the invention is shown and described, simply by way of illustration of the best mode contemplated of carrying out the invention. As will be realized, the invention is capable of other and different embodiments and its several details are capable of modifications in various obvious respects, all without departing from the invention. Accordingly, the drawings and description are to be regarded as illustrative in nature and not as restrictive.

BRIEF DESCRIPTION OF DRAWINGS

FIG. 7 is a layout of a three dimensional data base.

FIG. 31 is a 3-dimensional data base for storing wire frame rendering information.

FIG. 70 is an illustration of a data base entry for a data base of wire frame vertices.

BEST MODE FOR CARRYING OUT THE INVENTION

Figure 1:
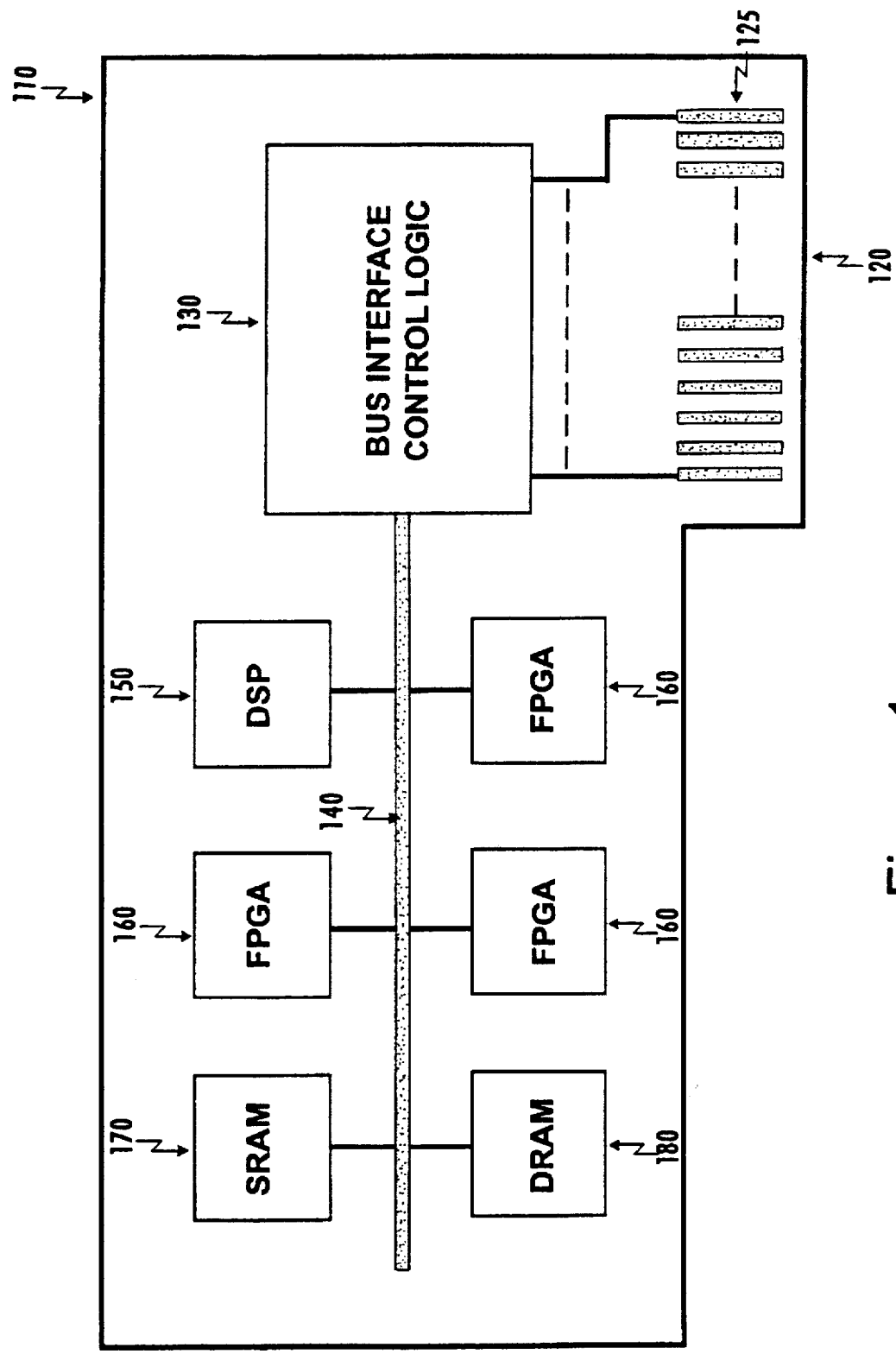
FIG. 1 is a diagram of the hardware architecture of an accelerator board according to the invention.

The hardware architecture of the accelerator board, according to a related application, is shown in FIG. 1. Printed circuit board 110 provides a mounting and interconnection substrate for the various components of the accelerator board. PC board 110 is designed in size and shape to mount on a motherboard of a computer. Connector area 120 is designed to fit into a connector mounted on the motherboard and provide connection to the computer bus on the motherboard. A number of conductive paths are exposed to make such contact. Bus interface logic 130 provides logic necessary to interface the host computer bus on the mother board with accelerator board local bus 140 which services the major components of the accelerator board. A digital signal processor 150, three field programmable gate arrays 160, static RAM memory 170 (SRAM) and dynamic RAM 180 (DRAM) are connected to local bus 140.

The digital signal processor (DSP) 150 provides high-speed digital processing. The digital signal processor 150 may work alone or in conjunction with field programmable gate arrays 160 to implement very fast image processing functions. Static RAM 170 is very fast memory utilized, among other things, for the storage of image input and output information. Dynamic RAM 180 is used to store data which is subject to less stringent storage and retrieval requirements.

The inactive areas of field programmable gate arrays (FPGAs) 160 can be fully or partially reprogrammed down to the cell level on-the-fly, in real time, without disrupting the register states, logic configuration, clocking or I/O states of active cells. FPGAs 160 can reprogram so quickly that only the active portions of the logic need be resident on the chip at any time. When an active region becomes inactive, it can be swapped out and the area(s) it previously occupied reconfigured to perform functions of other modules or functions which are becoming active. Thus, the field programmable gate array 160 can be utilized to implement quickly changing hardware designs. Such FPGAs may be, for example, series AT6000 field programmable gate arrays commercially available from the ATMEL Corporation of San Jose, Calif. The FPGAs can be used separately alone or together with the DSP.

The accelerator board of FIG. 1 has utility in a wide variety of applications and is particularly suited for image processing applications. The application of the board will be illustrated with respect to the problem of image correlation experienced when trying to reconcile two different views of the same scene.

Figure 2:
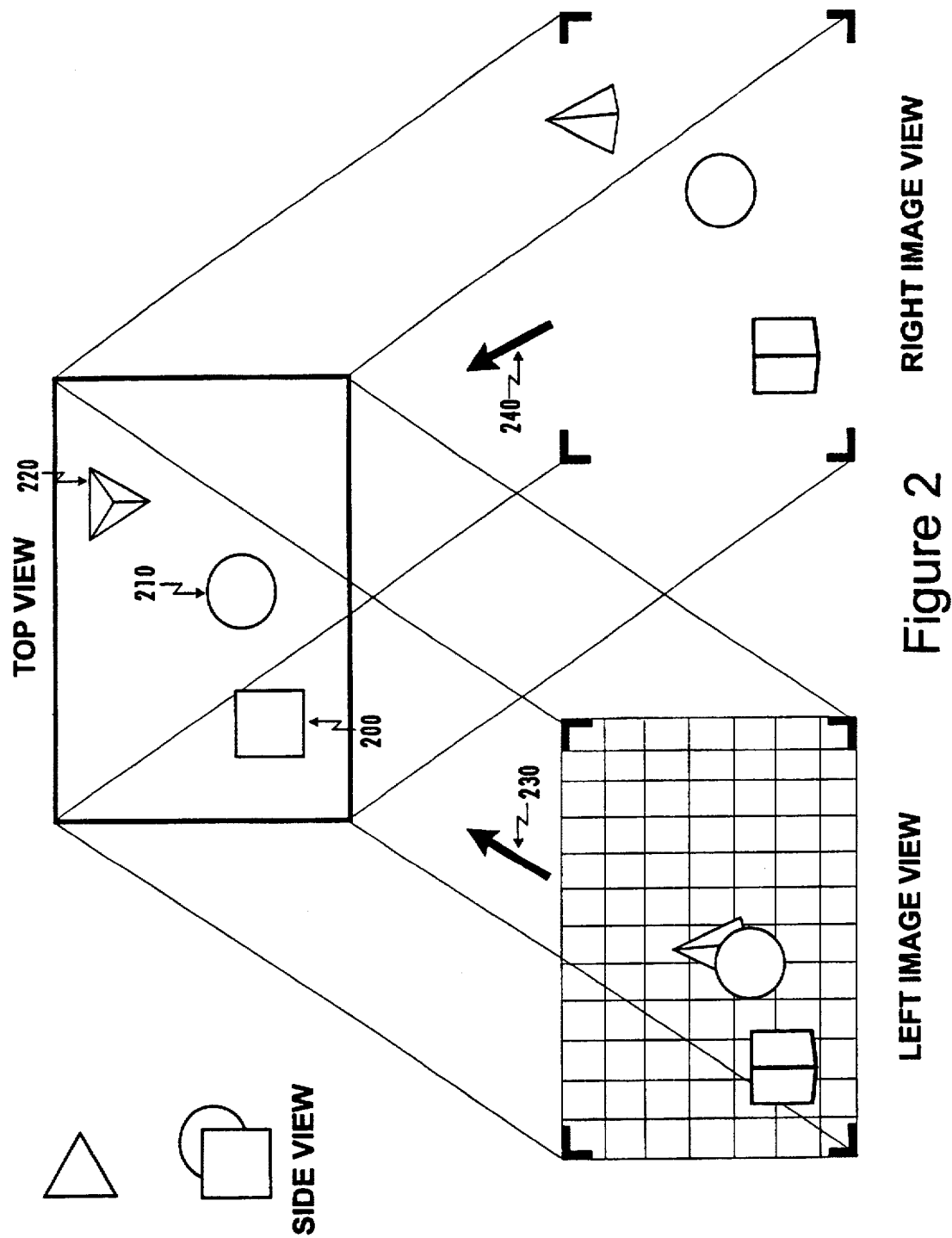
FIG. 2 is a sketch showing problems involved in correlating different images of the same scene.

FIG. 2 illustrates the problem posed by general image correlation. FIG. 2 shows a top view, a side view and left and right image views of three objects, namely a cube 200, a sphere 210 and a pyramid 220 spatially arranged as shown in the top and side views of FIG. 2. When viewed in the direction indicated by the arrow 230, the three objects 200, 210 and 220 appear as shown in the left image view. When viewed in the direction of the arrow 240, the objects appear quite different in the viewing plane. Most notable, perhaps is that, in the left image view, sphere 210 obscures a good portion of pyramid 220 whereas in the right image view, the objects appear separate.

Certain points in both images clearly correspond although their positioning on the image plane is different. The apex of the pyramid is visible in both images. Two visible vertical edges of the cube clearly correspond in both images, however, a different third edge is visible in each view.

Although this example is rather exaggerated, it reflects the problems of image correlation. Points in the real world three dimensional scene projected onto an image plane from one viewing direction are situated quite differently on a different image plane taken from a different direction. The relationship between the points on the first and second image planes which correspond to the real world objects do not map to each other in a linear, well-behaved manner. As a result, the identification of the points in a second image plane which correspond to points in a first image plane cannot be algorithmically determined in a simple fashion, if at all.

One way of undertaking the correlation of points in the second image plane which correspond to those on the first image plane is to select a group of pixels of a certain size and shape, not uncommonly rectangular, from the first image and then exhaustively compare that reference patch of pixels with every possible pixel combination in the second image which corresponds in size and shape. The object of such a comparison is to identify the single target or candidate patch from all the possible patches of the second image which best matches the reference patch. If, for every reference patch in the first image, the corresponding best match is identified in the second image, the images are correlated. Since no simple mapping exists between correlated points on the second and first images, one way of producing image correlation is by an exhaustive search in the manner just described.

There are certain problems with an automated exhaustive search. One of the problems arises when there are areas of the image in which each patch is virtually identical with large numbers of others. One example of this is a photograph of a field of snow. One little patch of snow is virtually identical with every other patch of snow. Thus, one patch of snow will correlate very well with not just one but with a large number of other patches of snow. The information that is obtained from comparison of very similar patches of snow is relatively useless. A similar problem exists with respect to images of non-stationary objects such as trees if images are not captured simultaneously, there will be some relative motion which will add to the difficulties in correlating corresponding points on the two images. Correlating information with objects such as trees and bushes is inherently difficult because the patterns of white and dark repeat in ways which can result in high degrees of correlation with points which are truly unrelated in the original scene.

Figure 3:
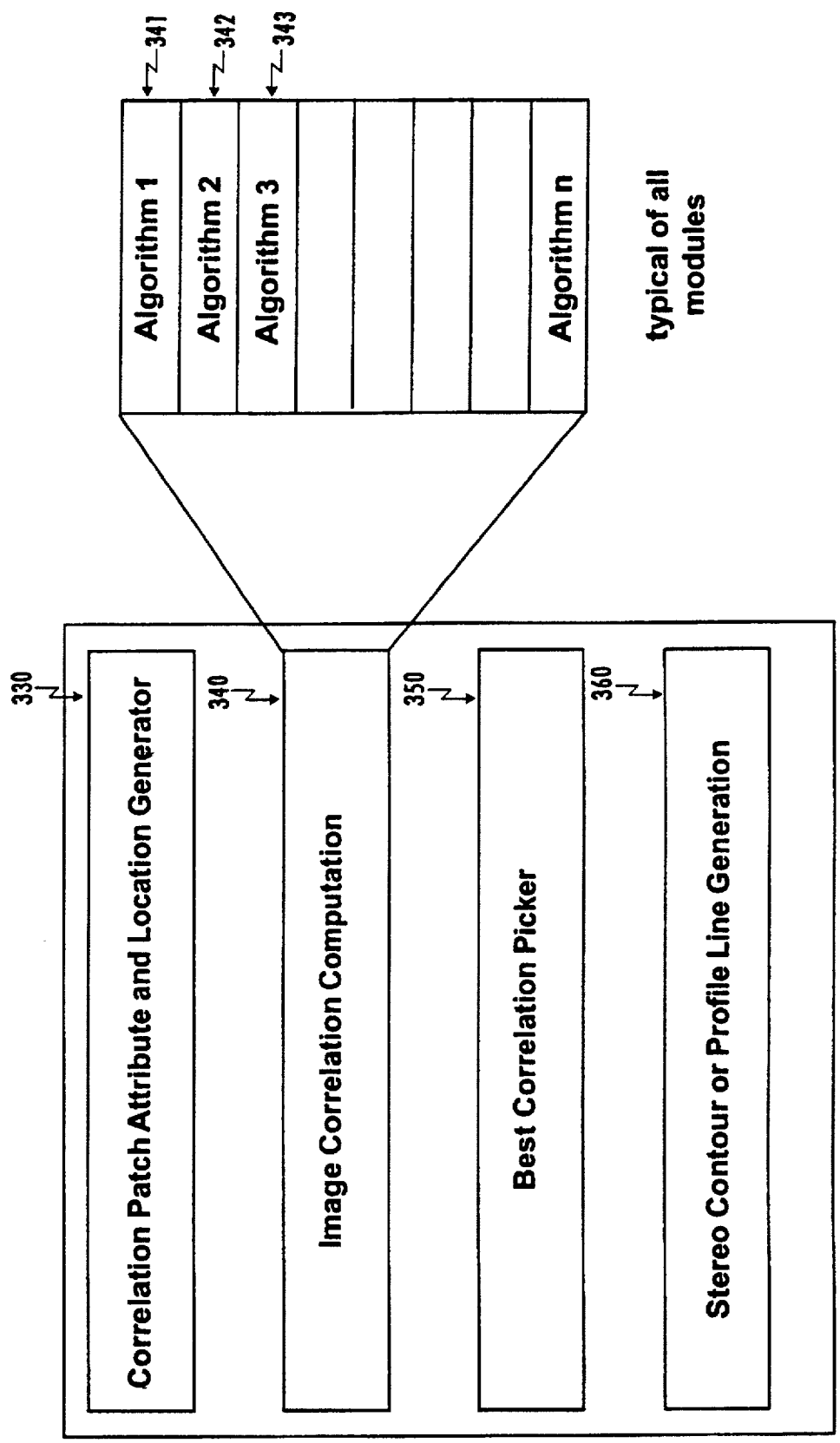
FIG. 3 is a diagram of the software architecture of the accelerator board when configured for use in image correlation.

Many of the problems inherent in correlation can be overcome utilizing the hardware architecture of the accelerator board shown in FIG. 1 in combination with the software architecture shown in FIG. 3. Four major groups of functionality are shown for the were ten options for stereo contour or profile line generation, these could be implemented in block 360.

Before this acceleration board, a software designer would select the desired option for each of the blocks indicated in FIG. 3 and would hard code a program implementing the desired set of functionality. At worst case, this would require 10,000 programs to implement every combination of functionality. In practice, certain options may be implemented with software switches but this too is relatively inflexible because once the overall program is compiled, additional functions cannot be added without recompiling the entire program.

By implementing the software architecture of FIG. 3 using the field programmable gate arrays of the hardware accelerator board described above, only 40 program modules need to be developed, ten for each block. Thus 40 program modules can be swapped in and out on a user selected basis to implement all possible combinations of functionality. Instead of a worst case of 10,000 programs being required, a worse case of 40 programs is required to achieve the same capability. Further, great flexibility is gained in the ability to add new functions without having to rewrite the software. Program development for the field programmable gate arrays is done by translating the desired functionality into a digital logic schematic representation. A broad range of industry standard platforms and CAE/CAD tools are available which capture digital logic and translate it into a hardware design using the cell library for the particular programmable gate arrays in use. Typical design tools include Cadence/Composer™, Cadence/Concepts™, View Logic™, Mentor™ and Synopsis™. Once a particular module is created and validated utilizing such design tools, the configuration information can be loaded into memory on correlation software. The correlation patch attribute and location generator 330 establishes the size and shape of the reference and candidate patches and controls address generation so that appropriate patches of the reference and target image may be compared during the correlation search process. Image correlation computation 340 performs the actual comparisons between the reference and target patches selected by the correlation patch attribute and location generator 330. The best correlation picker 350 takes the correlation results from image correlation computation 340 and selects the patch of the target image which best correlates with the reference patch. Stereo contour or profile line generation 360 displays the 3D representation of the correlation data as it currently exists in the memory of the system. This allows a user to detect anomalies visually and redirect the correlation process so that it more nearly converges to the actual three dimensional profile.

This particular software architecture offers substantial advantages when implemented on the hardware accelerator board described above. The combination of hardware and software permits a tool kit approach to image processing. Using the FIG. 3 example, if there were ten combinations of patch shape and size and search patterns that were frequently used, these could be implemented as ten options for correlation patch attribute and location generator 330. Similarly, if there were ten types of correlation computation that were frequently utilized, these could be implemented as ten options for image computation 340 as illustrated by algorithms 1-N of FIG. 3. Similarly, if there were ten ways to select which results represented the best correlation, these could be implemented as ten options for best correlation picker 350. Similarly, if there the accelerator board and swapped in and out of the field programmable gate array(s) on the fly during program execution as desired.

Figure 4:
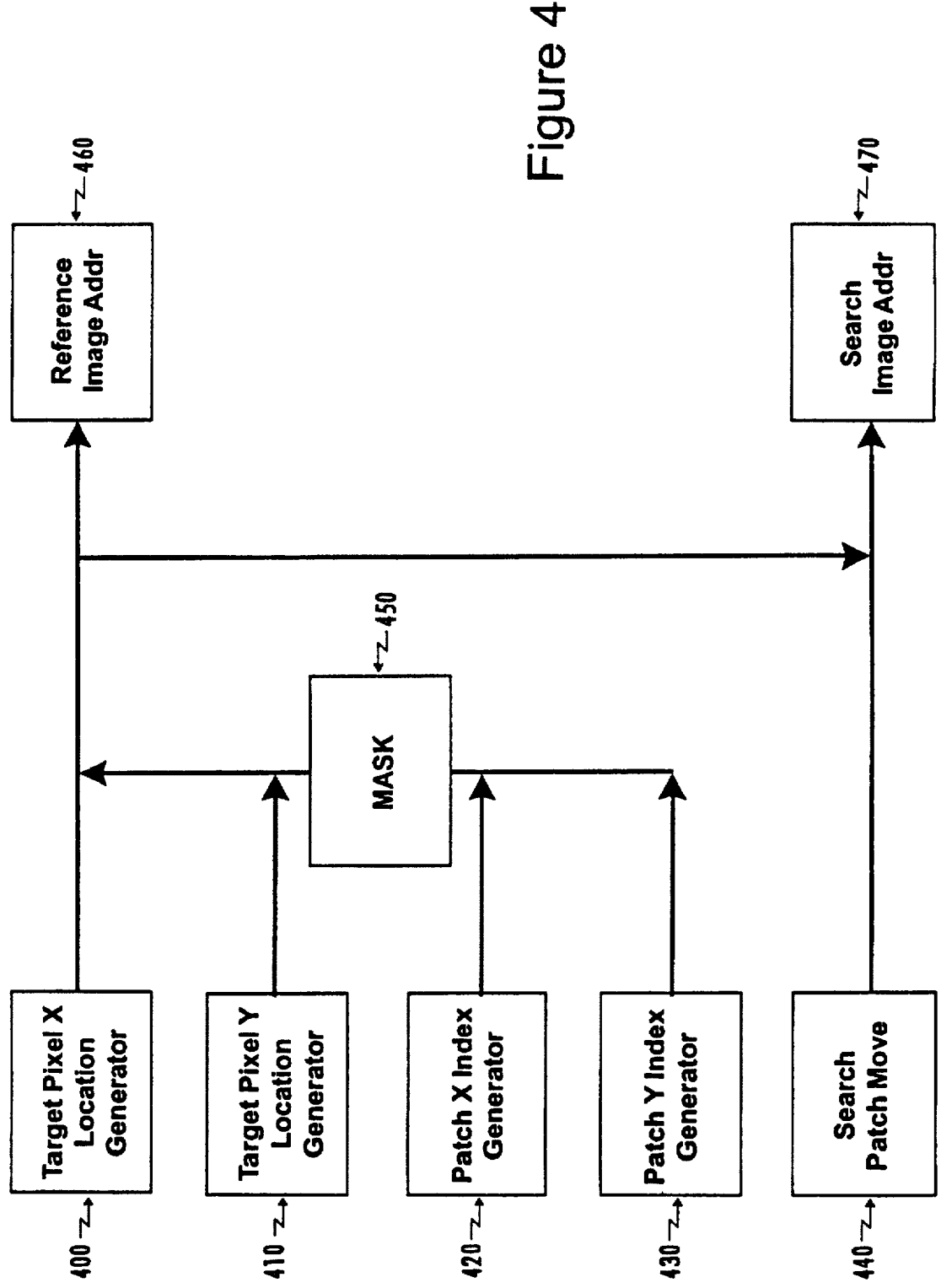
FIG. 4 is a block diagram of an implementation of the patch attribute and location address generator.

FIG. 4 shows one implementation of a correlation patch attribute and location address generator. Target pixel X location generator 400 and target pixel Y location generator 410 define the X and Y coordinates on the image from which pixel information corresponding to the reference and candidate patches should be taken. The reference image address 460 is the address of the reference patch and the search image address 470 is the address of the target or candidate patch which is to be compared against the reference patch. Patch X index generator 420 and patch Y index generator 430 give the width and height of a rectangular array of pixels corresponding to a patch. Non-rectangular patches may be generated for custom purposes utilizing a programmable mask 450. Thus, the patch X and Y generators 420 and 430 together with mask 450 define the size and shape of the patch. Target pixel X and Y location generators 400 and 410 define the location or placement of the patches on the respective reference and search images. Search patch move block 440 defines the path of the search, that is, given that a particular patch is being compared, how is the next patch selected for comparison.

Figure 5:
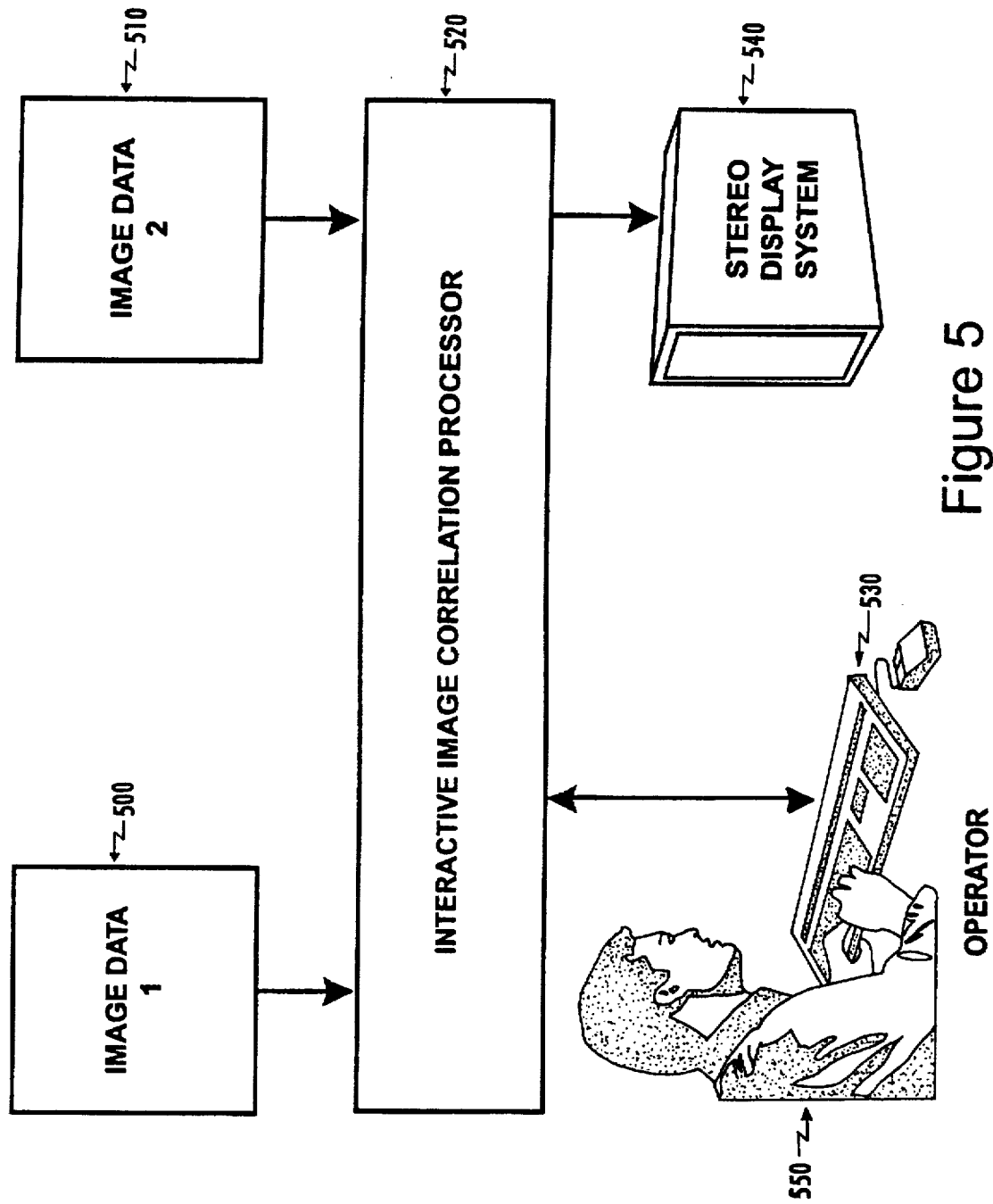
FIG. 5 is an illustration of user interaction with data and the hardware accelerator board to achieve correlation of two images.

FIG. 5 depicts, functionally, the interactive image correlation process. Image data 1 (500) and image data 2 (510) are fed to the interactive image correlation processor 520. A human operator 550 selects the parameters for the initial attempt to correlate image data 2 with image data 1. Once the parameters are set, the appropriate modules are loaded into field programmable gate arrays of the hardware accelerator board to configure the hardware of the FPGAs in accordance with the parameters selected by the human operator. The results of the initial correlation process are displayed on stereo display system 540 in such a way that the operator can see and make judgments about the adequacy of the correlation produced by the first iteration.

The operator may consider that the correlation is inadequate in certain respects. At this point, the operator may assist the correlation process by a number of techniques. For example, the operator may identify points on image 1 and image 2 which are easily recognizable as correlated. This provides additional information which can be utilized during the next iteration to refine the correlation. In addition, the operator may identify certain regions of, for example, image data 1 where better results are needed. The operator can limit additional correlation processing to those areas to improve system response times. With experience, the operator will learn which types of modules should be selected for each of the major functional areas of the correlation processor to ensure best results. The operator may desire to change the shape of the patch or the size of the patch in order to get better results. When appropriate adjustments to parameters have been made by the operator another iteration of the of the correlation process occurs and revised results are displayed. Thus, the operator can interact with the system to converge progressively toward an acceptable correlation of the images.

One should appreciate that this type of interaction was not possible in the prior art because of the difficulties of software development and because of the slow response times of the prior art.

Figure 6:
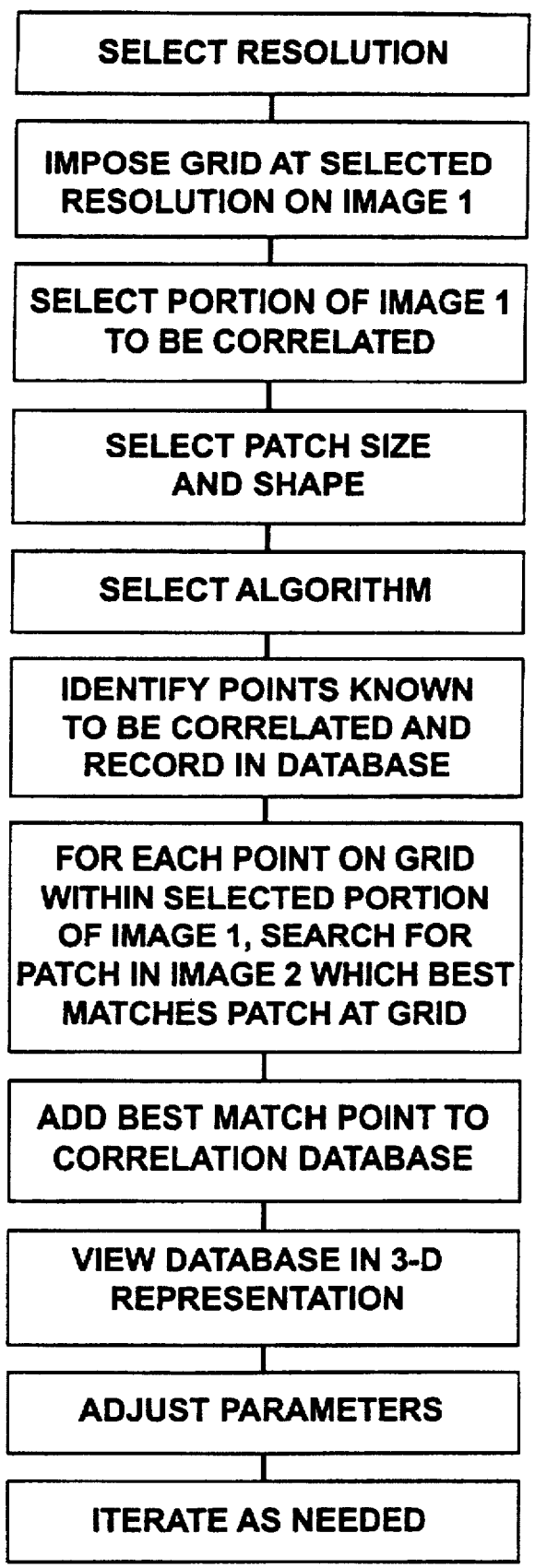
FIG. 6 is a flow chart of interactive image correlation.

FIG. 6 shows a flow chart of one image correlation process suitable for implementation on the hardware accelerator board described above. FIG. 6 assumes that two images, image 1 and image 2 have been read into memory in the accelerator board for processing.

Initially, the operator selects the resolution (600) at which the correlation is desired. Once the resolution is selected, the system imposes a grid (610) over image 1 at the selected resolution. Then the operator selects (620) a portion of image 1 to be correlated. Initially, this would be the entire image. The operator then selects (630) the patch shape and size and the algorithm (640) to be used for correlation. Optionally, the operator may then identify points on image 1 which correspond to points on image 2 and these are entered into the database. Then, for each point on the grid imposed on image 1 within a selected portion, a patch is selected and a search is undertaken for the best match from image 2. See block 660. Once the best match is identified, the point on image 2 corresponding to the point on image 1 is added to the correlation database (670). The database thus created will contain a listing of points on image 1 at the intersections of the grid and the corresponding points on image 2 which are considered to correlate with the information on image 1. The results of the correlation are then displayed stereographically to the operator who makes a judgment as to the adequacy of the three dimensional representation. If the results are not yet satisfactory, the operator can adjust the parameters of the correlation process in order to improve the results and conduct additional interactions until the correlated end product is considered satisfactory.

A number of search patterns can be implemented by the correlation patch attribute and a location generator 330. These can include, inter alia, a rastor scan type search, a manhattan search with different numbers of steps, spiral search, a diagonal search, a cross diagonal search or any number of searches which may lend themselves to particular types of image information.

A correlation computation can be accomplished by comparing patches using the sum of absolute differences, the sum of the squares, least squares, logical and, logical or, logical X or, or logical image A AND NOT image B.

The best correlation picker may implement, inter alia, one or more of the following examples: minimum value of the sum of absolute differences, the average value of the sum of absolute differences, the ratio of the average correlation to the best correlation, the shape of a plot of data history which measures slope, the minimum value divided by the maximum value, and the shape of a plot of data history which measures a half value width of a trough experienced when a data minimum is passed over.

FIG. 7 illustrates the layout of a three dimensional database for use in capturing correlation information. Once the resolution at which the correlation is to be conducted has been selected, a grid is overlaid on image 1 with lines corresponding to that resolution. The intersection of the lines of the grid define points on the reference image where reference patches will be identified and for which a correlation search of patches in the target image will be made. Thus, the 3D database can be viewed as a table with left hand image information and right hand image information. The X and Y coordinates of the left hand image constituting essentially grid points and the entry under right hand image corresponding to that grid point will be the point in the right hand image which best correlates with the patch at the grid point. The information $Z_L$ from the database will be discussed hereinafter.

Figure 9:
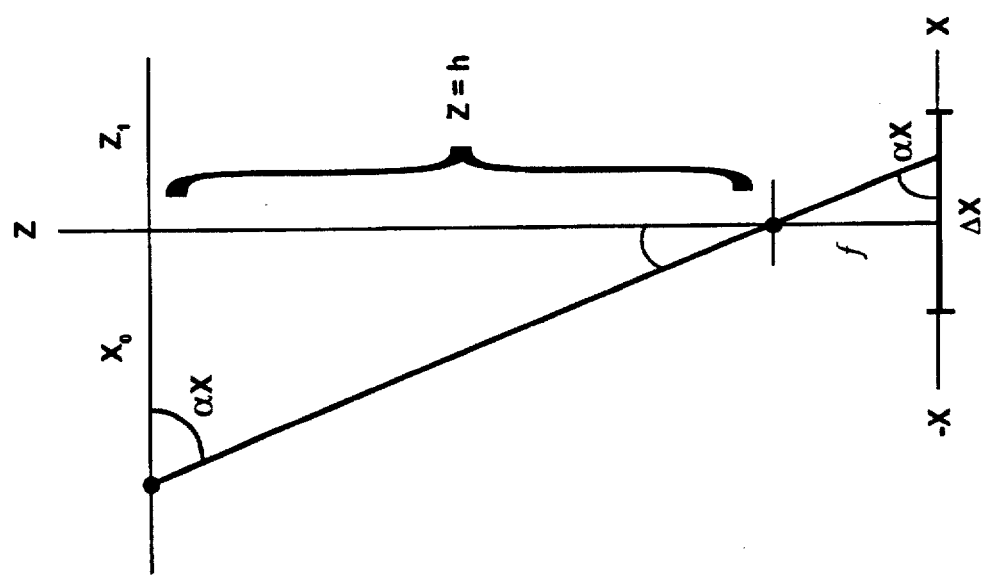
FIG. 9 is a representation of relationships utilizable to obtain the X offset from the Z coordinate and image information.

FIG. 9 illustrates a calculation of depth from two different images of the same scene. Assume a set of axes with origin at 0, the X and Z axes as shown in FIG. 9 and the Y axis being perpendicular to the plane of the page. Assume that the images are captured with an objective at point C and an objective at point F in FIG. 9. The distance between C and F being $d_1 + d_2$. The camera capturing the image will have a known focal length F and the image plane corresponding to each of the points at which the image is captured is shown in a heavy line on the X axis. The distance of the point labeled D from the line joining the focal points of the camera (C & F) can be calculated as follows:

Triangles ABC and CED are similar in a geometric sense and triangles DEF and FHG are also similar.

Because they are similar, $$\frac{h}{f} = \frac{d_{12}}{\Delta X_L} \quad (1)$$

$$\frac{h}{f} = \frac{d_2 + d_{11}}{\Delta X_R} \quad (2)$$

$$d_1 = d_{11} + d_{12} \quad (3)$$

$$h = \frac{d_{12}}{\Delta X_L} = \frac{d_2 + d_{11}}{\Delta X_R} \quad (4)$$

Equating (1) and (2) and the subtracting the right hand term from both sides of the equation results in:

$$\frac{d_{12} \Delta X_R - (d_2 + d_{11}) \Delta X_L}{\Delta X_L \Delta X_R} = 0 \quad (5)$$

For the prior equation to be true, the numerator must=0.

$$d_{12}\Delta X_R - (d_2 + d_{11}) \Delta X_L = 0 \quad (6)$$

Solving equation 3 for $d_{11}$, substituting in equation (6) and moving the right term to the right side of the equation results in:

$$d_{12} \Delta X_R = (d_2 + d_1 - d_{12}) \Delta XL \quad (7)$$
$$d_{12} (\Delta X_R + \Delta X_L) = (d_2 + d_1) \Delta X_L \quad (8)$$

$$d_{12} = \frac{(d_2 + d_1) \Delta X_L}{(\Delta X_R + \Delta X_L)} \quad (9)$$

$$d_{11} = d_1 - \frac{(d_2 + d_1) \Delta X_L}{(\Delta X_R + \Delta X_L)} \quad (10)$$

$$h = f \frac{(d_2 + d_{11})}{\Delta X_R} = f \frac{d_{12}}{\Delta X_L} \quad (11)$$

Once h is known, the coordinates $X_O$ and $Y_O$ of the point O can be defined with respect to a camera axis by the following. See FIGS. 9 and 10.

$$\alpha_x = \tan^{-1} F/\Delta X \quad (12)$$

$$\alpha_y = \tan^{-1} F/\Delta Y \quad (13)$$

$$X_O = -h \cot \alpha_x \quad (14)$$

$$Y_O = -h \cot \alpha_Y \quad (15)$$

Thus the data from two correlated images captured from known positions can be used to derive a three dimensional database which represents the scene depicted in the two images.

The system disclosed enables interactive image processing because a unique combination of features enables extremely fast response times. These features include the selection of resolution; the implementation of program modules in hardware; the ability to reprogram correlation parameters on the fly without recompilation of the entire program; and the interaction of the operator to change parameters and to provide information to guide the correlation process and to focus on areas constituting only parts of the image for correlation all work together to provide image correlation which converges much quicker than prior art systems at much lower development and operational cost.

Being able to determine depth from two different images of the same scene allows the creation of a three dimensional representation of an object which can be utilized to create anaglyphs, create animations or to measure the physical extent of the scene captured.

Figure 13:
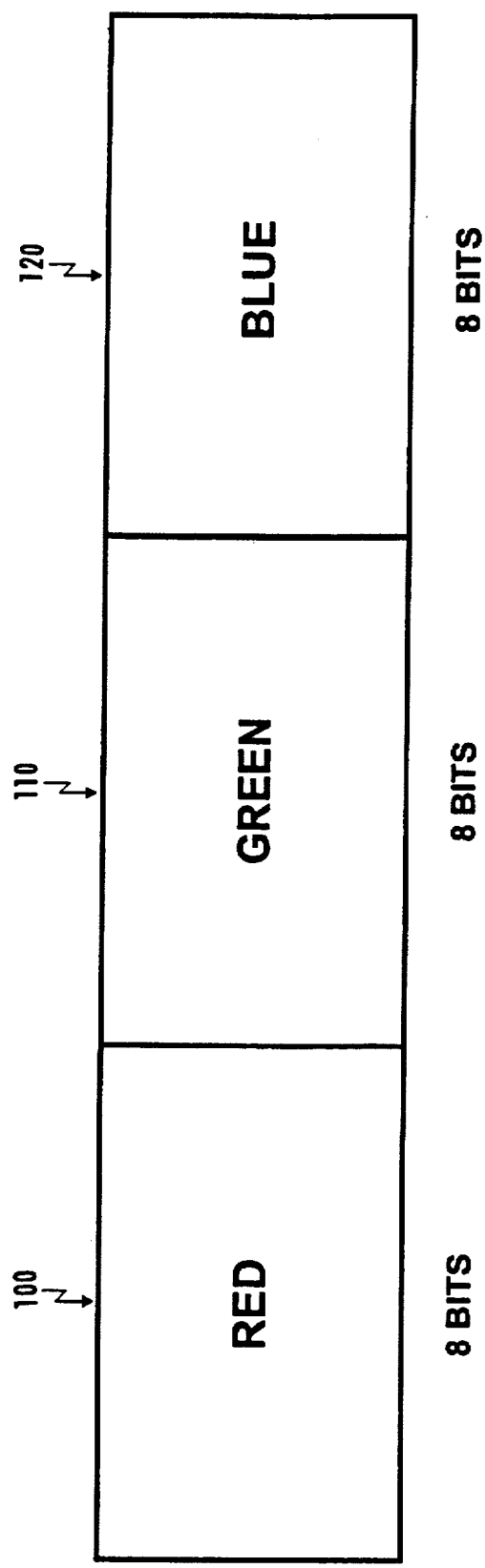
FIG. 13 is an illustration of a common way of storing color pixel information for digital processing in the prior art.

Color 3-dimensional stereo images can be produced by shifting color plane information. FIG. 13 illustrates how digital color image information for a single pixel may be stored when undertaking digital image processing. Twenty-four bits of information are illustrated in FIG. 13, however, the number of bits per pixel and the number of bits per field may be selected to meet the needs of a particular design. In the example illustrated in FIG. 13, 8 bits illustrated at 100 represent red information whereas the two sets of 8 bits each at 110 and 120 represents color intensity levels for respective green and blue color components for a particular pixel. With 8 bits each, each indication of color intensity level may represent 256 different intensity levels. The 8 levels in each of 3 colors permits $2^{24}$ color intensity combinations to be represented.

In a typical cathode ray tube (CRT) shadow mask display, separate electron guns are utilized to activate separate red, green and blue phosphor dots on the screen selectively. The red, green and blue bits of the color information depicted in FIG. 1 are utilized to establish the intensity of red, green and blue components or in other words the color for the pixel. If a pure blue pixel were desired, the red and green electron guns would be turned off and only the blue gun would bombard the blue phosphor dot of the triad at an intensity level set by the 8 bit intensity level value for blue (120). If a pure red pixel were desired, the green and blue guns would be turned off by virtue of the 0 values represented in fields 110 and 120 of FIG. 13, and the red gun would be activated at the intensity level set by the 8 bit field 100. For mixed colors, the intensity levels from the three fields 100, 110 and 120 control the color and intensity of the light output from a phosphor dot triad in the CRT screen.

Digital image arrays can be very large. For example, digitizing a fairly standard black and white photographic image can involve a storage requirement of 8 megabits for an array of 1024×1024 elements. This assumes 256 intensity levels. One byte (8 bits) of data is utilized to represent the intensity level of each pixel.

In the example shown in FIG. 13, 8 bits are utilized to represent each color intensity level. Thus a color image of 1024×1024 elements utilizing the storage scheme of FIG. 13, would require 24 megabits of storage. In many applications, even finer resolution is required with the attendant increasing storage overhead.

In the storage of a 1024×1024 color image utilizing the scheme shown in FIG. 3, 8 megabits of information constitutes red only information, a separate 8 megabits of information constitutes green only information and a final 8 megabits of information constitutes blue only information. The aggregation of storage dedicated to particular color information is called a color plane.

The system described above is referred to typically as RGB (red, green, blue) color storage.

Psychologists usually describe color by "hue" the color name which depends on average wave length, by "saturation", the purity of the color, and by "intensity", the overall brightness of the color. Standard formulas are well known in the art for converting between RGB representation and HSL representation.

YIQ coding used in commercial television transmission utilizes a different transformation representation than the HSL system. It requires a luminance component (Y) for monochrome sets and two chromanance components (IQ) which take weighted differences of the RGB values.

Figure 14:
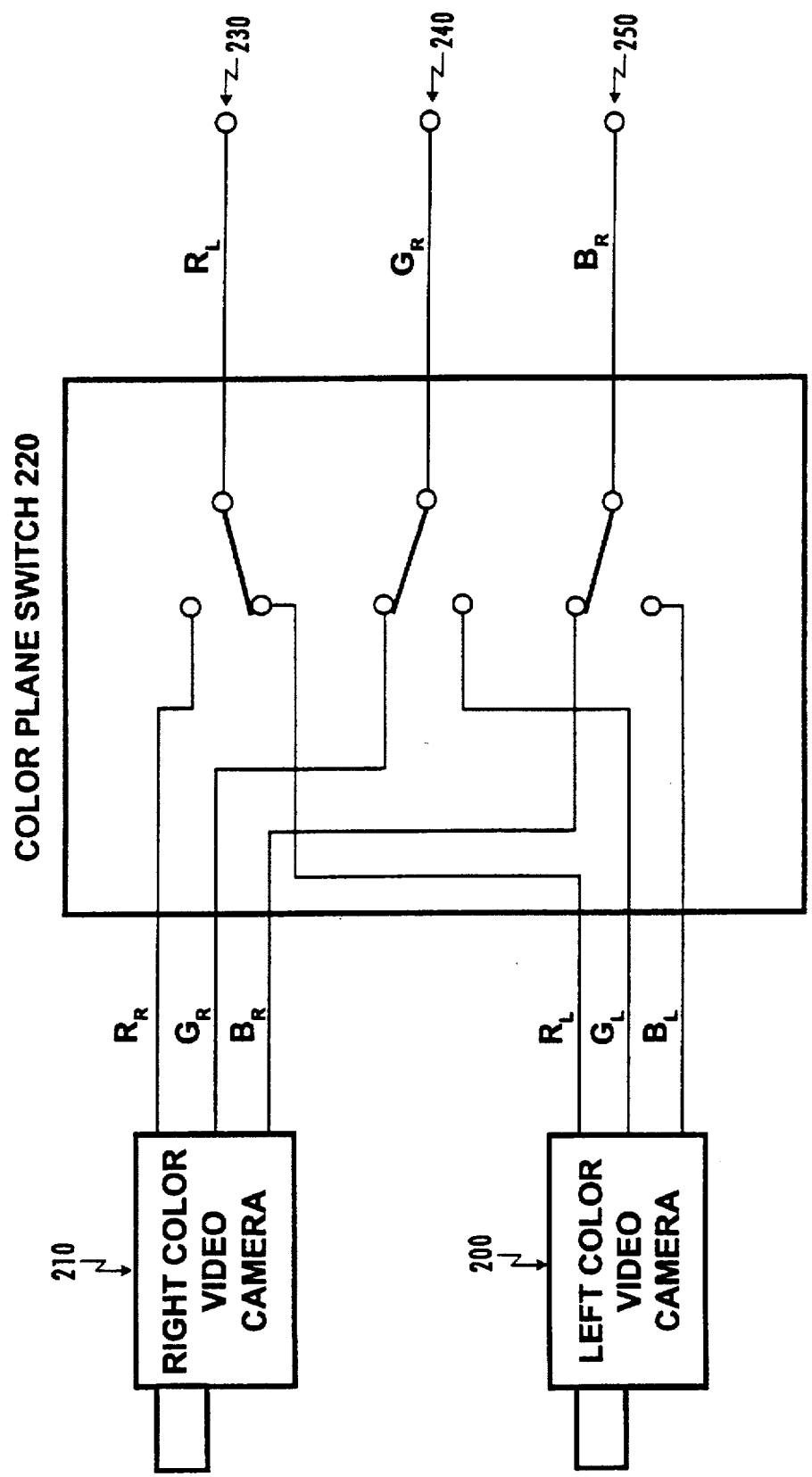
FIG. 14 is an illustration of how image planes from two video cameras can be combined to produce a color 3-D image.

FIG. 14 illustrates a particularly simple technique for generating 3-dimensional images in which the color information is retained. Left and right color video cameras 200 and 210 are positioned so as to capture two different views of the same scene. Preferably, the optical axis of the objective lenses of left and right video cameras 200 and 210 are separated by approximately the interocular distance. Each left and right color video cameras 200 and 210 have respective red, green and blue outputs which are labeled $R_L$, $G_L$ and $B_L$ and $R_R$, $G_R$ and $B_R$, respectively. The red, green and blue outputs from each of the two cameras is fed to color planes switch 220 where the red color plane from the left camera is substituted for the red color plane of the right camera to produce a composite output $R_L$, $G_R$ and $B_R$ at outputs 230, 240 and 250 respectively. If analog, these signals may be sampled directly and stored as separate color planes. If digital, they may be combined into the format shown in FIG. 11. Alternatively, analog output from 230, 240 and 250 may be used to produce a 3-dimensional color video image.

Figure 15:
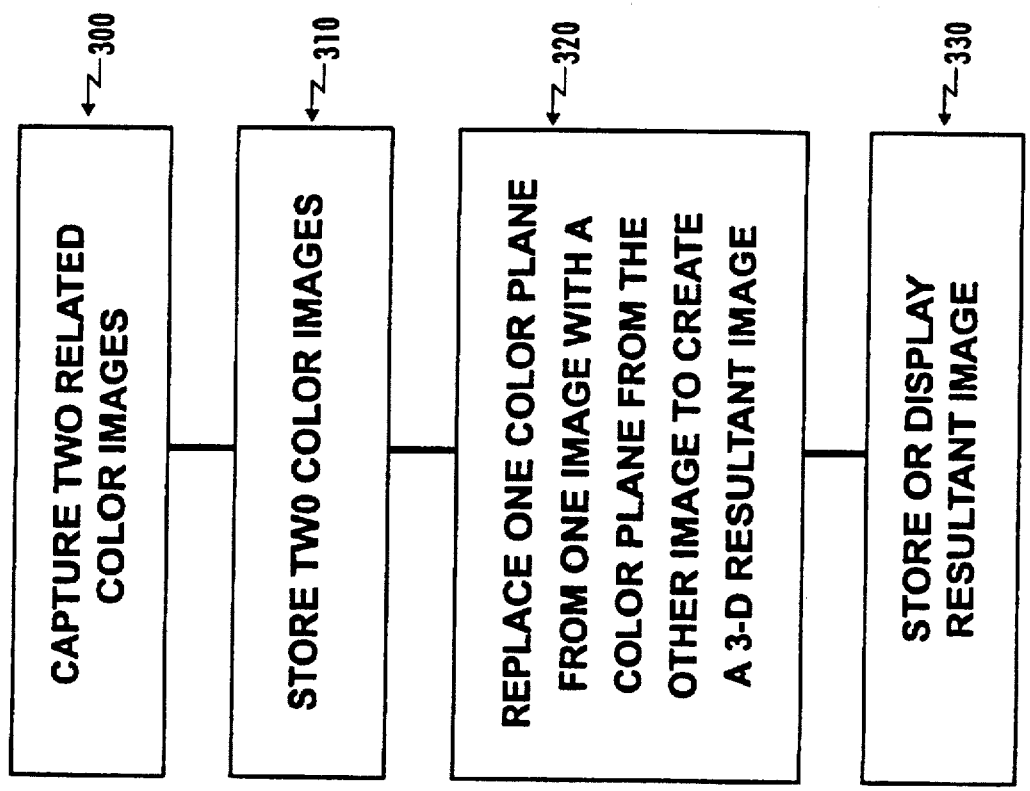
FIG. 15 is a flow chart of image processing required to produce a color 3-dimensional image from two 2-dimensional colored digital images.

FIG. 15 shows a flow chart of image processing required to produce a color 3-dimensional image from two color digital images. First two related color images are captured (300) and optionally stored as two color digital images (310). Then, one color plane from one image is replaced with the color plane from the other image to create a 3-dimensional result in image (320) which can be either stored in an image store or viewed on a display, respectively (330).

Figure 16:
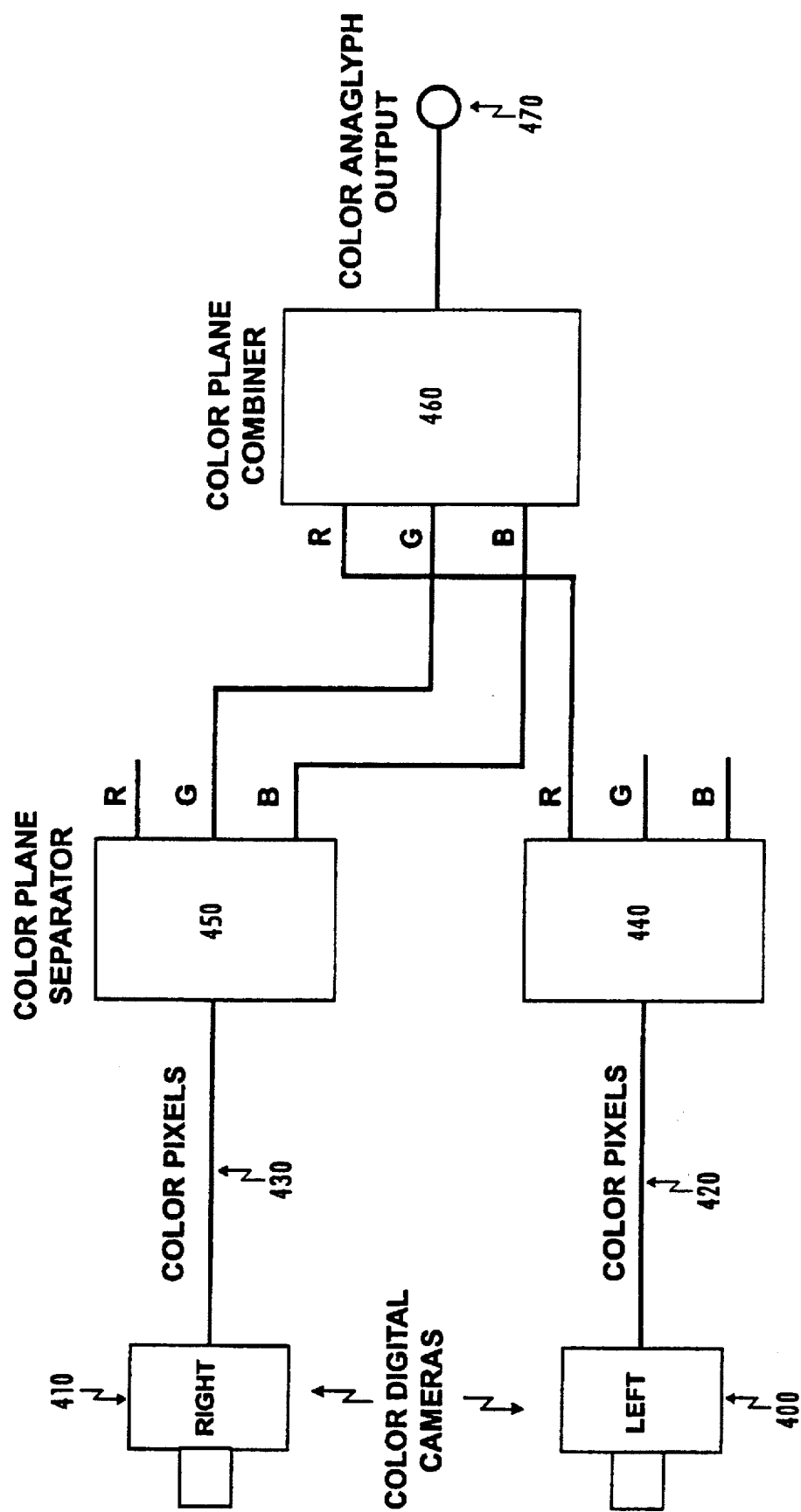
FIG. 16 is a drawing illustrating the creation of a 3-dimensional color still image.

FIG. 16 illustrates how a 3-dimensional color still pictures, or an anaglyphs, may be created. Color digital cameras 400 and 410 capture related still images of a scene to be photographed. Again, it is preferred that the optical axis of the objective lenses of the left and right digital cameras be separated by approximately the interocular distance. Color pixels in digital format are output from cameras 400 and 410 on lines 420 and 430, respectively and are fed to respective color plane separators 440 and 450 respectively. The output of the color plane separators are respectively combined in color plane combiner 460 such that the red image plane from the right camera is replaced with a red image plane from the left camera in color plane combiner 460. The result is an output, 470, which directly produces a color anaglyph of the image captured by the cameras in a particularly simple and efficient manner.

FIG. 16 also illustrates the computer generation of 3-dimensional anaglyphs. An object is in aesented in a 3-dimensional representation such as a wire frame generated using a 3-dimensional database. A full color surface can be rendered (applied) on the wire frame. Two different 2-dimensional computer generated views of the object are created from different perspectives, corresponding to views from the left and right cameras shown in FIG. 14. The red image plane from the left perspective is combined with the blue-green image planes from the right perspective to create a 3-dimensional anaglyph representation of the computer generated object.

Figure 17:
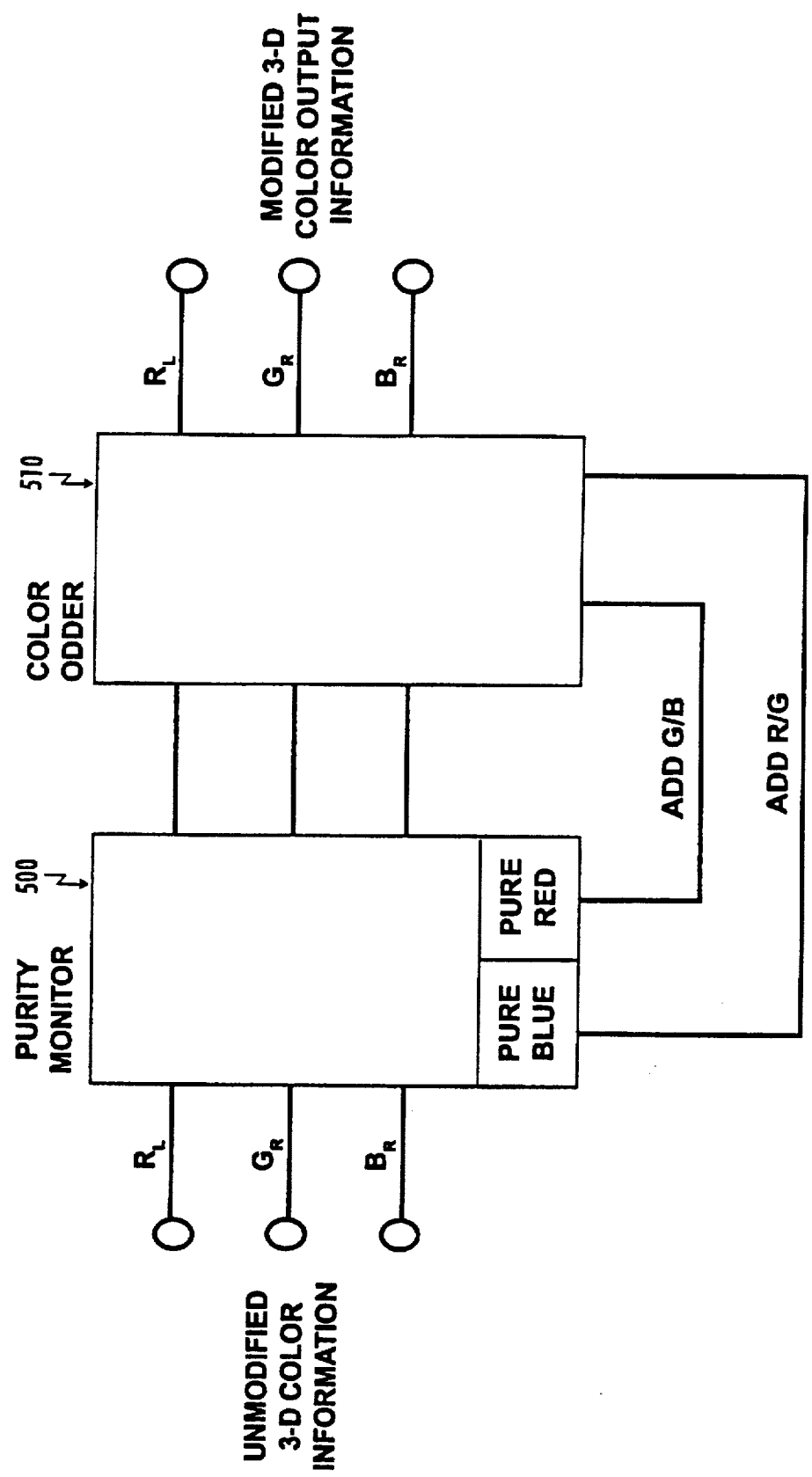
FIG. 17 is a functional illustration of how 3-dimensional color image data is processed to achieve a more pleasing color presentation.

FIG. 17 is an illustration of functionality utilized to eliminate the disturbing effects of viewing pure blue or pure red colors through red/blue viewers. The unmodified 3-D color information such as produced at the output of the FIG. 2 circuitry, is applied at the input purity monitor 500. Purity monitor 500 monitors color plane information and detects when a pixel is either pure blue or pure red within certain tolerances. If a pure red pixel is detected, a certain quantity of green/blue information is added by color adder 510. Similarly, if a pure blue pixel is detected, a certain amount of red/green information is added. The net result is to eliminate pure red or pure blue pixels and the psychological/ physiological disturbances that come from viewing such pixels with red/blue viewers. The modified 3-D color output information from color adder 510 has somewhat more muted color information, but the overall subjective viewing quality is improved by the processing illustrated in FIG. 17.

Figure 8:
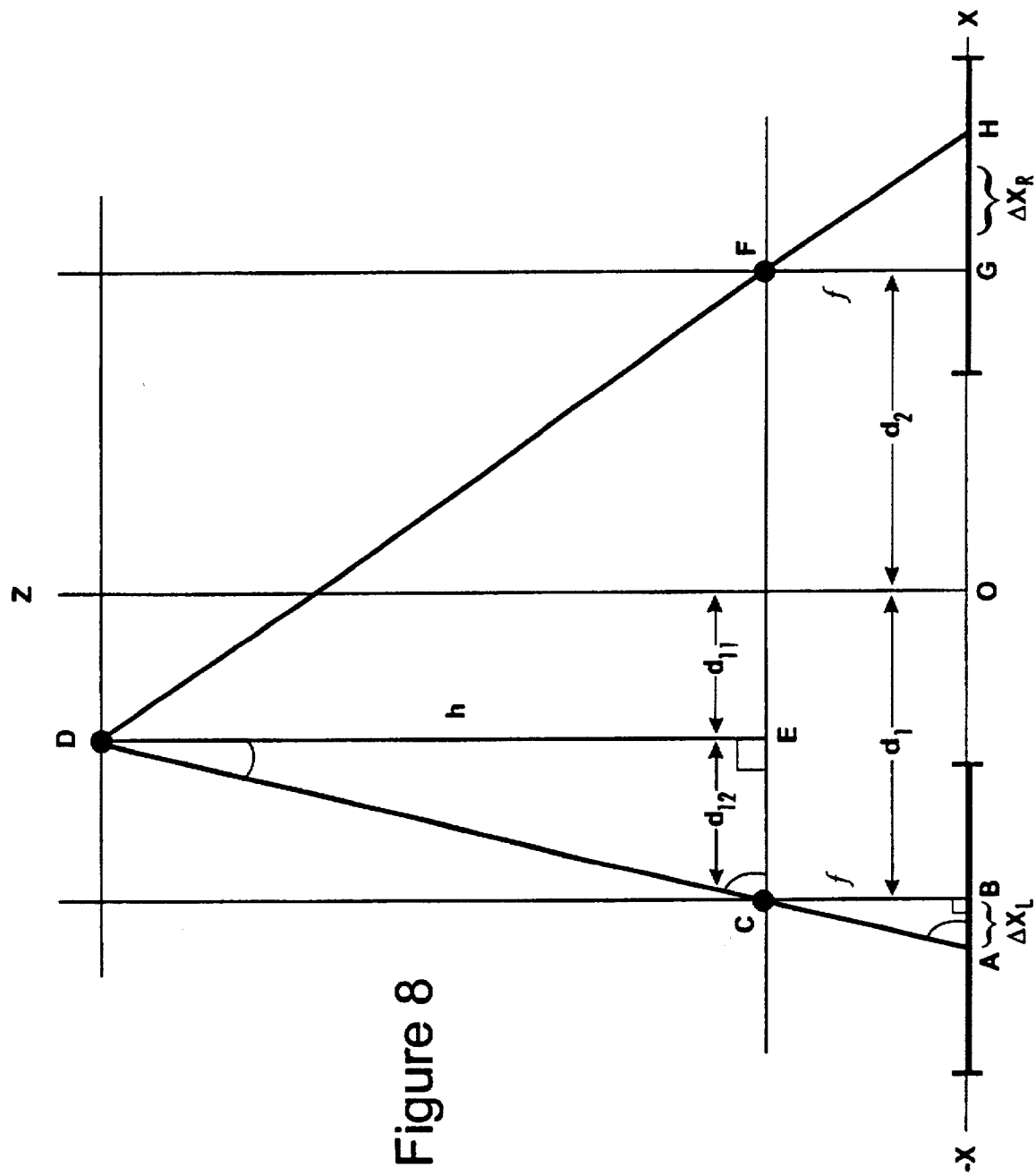
FIG. 8 is a representation of optical relationships from which a determination of depth (Z coordinate) can be obtained from two images of the same scene.
Figure 18:
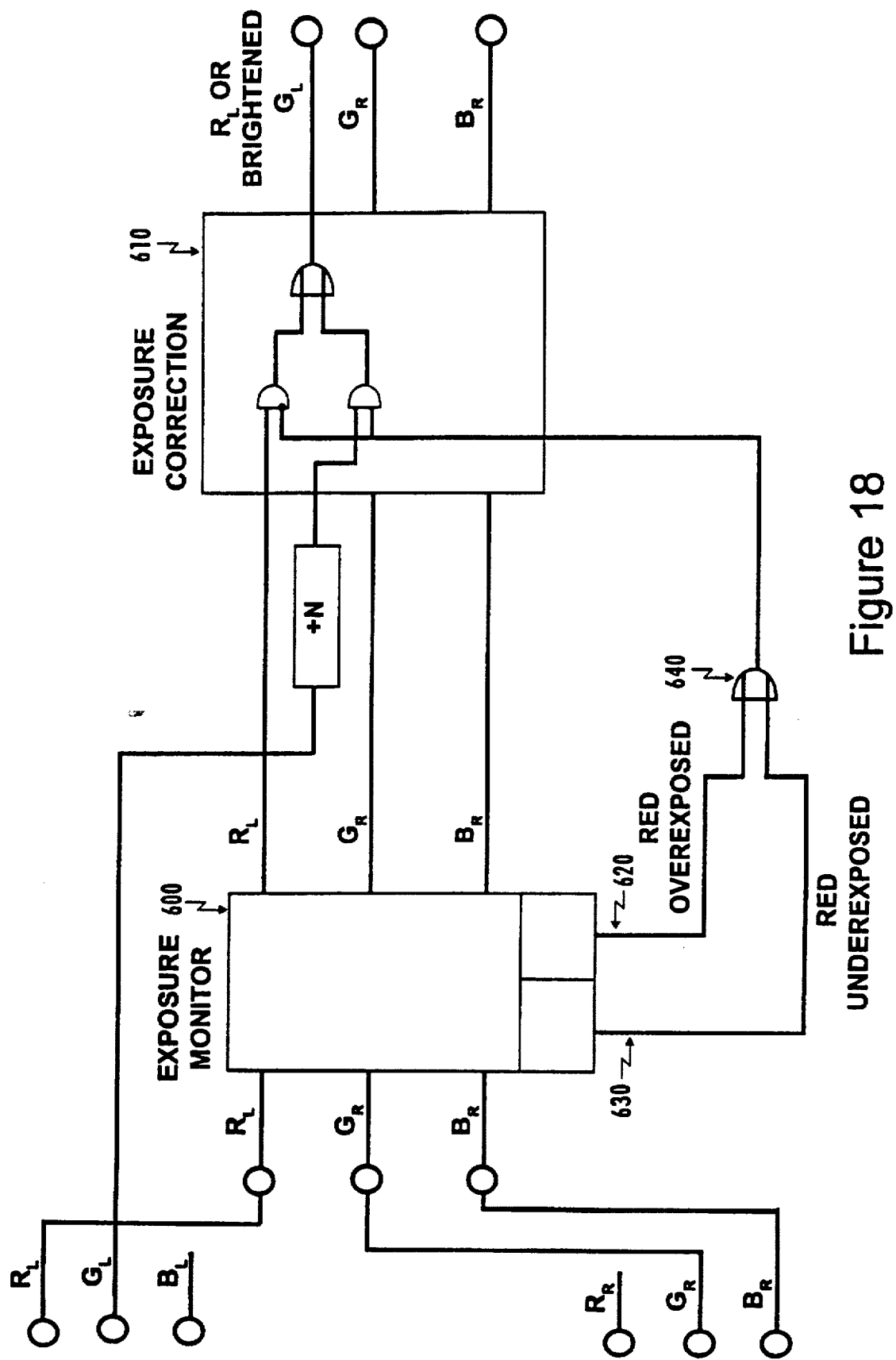
FIG. 18 is a functional depiction of how over-or underexposure of an image plane can be corrected.

FIG. 8 is a functional illustration of correction of overexposure or underexposure in a particular image plane. The inputs to exposure monitor 600 are unmodified 3-dimensional color information such as that generated by the circuitry of FIG. 14. Since red over-or-under-exposure has a significant impact on 3-dimensional image color quality, FIG. 18 illustrates monitoring of the red color plane for under or overexposure. Exposure monitor 600 detects over or underexposure by essentially creating a histogram of the red color values being received by the exposure monitor. If most color values are at the high end, red is likely over-exposed. If most values are at the low end, red is likely under-exposed. When such a circumstance is detected, exposure correction circuit 610 responds by substituting a brightened version of the green image plane from the same camera from which the red image plane originated for the over or underexposed red image plane.

Exposure monitor 600 periodically samples the incoming values from the red image plane and counts the number of pixels at each level of intensity. At the end of the sampling duration, the number of samples at each of the upper and lower ends of the red color value are examined to determine whether an inordinate percentage of color values fall at those extremes. If the number of pixels at either extreme is inordinately high, then output signal 620 or 630 is generated as appropriate. These two output signals are OR'd in gate 640 and control an electronic switch which replaces the red image plane with a brightened version of the green image plane from the same camera which originated the red image plane. Such brightening occurs by incrementing the green intensity level by "IN" steps.

Thus, intervals of under or over-exposure of the red image plane can be corrected to provide a pleasing color 3-dimensional image to the viewer.

Figure 19:
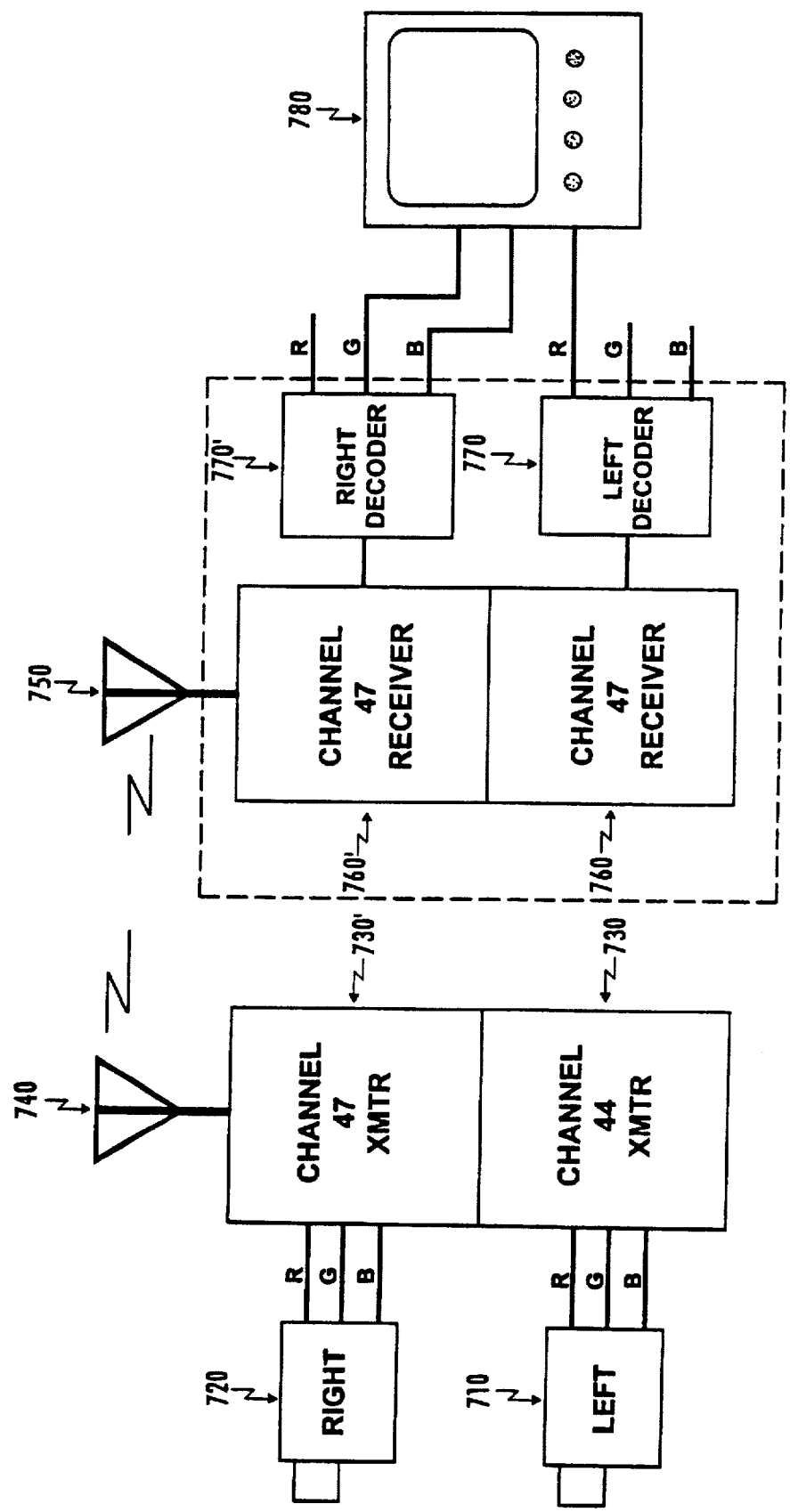
FIG. 19 is a block diagram of a system for transmitting and receiving 3-dimensional television images.

FIG. 19 illustrates a technique for transmitting 3-dimensional images to a viewer utilizing standard television broadcasting equipment. The color video cameras 710 and 720 capture the left and right views respectively of a scene to be transmitted. The RGB output from camera 710 and 720 are fed to respective color television transmitters 730 and 730' which transmit on separate television broadcast channels. Although a single antenna 740 is shown for these transmitters, each transmitter may have its own separate antenna and, in fact, each transmitter may be located at a separate physical location. Images from the two transmitters are received at antenna 750 and fed to receivers 760 and 760' where the RF information is converted to color video baseband in decoder 770 and 770' and synchronized RGB outputs are provided by the decoders. Receivers 760 and 760' may have individual antennas instead of a common antenna 750 as shown. The RGB outputs of the decoder 770 and 770' are connected as shown so that the red image plane is taken from the left decoder and the green and blue image planes are taken from the right decoder and the RGB information is applied to a display such as television set 780.

Alternatively, the full left and right images could be applied to left and right displays of a virtual reality viewer, where the left eye would see the full left image and the right eye, the full right image.

Thus, using two channels of normal broadcast television equipment one can create 3-dimensional color television at a user location.

Figure 20:
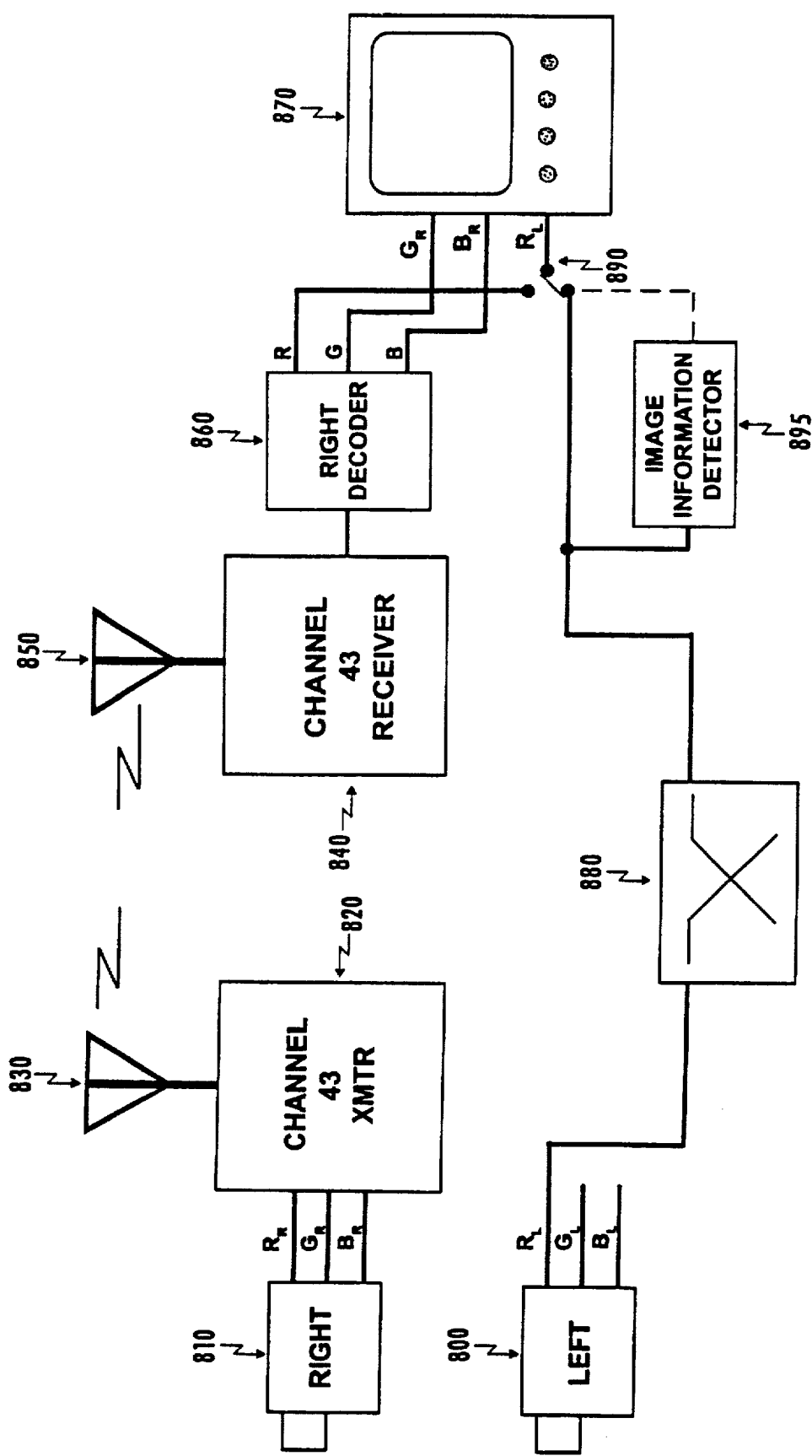
FIG. 20 is a block diagram of another system for transmitting and receiving 3-dimensional television images.

FIG. 20 is an illustration of another method of providing 3-dimensional color television images to a user. One color camera 810 captures a scene normally and its color output is broadcast over color television transmitter 820 and antenna 830 to a receiving antenna 850 and a receiver 840 tuned to the channel. Right decoder 860 produces RGB output from the signal received by the receiver and the green and blue image planes are connected to the display of television set 870. The red image plane from left camera 800 is transmitted over a point to point communication link represented by network 880 to the viewer's location where it may be combined with synchronized green and blue image planes from the right decoder 860 to produce a 3-dimensional image on the display of television receiver 870. A simple switch 890 allows a user to switch between normal color television reception and 3-dimensional color television reception. In normal mode all three image planes from right decoder 860 are fed to color television display 870. In 3-dimensional color television mode, a user might dial up the video information provider over network 880 and request 3-dimensional service. The video information provider would then allow, after suitable arrangements for compensation have been made, the user to download the red image plane of the left camera 800 to complete the 3-dimensional image. The presence of 3-dimensional image data on the point to point communications link can be detected automatically and utilized to control switch 890 so that 3-dimensional information is displayed when 3-dimensional information is available and otherwise 2-dimensional information is displayed.

Figure 21B:
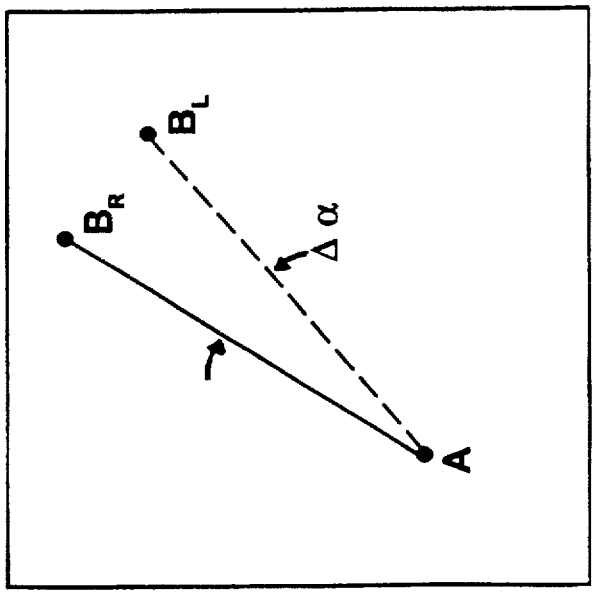
FIG. 21A–C illustrate the process utilized to achieve an epipolar condition between left and right images of a stereo pair.
Figure 21A:
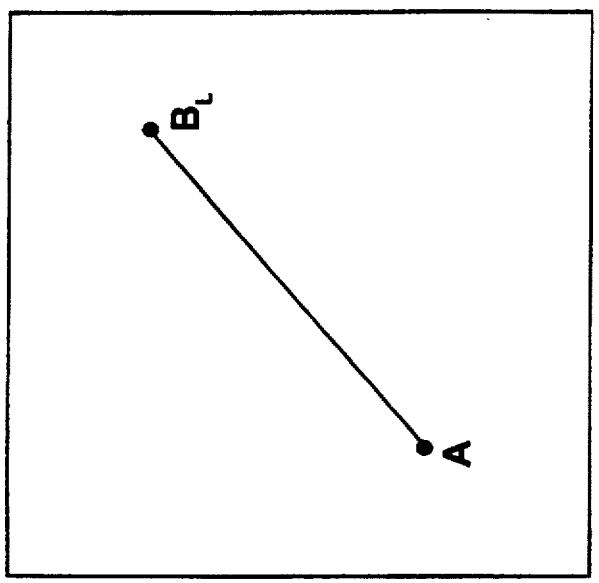

FIGS. 21a and 21b show the left and right images of a stereo image pair, respectively. The left image preferably consists of only the red color plane from the left image and right image preferably consists of only the green and blue color planes from the right image as discussed before. To make the left and right images epipolar, one identifies a point A which lies in the neutral plane. Since it lies in the neutral plane, there is no disparity shift between point A on the left image and point A on the right image. Point B, consisting of image point BL and BR from the left and right images, respectively, does not lie in the neutral plane and therefore the location of point B on the left image ($B_L$) is different from the location of point B on the right image ($B_R$). Since it is desirable that the image of point B on the right image have the same vertical displacement from the top of the image plane as point B on the left image to reduce user discomfort such as eye strain and headaches, it is necessary to calculate an amount of rotation required so that this can occur.

Figure 21C:
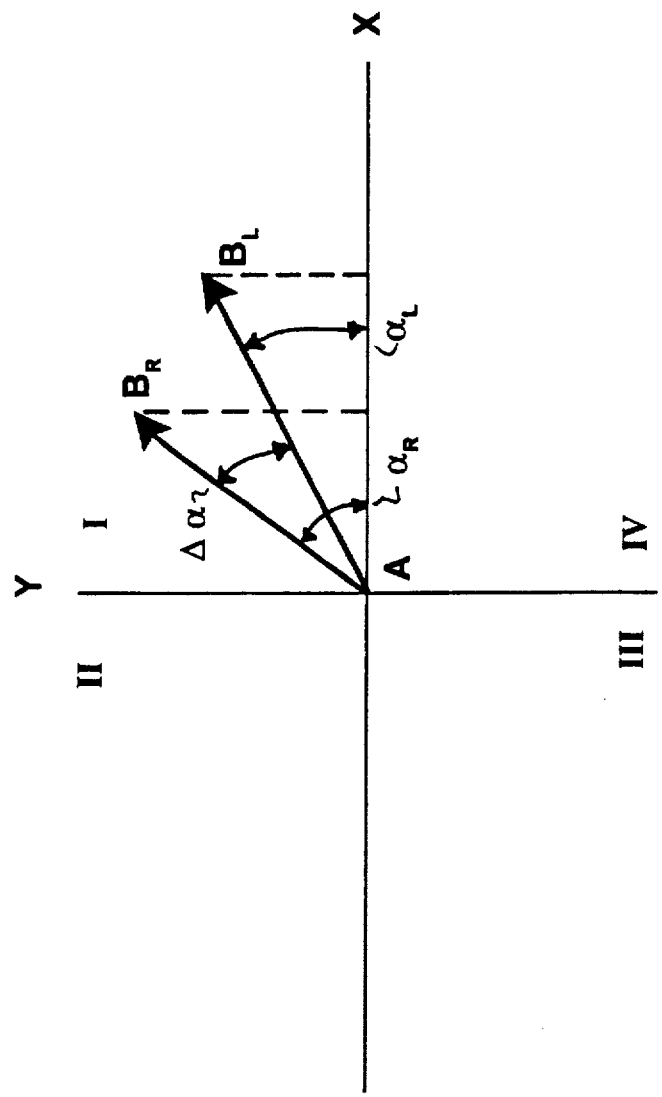

FIG. 21C illustrates this. As indicated, point A lies in the neutral plane and therefore there is no disparity with respect to the left and right images as to point A. If point A is treated as the origin of a coordinate system with axes running parallel to the axes of the image plane, then the amount of rotation required to the left image plane to produce the same vertical displacement as seen by point B in the right image plane about neutral point A is the amount $\Delta\alpha$. The angles $\alpha_R$ and $\alpha_L$ and $\Delta\alpha$ are calculated as shown in FIG. 11C.

A certain ambiguity arises when the vector $AB_L$ resides in a different quadrant from vector $AB_R$. Quadrants are labeled in FIG. 11C with Roman numerals. The signs of coordinates for points $B_L$ and $B_R$ determine the quadrant in which the vector $AB_R$ and $AB_L$ fall. In accordance with the following table:

| QUADRANT | Y | X |
|---|---|---|
| I | + | + |
| II | + | − |
| III | − | − |
| IV | − | + |

Vectors $AB_R$ and $AB_L$ lie in different quadrants, then there are two rotations which will result in the same vertical height, namely the Y component of points $B_R$ and $B_L$. One of those rotations is clockwise and one is counter clockwise. By examining the signs of the coordinates of points BR and BL, a simple decision can be made, for example, using a look-up table, to determine the direction of rotation required to place both vectors in the same quadrant.

Figure 22:
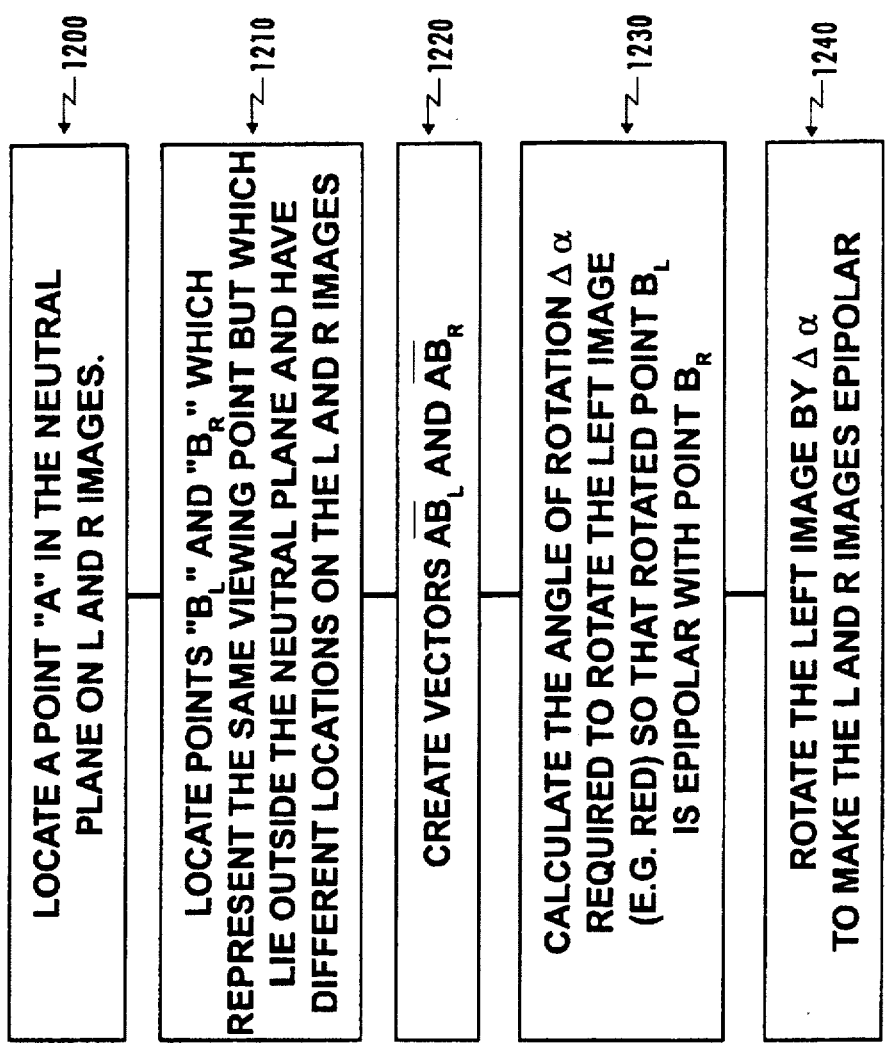
FIG. 22 is a flow chart for an algorithm for determining the amount of rotation required to achieve an epipolar condition.

FIG. 22 is a flow chart of the process of making the left and right images of a stereo pair equipolar. Step 1200 of point A is located in the neutral plane on the left and right images. At step 1210, one locates points "$B_L$" and "$B_R$" which represent the same viewing point but which lie outside the neutral plane and therefore have different locations in the left and right images. At step 1220, vectors $AB_L$ and $AB_R$ are created. At step 1230, the angle of rotation $\Delta\alpha$ is calculated as set forth in FIG. 11C and at 1240 the left image, preferably, is rotated by $\Delta\alpha$ 6to make the left and right images equipolar.

Figure 23:
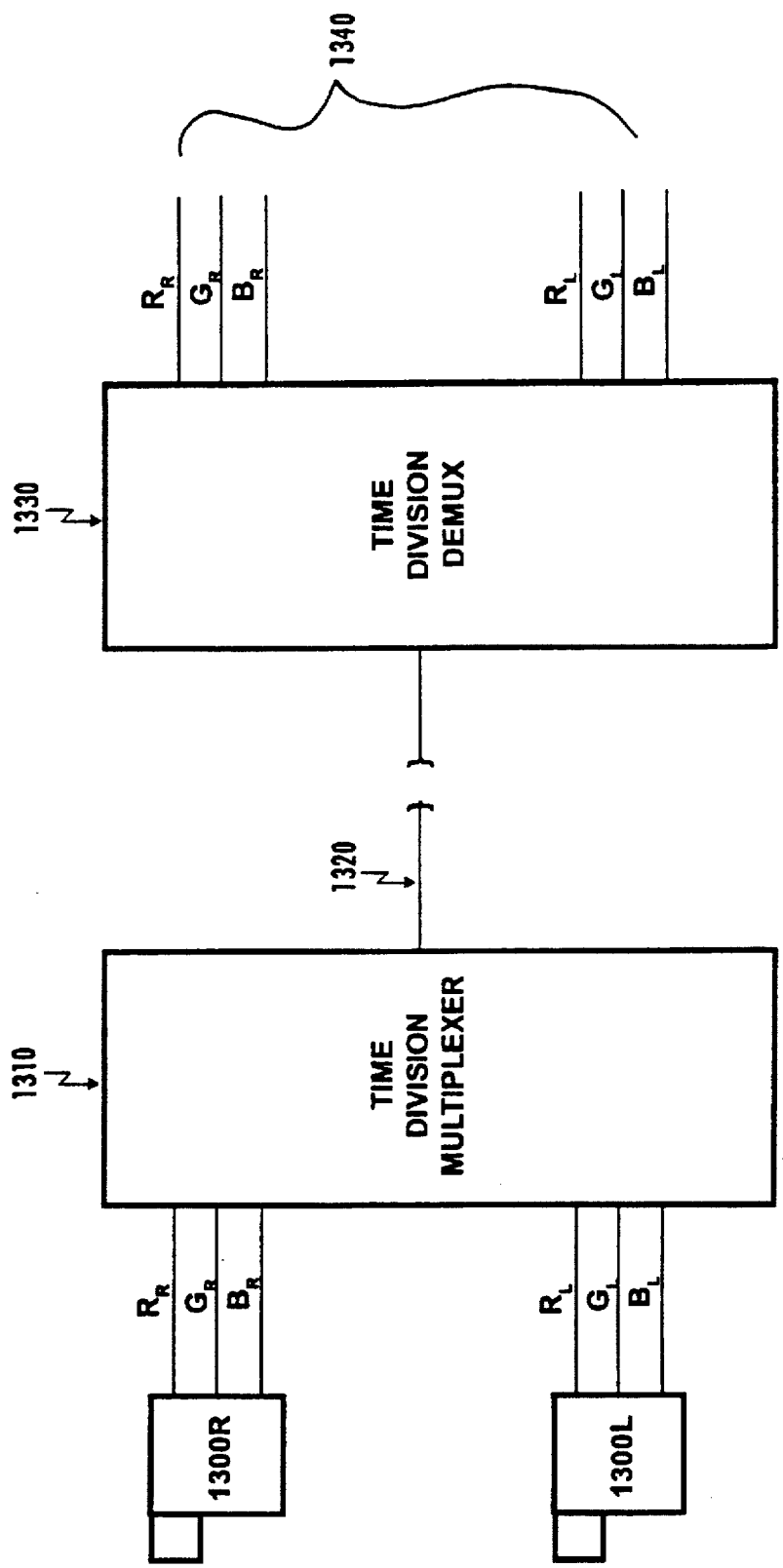
FIG. 23 illustrates time division color plane multiplexing using six color planes.

FIG. 23 illustrates a transmission technique for transmitting color plane information utilizing time division multiplexing. Left and right cameras 1300L and 1300R produce respective color plane outputs RGB which are fed to time division multiplexer 1310 where they are multiplexed and transmitted over a transmission length 1320 to time division demultiplexer 1330 where the color planes are again separated out. This particular arrangement is particularly advantageous because it allows one to achieve either full stereo three dimensional images, field sequential stereo images or color plane shift stereo images ($R_L$ $G_R$ $B_R$) at the output.

Figure 24:
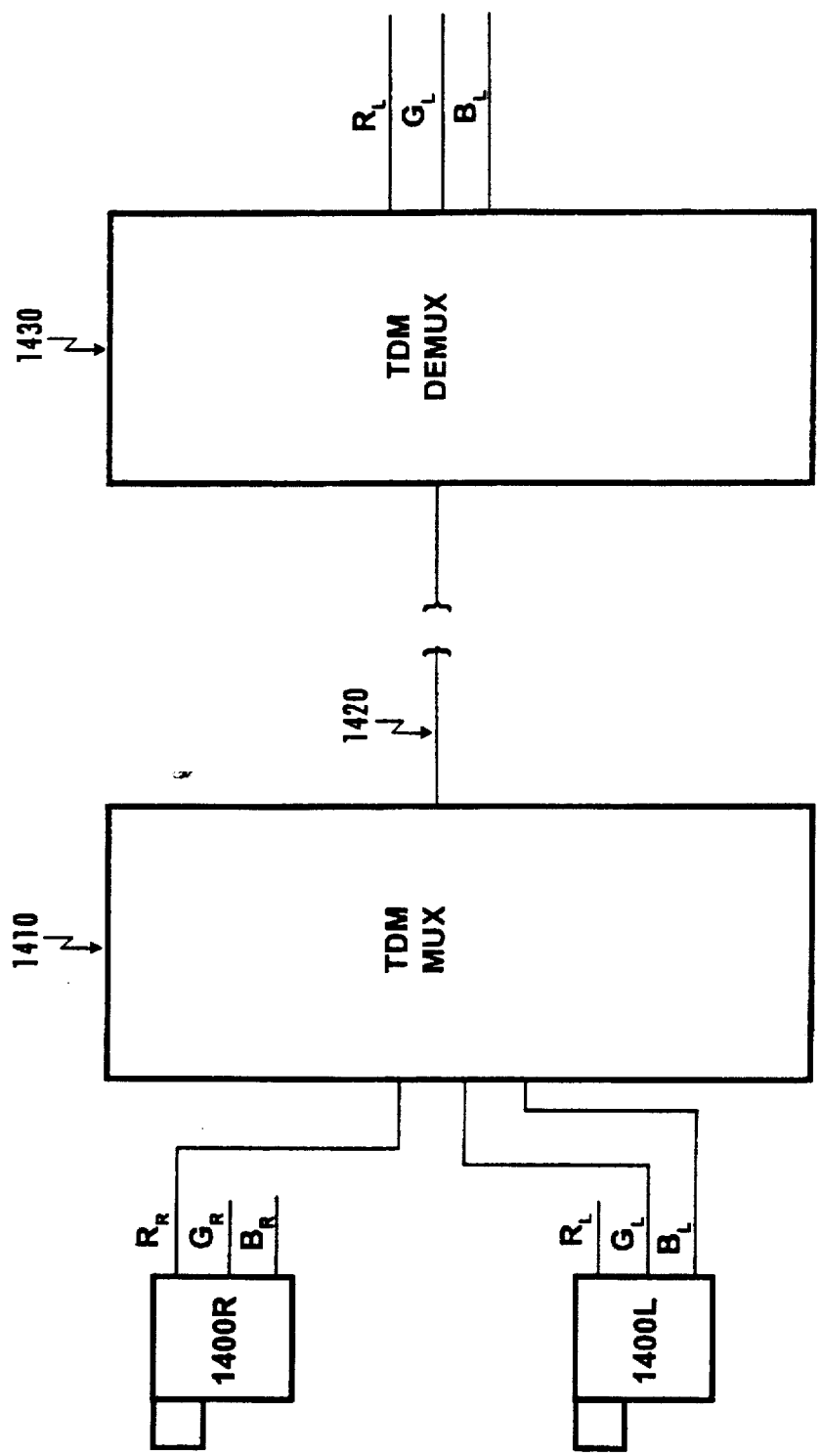
FIG. 24 illustrates time division color plane multiplexing using three color planes.

An alternative arrangement is shown in FIG. 24 where the color plane shift technique is applied prior to multiplexing so that only three channels are transmitted across the time division multiplex communication link 1420.

Figure 25:
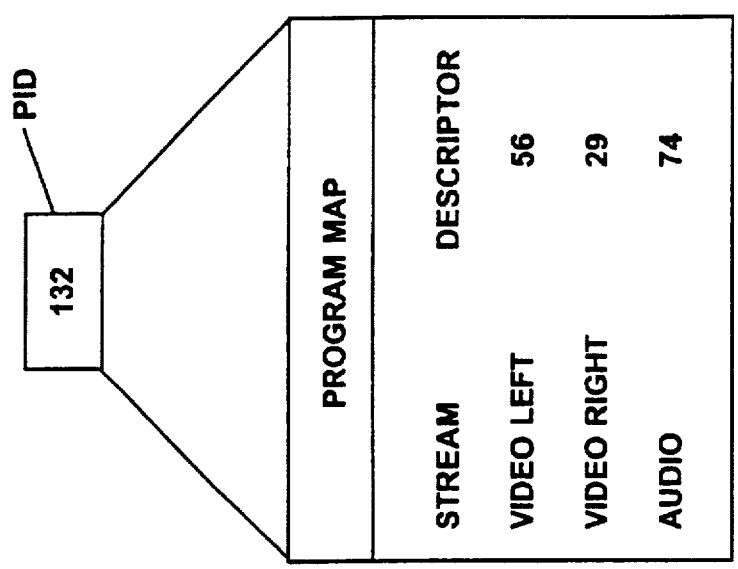
FIG. 25 illustrates the use of MPEG-2 to multiplex left and right video programs.

FIG. 25 illustrates one method of arranging a program map to accommodate stereo transmission using an MPEG-2 transmission link. In the program map shown as an expansion of PID 132 in FIG. 25, separate video streams for left and right video images are defined with their corresponding PID's. Thus, as shown, a full color video left channel is assigned to PID 56 and a full color video right channel is assigned to PID 29 with the audio channel for the stereo representation assigned PID 74. Referring the transport stream of FIG. 11, these PID's will be found in the transport stream as required to satisfy the band width requirements for the transmission. At the decoder, such as shown in FIG. 27 and discussed more in detail hereinafter, PID's are assigned to the appropriate video decoder or audio decoder for decoding and connection to the display devices.

Figure 26:
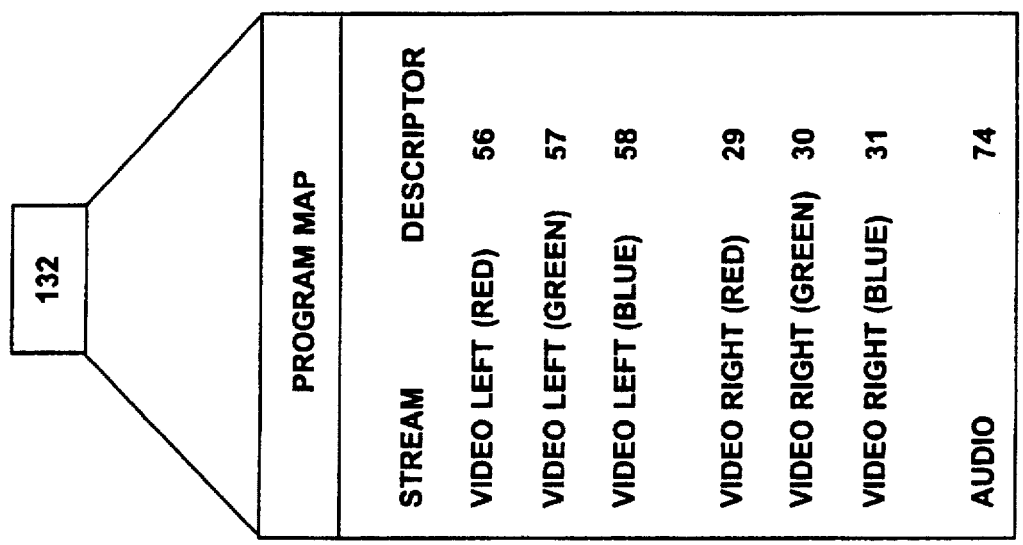
FIG. 26 illustrates the use of MPEG-2 for providing six separate color plane programs.

FIG. 26 shows an alternative method of assigning streams to the program map of PID 132. In this arrangement, PID's 56, 57 and 58 are assigned to respective red, green and blue color planes of the left video source and PID's 29, 30 and 31 are assigned to the respective red, green and blue color planes of a right video source. As before, audio channel is assigned PID 74.

Figure 27:
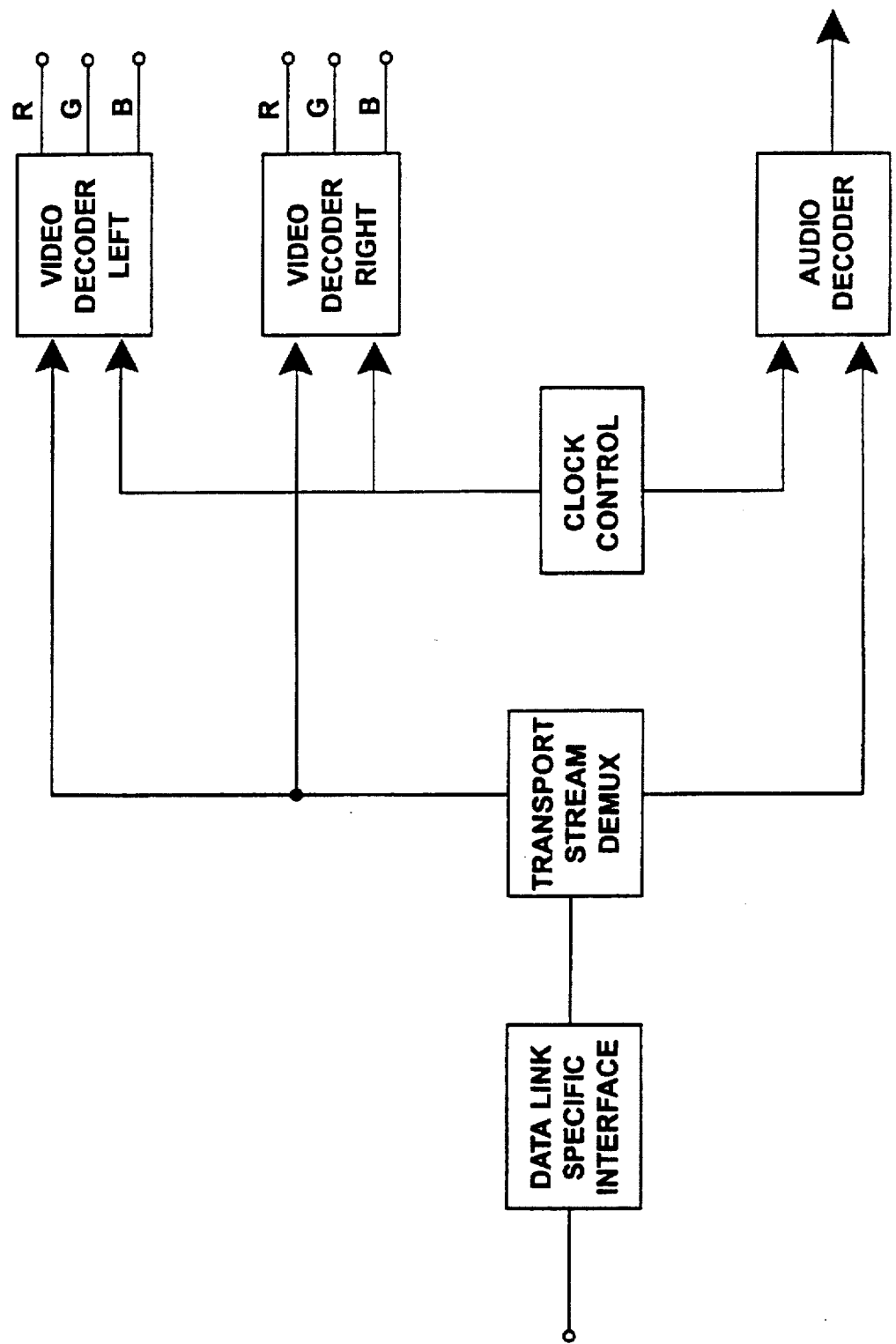
FIG. 27 illustrates an MPEG-2 decoder suitable for use with the invention.

FIG. 27 shows modifications of the generic MPEG-2 decoder illustrated in FIG. 2. If separate PID's are assigned to left and right video information as illustrated in FIG. 15, then video data packets will be routed from transport stream demultiplexer 1720 to respective video decoders 1730 and 1735 where video information from the appropriate PID will be processed. The output from video decoders 1730 and 1735 is shown in red green blue color plane form although a composite video signal could be used as an alterative. The use of separate color plane outputs is desirable because they permit the use of full stereo imaging as might be utilized with a "virtual reality" helmet having separate displays for each eye, or for field sequential display using a single display synchronized with, for example, liquid crystal glasses so that left images are visible in the left eye only when a left image is displayed and only in the right eye when a right image is displayed, or for switching color planes to form a color plane shifted stereo image.

If separate color planes are assigned separate PID's as illustrated in FIG. 26, then video decoder 1730 and 1735 would be modified to permit assignment of three PID's to each decoder with three output buffers to which packets arriving with particular PID's can be sent selectively so that red, green and blue output data appears at each of the outputs.

In certain software packages, three dimensional perspective views are generated from three dimensional wireframes. In the course of generating the perspective view, information is needed about the object location and the camera location and orientation vis-a-vis the object, referenced against some type of coordinate system. The identity of the object specifies essentially the work file containing the wireframe and other information. With such information available, it is possible to convert a three dimensional perspective view into a three dimensional stereo view. This is done by placing a second camera at a location offset from the camera location from which the perspective view is generated. A second camera position is then utilized to generate a second view of the object from the wireframe information. Once the wireframe generated by a second view of the object is generated, the original perspective view and the rendered second view of the object can be utilized to produce a three dimensional stereo view of the object in the way indicated above.

Alternatively, a camera location from which the perspective view was generated can be utilized as a center point and two cameras can be set symmetrically about that center point, each camera would then generate a view of the object from their respective positions. Once the respective views were rendered with surface information, they constitute a stereo image pair to which the techniques described in this application can be applied. Preferably, the two cameras positioned symmetrically about the camera location from which the perspective view is generated will have fixed parallel optical axes and fixed orientations.

Some software packages specify the location of a targeted object with respect to the same coordinate system. It is desirable to adjust the disparity so that the targeted object lies in the neutral plane. Preferably, this is a default setting which can be overridden by adjusting disparity in ways indicated herein.

Figure 28:
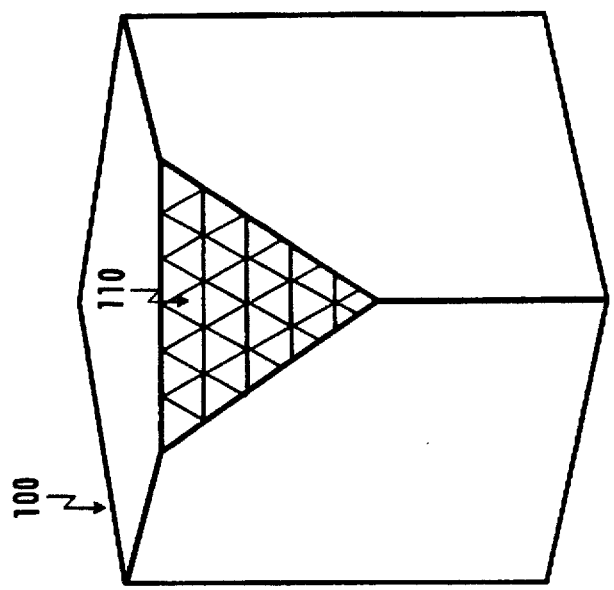
FIG. 28 is a 3-dimensional object with one surface illustrated as a wire frame.

FIG. 28 illustrates a 3-dimensional cube 100 with one corner removed. All of the surfaces except for the surface exposed at the removed corner are depicted as if the wire frame underneath had already been covered with a surface skin. Surface 110, however, is illustrated as a wire frame without any covering skin. The wire frame defines the shape of the 3-dimensional object and rendering produces a covering for the shape defined by the wire frame.

Figure 29:
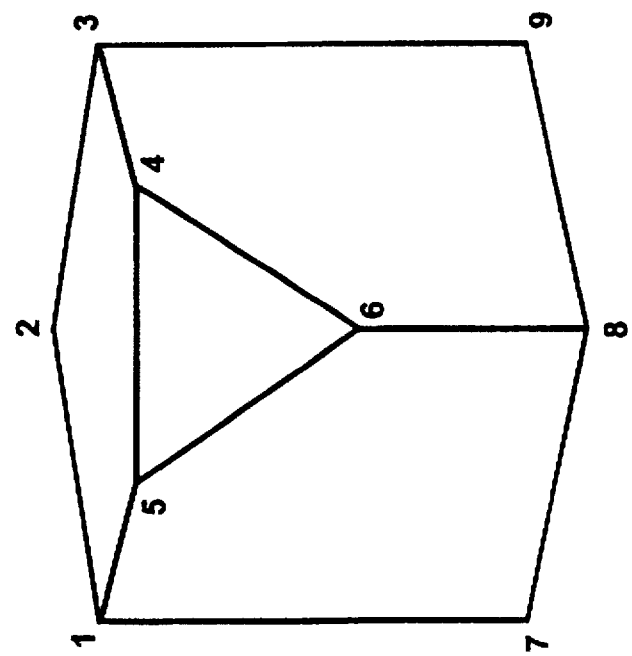
FIG. 29 contains a left and a right image of an image pair used to illustrate the invention.
Figure 29:
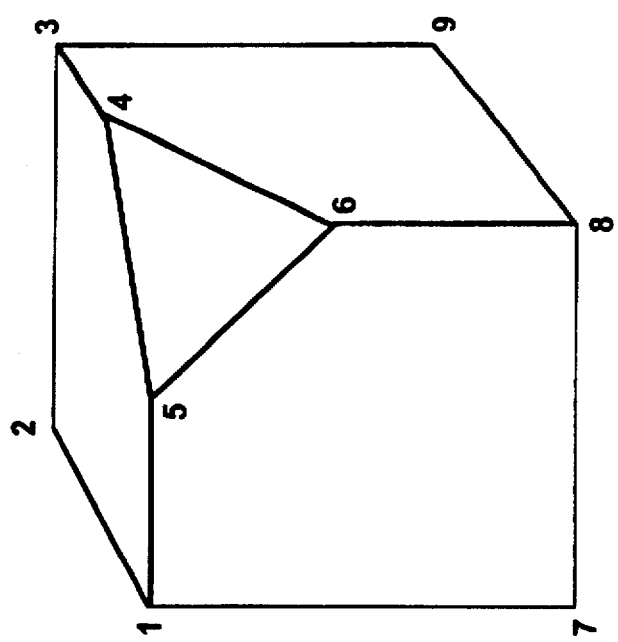

FIG. 29 illustrates left and right images of a common scene, viewed from different perspectives. Each image of the image pair is preferably a high resolution electronic image such as might be captured with an electronic still camera or with frame grabbers from a video camera in the manner set forth in U.S. patent application Ser. No. 08/318,247 referred to above. Preferably the images are captured using a single camera operated from two different, known positions. The camera settings and orientations are preferably also known since calculations are thereby simplified.

Corresponding points on the left and right versions of the images are identified sequentially such that point 1 is identified in both left and right images, followed by point 2 in the left and right image, followed by point 3 in the left and right image and so forth. The first three pairs of points are utilized to define a calibrated target and are also define a coordinate system in 3-dimensional object space which serves as a reference point for all other points on the image.

Surfaces are defined by selecting points which define a closed path in a single plane. Even in regions which are highly non-planar, substantially planar regions can be identified by specifying smaller and smaller regions until the variation from truly planar is insignificant. In the example shown in FIG. 2, points are selected in the number order illustrated. The following closed paths are defined in order:

---
1–2–3–4–5
4–5–6
1–7–8–6–5
3–4–6–8–9
---

Each closed path is called a pixel panel. The selection of points occurs in the traditional way by selecting a point with a cursor and by clicking on the point. It should be clear that an arbitrary curvilinear line may be approximated by a series of points along the line. The more points per unit of length, the smoother the approximation would be.

From the left and right views, which are respective 2-dimensional representations of the object viewed from different perspectives, depth information, Z, can be calculated as set forth in the above-identified patent application Ser. No. 08/318,047.

The calculation of vertices for the wire frames is well known in the art. One way for doing that using left and right images from an image pair such as shown in FIG. 29 as set forth in patent application Ser. No. 08/318,047 referred to above.

Figure 30:
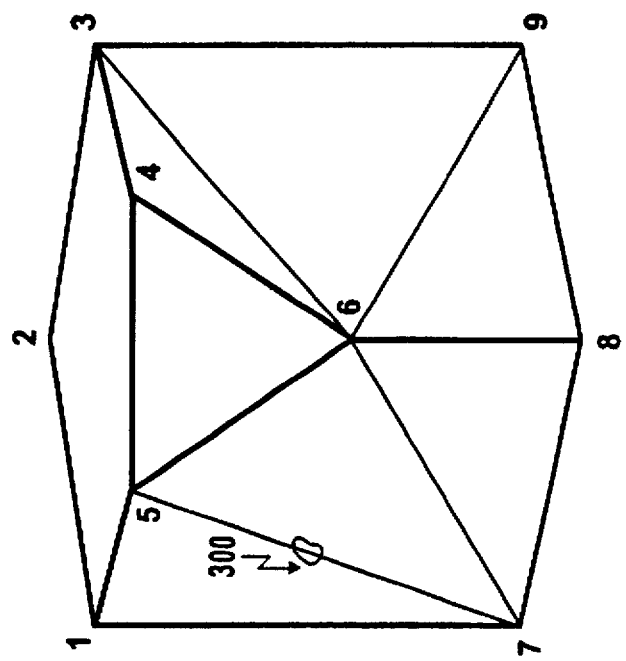
FIG. 30 partitions the pixel panels of the images of FIG. 2 into triangular surface elements.
Figure 30:
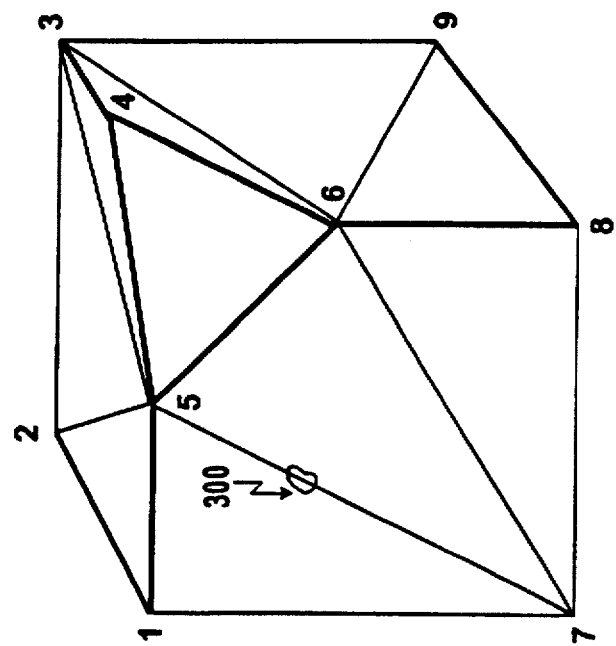

Once the shape of an object has been represented in a wire frame, each pixel panel is partitioned into triangular surface elements as shown in FIG. 30.

Although in the preferred mode, these polygons are triangular, in other modes, they may be rectangular, hexagonal or the like. A triangular polygon is preferred because the three vertices are guaranteed to lie in a plane. When using polygons of order greater than three, special steps may be required to ensure that all of the vertices lie within a common plane.

Essentially, higher order polygons can be reduced to triangles (polygons of order 3) for convenience in processing. For later reference, surface irregularity 300 exists along the line joining vertices 5 and 7 of the left and right images of FIG. 30.

As shown in FIG. 30, the pixel panels of FIG. 29 are partitioned into triangular regions or surface elements. Preferably this is done automatically. For example, points 1, 2, and 3 of FIG. 2 would be selected and XYZ coordinates stored for the vertices of the triangle 123. A second triangle then could be selected by choosing sequentially points 3, 4 and 5. A third triangle on the upper surface could be identified as points 1, 5 and 6 as a process of triangular partitioning of the surface would continue until all of the surface triangles were defined. Referring to FIG. 30, the following triangular surface elements are associated with the corresponding pixel panels as follows:

pixel panel 1 triangle 125
pixel panel 1, triangle 235
pixel panel 1 triangle 345
pixel panel 2, triangle 456
pixel panel 3 triangle 157
pixel panel 3, triangle 567
pixel panel 3 triangle 678
pixel panel 4, triangle 346
pixel panel 4 triangle 369
pixel panel 4, triangle 689

As shown in FIG. 31, the database includes field 400 which stores vertex identification numbers, field 410 which stores the coordinates of each vertex in object space, field 420 which indicates, if that vertex is the first vertex of a triangle, the identity of the triangle and field 430 which stores a pointer which points to the location of a bit map of pixels. Preferably, the pixels are stored as 24 bit color pixels.

The pointer may point to any one of several possible sources of pixels for inclusion in a surface rendering. One option is to point to the triangular area of one of the left or right images of the image pair from which the wire frame is created. Another option is to point to a separate storage area where normalized (direct frontal view) bit maps for each triangle are stored. Another option is to point to a higher resolution version of the image used to create the wire frame. Still another option is to point to a totally unrelated pattern which might be useful in creating special effects.

By storing such a pointer, the actual pixels from an original image can be stored for use in creating a photo realistic surface to be applied to the wire frame at the triangle's location. Thus, by associating in a database bit maps from an image with surface elements of the wire frame, the bit maps can be applied directly to the triangles in a very quick fashion. However, when the wire frame is rotated, the shape of the triangle changes and corresponding changes, set forth hereinafter, need to be made to the bit map stored for rendering.

With data arranged thus, whenever the position of a wire frame is transformed from one orientation to another, the new position can be quickly and automatically rendered by merely transforming the stored bit map as set forth herein to map the pixels from the stored bit map to the screen resulting in capture of all the detail originally contained in the original images. Surface irregularity 300 shown in FIG. 30 would be captured by this technique whereas it would be lost by prior art rendering packages.

The benefits of the invention are particularly noticeable in an animation application where changes to the wire frame can be automatically covered with a surface. In animation, when changing views, it may be necessary to abruptly change the image selected as the source of the bit map. To smooth this transition, one may prefer to morph from one bit map to another.

Figure 32:
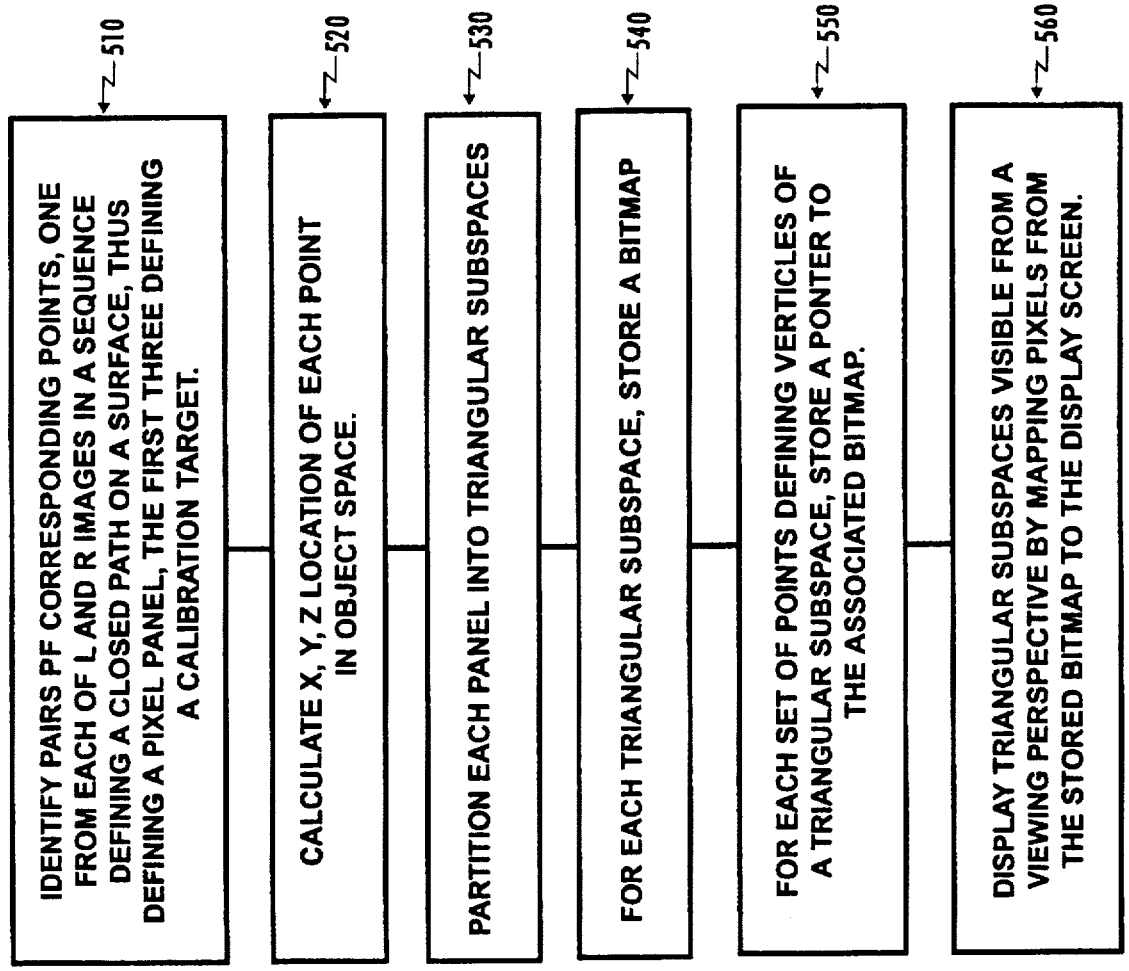
FIG. 32 is a flow chart of the preferred technique for creating a wire frame and rendering it.
Figure 33:
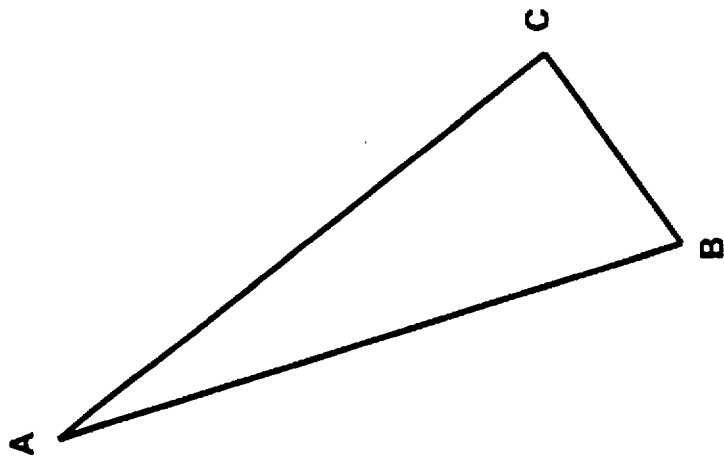
FIG. 33 depicts a triangular surface element before and after a perspective change.
Figure 33:
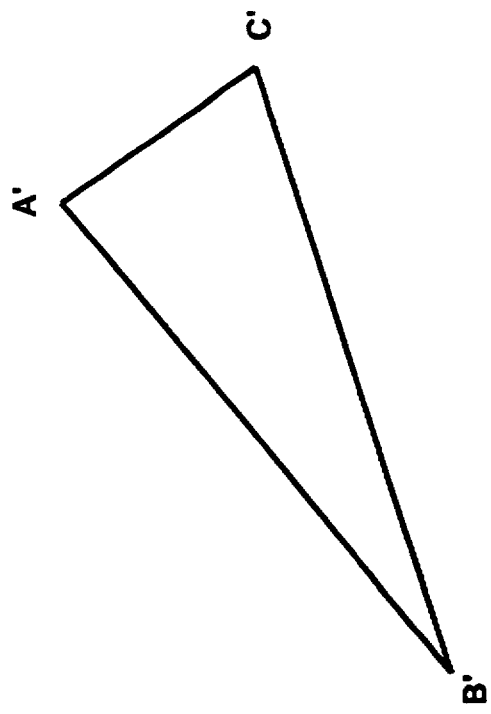
Figure 34:
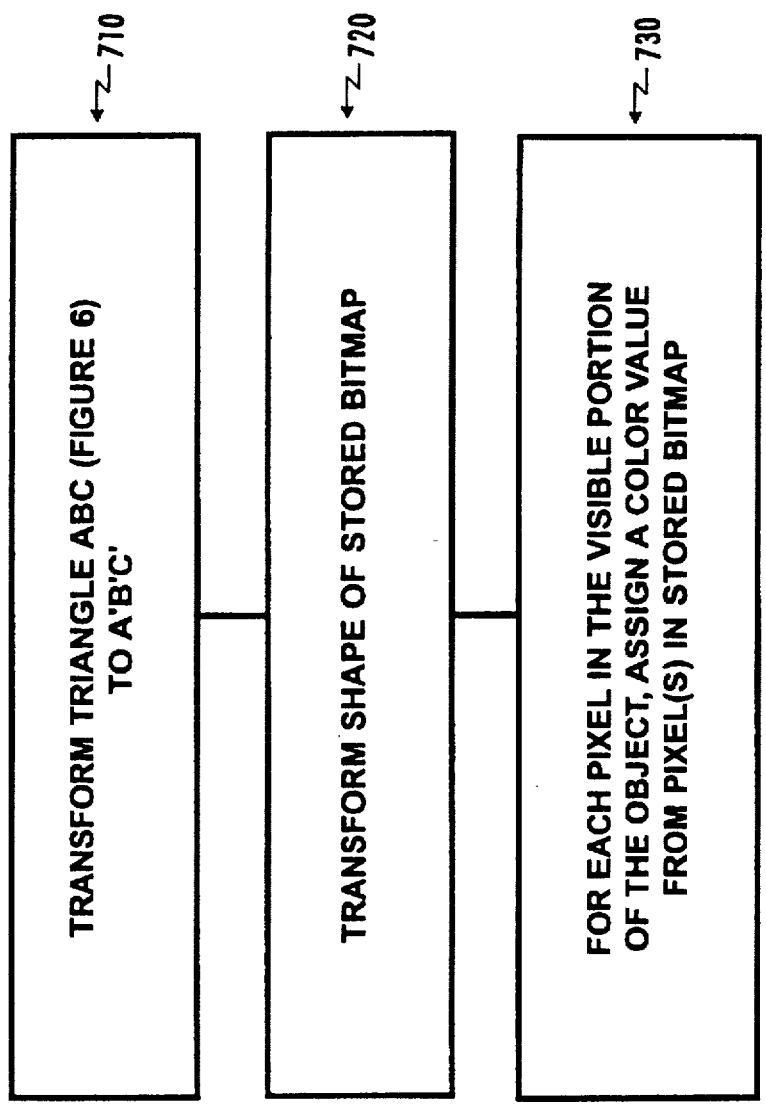
FIG. 34 is a flow chart of how to transform one triangle of a 3-dimensional object and render the transformed triangular surface element.

A flow chart of the process just described is shown in FIG. 32.

When a wire frame is subject to an image transformation, such as rotation, the perspective view of the triangle changes resulting in a different shape when projected on to the viewing plane. Thus, points ABC of a triangle element of a wire frame may be translated into points A', B' and C' as shown in FIG. 6. Thus, the pixel address for points ABC are translated into different pixel addresses for points A'B'C'. The techniques for transformation are well known in the art. For example, such techniques are found in Mathematical Elements for Computer Graphics, second edition, by David F. Rogers and Alan Adams published in 1990.

The following procedure is followed to define pixels for line segments (vectors) corresponding to sides of a triangle. For each Y value, $Y_i$, representing a row of pixels including $Y_A$, $Y_B$ and Y values in between, where $N=(Y_B-Y_A)/R_Y$, and where $R_y$ represents the resolution in the Y direction, calculate:

$$X_i=(Y_B-Y_A)/m=(Y_B-b)/[(Y_B-Y_A)/(X_B-X_A)]=[(Y_B-b)/(X_B-X_A)]/(Y_B-Y_A)$$

$Y_i$=address of a vertical row of pixels

Thus each adjacent pair of vertices of triangle ABC forms a line segment or vector. Solving for b for each pair results in three sets of XY pairs defining the sides of the triangle.

To get the color value of the pixels, for each pixel having an address such that $$X_{min}<X<X_{max}$$

and $$Y_{min}<Y<Y_{max}$$

determine if a pixel is a pixel interior to the triangle by determining if the following inequalities are simultaneously satisfied:

$$Y<m_{AB}X+b_{AB}$$

$$Y<m_{AC}X+b_{AC}$$

$$Y>m_{BC}X+b_{BC}$$

If a pixel is interior, assign a color value to it as follows:

Take the color value from the pixel or set of pixels near point X,Y (defined next) in the stored bit map and assign it to pixel X'Y' in the transformed space. Preferably, the color value is an average of color values of pixels in the neighborhood of X,Y in the stored bit map. The values for X, Y are:

$$X=[(X'-X'_{min})/(X'_{max}-X'_{min})](X_{max}-X_{min})!_{int}$$

and $$Y=[(Y'-Y'_{min})/(Y'_{max}-Y'_{min})](Y_{max}-Y_{min})!_{int}$$

where $!\ldots!_{int}$ stands for the "integer value of" operator.

It may be that in some views, certain surfaces are viewed so obliquely that very few pixels are available to form a bit map for that surface. Under such circumstances, it may be desirable to select the view of the surface from the left or right image which is most nearly normal to the viewing plane.

Figure 35:
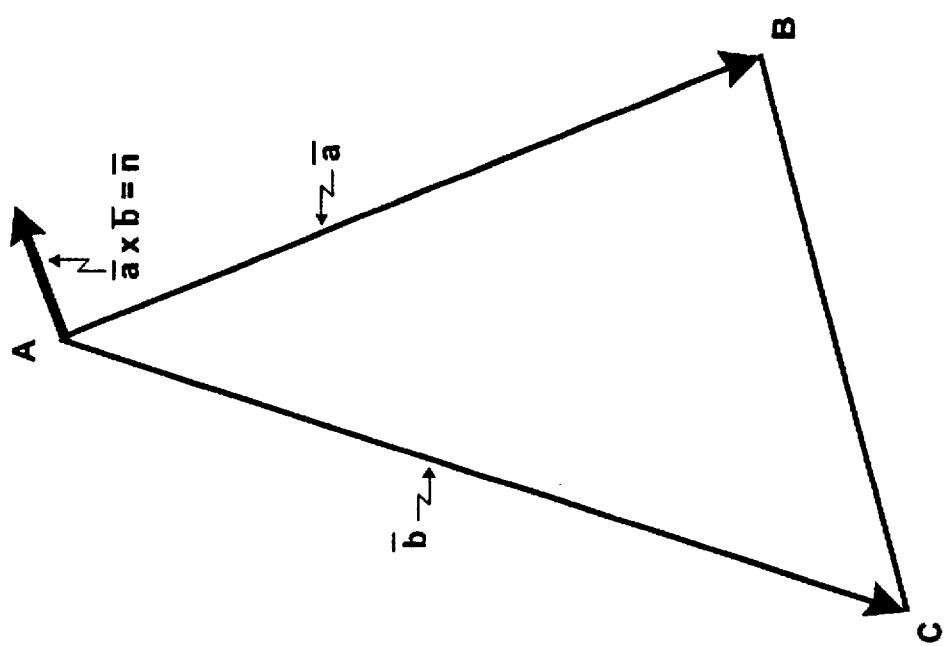
FIG. 35 illustrates how to calculate a normal vector for a triangular surface element.

Since the coordinates of the vertices in the wire frame representation are known, the sides of a triangle may be represented in vector form. By taking the cross product of two vectors from adjacent sides of the triangle as illustrated in FIG. 35, one obtains a perpendicular vector which can be normalized. By taking a dot product of a vector normal to the triangle with a vector normal to the viewing plane, one can determine whether or not the bit map from the left image or the right image is more normal to the viewing plane. Specifically, the dot product of two vectors is an indication of the cosine of the angle between the vectors. Thus, by forming the dot product of a unit vector generated by the cross product of two sides of a triangle from each of the left and right views of the same triangle, with the vector normal to the viewing plane, and by choosing the largest value (closer to 0 angle) one can select the most normal bit map for inclusion in the rendering database.

Figure 36:
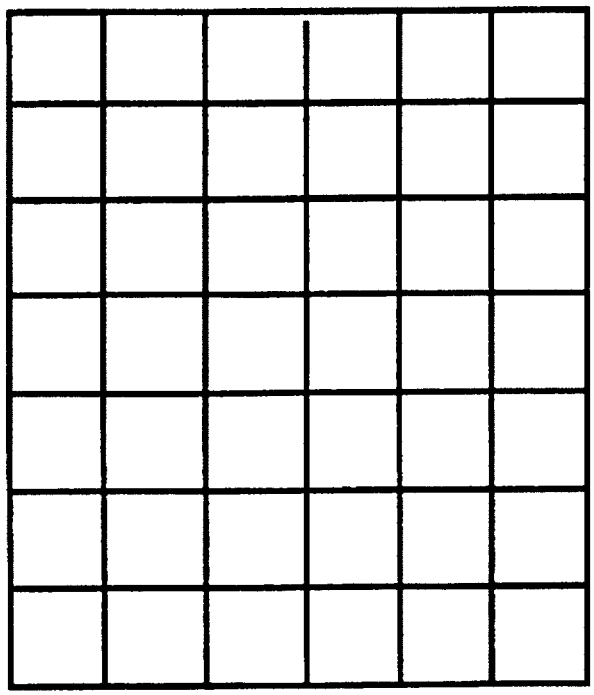
FIG. 36 shows a use of the invention in performing special effects image transformations.
Figure 36:
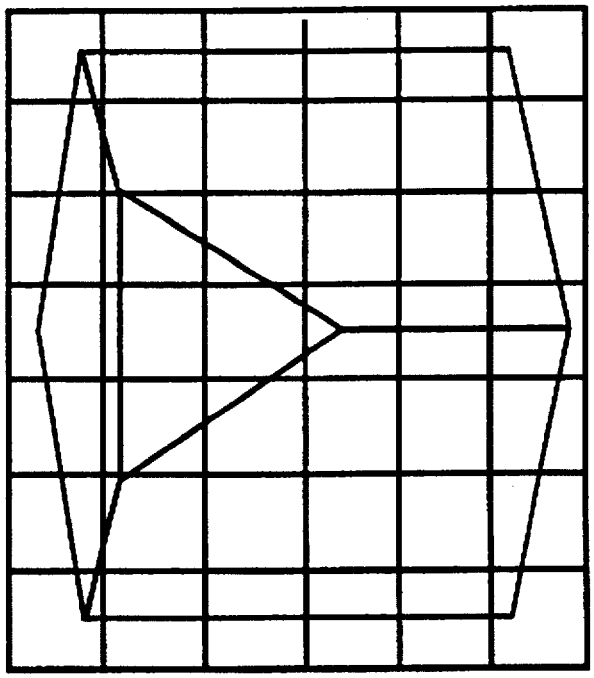

The pointer used in pointing to bit maps from a photographic quality image can also be used to point an unrelated image. This is illustrated in FIG. 9 where the right image has been replaced with an arbitrary plaid pattern. In FIG. 36 it is possible to apply the pattern from the right image selectively to all pixels within the image displayed on the left view. When initially done, each triangle would reflect bits which form part of a complete pattern. However, each of those pixels is associated with the triangular surface element of rendering database. As the object rotates or moves, the surface triangles would be transformed into different positions and shapes and the boundaries between the triangular regions would become apparent as a translation and rotation became more and more severe. As a result, an image which was originally indistinguishable from a background pattern will emerge as the 3-dimensional representation of the wire frame becomes distinct from the background.

Figure 37:
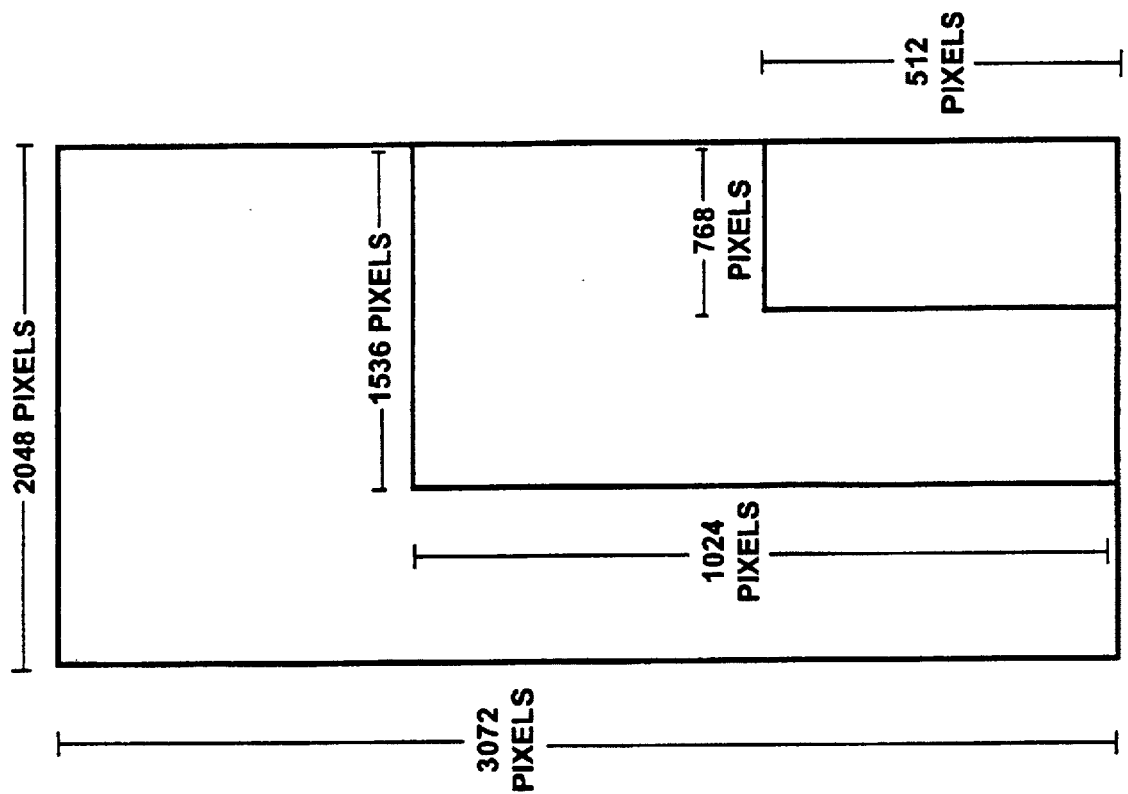
FIG. 37 shows how the same image may be available in versions of different resolution.

One feature of the invention relates to the resolution at which the bit maps are stored. As shown in FIG. 37, although images displayed have only one resolution, the image may well be stored at one or more different resolutions. Thus, resolutions at 2 times, 4 times and 16 times the display resolution may be available for selecting pixels values for surface rendering with 3-dimensional wire frame. Thus, very precise shading can be obtained by using various averages of pixels over a desired resolution.

By associating bit maps of photographic quality with surface elements of a wire frame, one can achieve photo-realistic rendering of wire frame computer representations of 3-dimensional objects. It also allows the rendering data base to be captured as part of image processing which relates to capture of the wire frame. As indicated herein, the disadvantages of the prior art are thus overcome resulting in a rendering tool which provides very fast rendering of 3-dimensional wire frames regardless of their orientation.

The invention is based in part upon the realization that, when viewing 3-dimensional images, a loss of depth perception ensued when zooming-in on portions of the image. Subsequent work indicated that many of the problems related to the issue of disparity. As noted above, disparity is a measure of the amount of displacement between corresponding points of an image presented to the left eye via a vis points on an image presented to the right eye. This is illustrated in FIG. 38.

Figure 38:
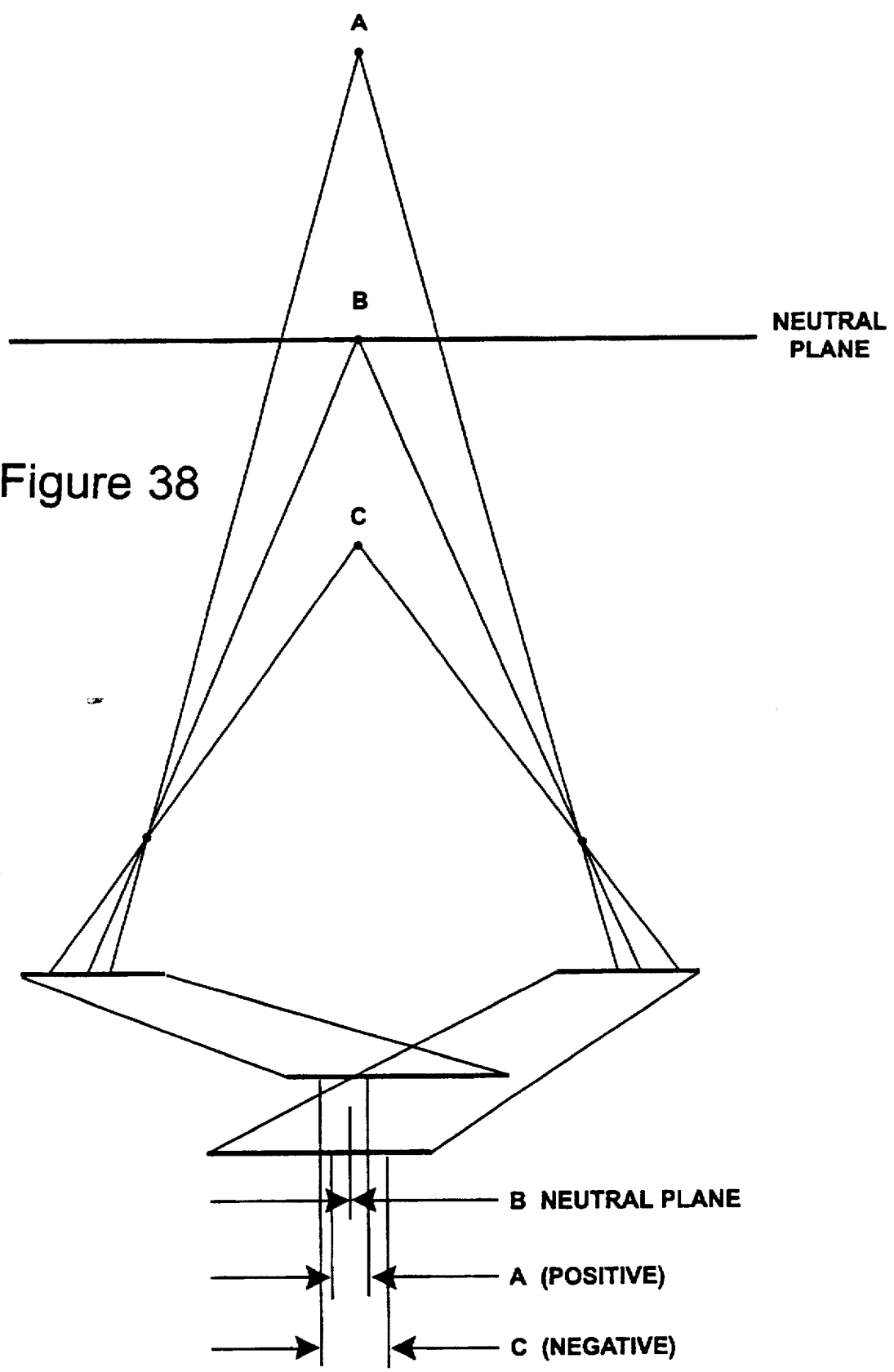
FIG. 38 is an illustration of disparity variations as a function of distance from the neutral plane.

In FIG. 38, a neutral plane is defined as running through point B. Point A is located behind the neutral plane and point C is located in front of the neutral plane when viewed from focal points 100 and 100'. The projection of points A, B and C through the respective focal points onto focal planes 110 and 110' results in points $A_L$, $B_L$, $C_L$, $A_R$, $B_R$ and $C_R$. Focal planes 110 and 110' are shown transposed so as to be vertically disposed with respect to each other. The distance between the image of points A, B and C on the left image plane and points A, B and C on the right image plane are illustrated. The measure of the distances A, B and C shown beneath the vertically aligned focal planes is measure of the disparity. As can be seen in FIG. 1, the further a point is from the neutral plane, the greater the disparity is.

At some point, the disparity becomes so great that a viewer is incapable of recognizing the depth information and fusing the two images into a single 3-dimensional view. As a point regresses further behind the neutral plane, the angular difference between points separated by a unit distance becomes progressively less and so a big difference in depth will result in a smaller angular displacement on the focal planes on which points far behind the neutral plane are projected. This results in a loss of depth detail at far distances behind the neutral plane.

The inventors have discovered that both of these problems can be overcome by allowing the user to control or adjust the amount of disparity between corresponding points on the two image planes. This principle is applicable to all stereo viewing systems and not just to those using color viewers.

For example, if distance B shown at the bottom of FIG. 38 represents the amount of disparity at a neutral plane, and if the amount of disparity shown at C was so great as to result in a loss of depth perception, depth perception can be restored by shifting image plane 110 vis-a-vis image plane 110' so that the distance C between corresponding points is reduced to that of distance B, i.e. to a position on the neutral plane.

Figure 39:
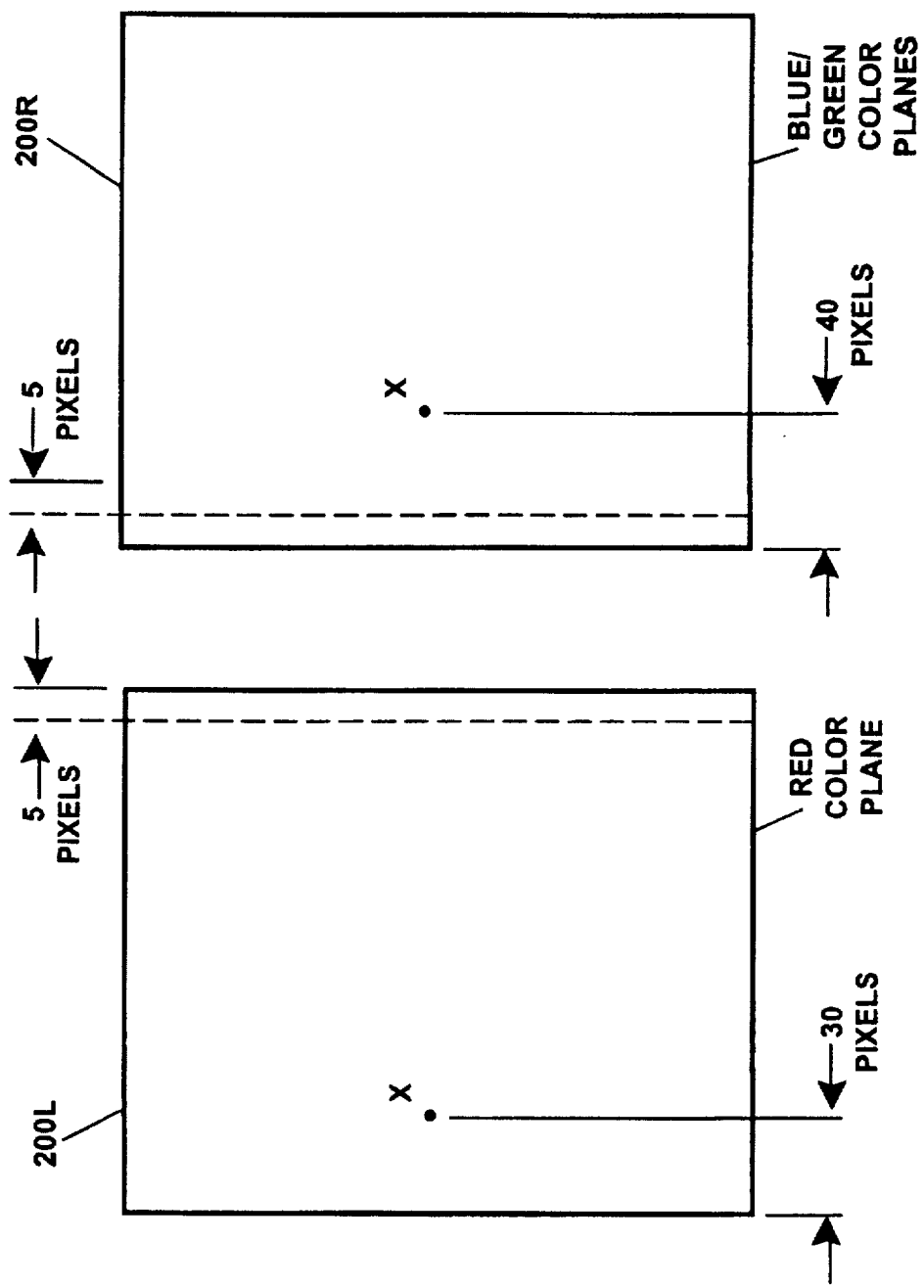
FIG. 39 shows the cropping of two image planes to vary the amount of disparity.

FIG. 39 shows at a high level how this may be done. FIG. 39 illustrates two color video images 200L and 200R which were captured by left and right digital cameras, such as video cameras or digital still cameras. In creating three dimensional images, it is convenient to utilize, as set forth in one of the above patent applications separation of left and right images into color planes as shown. Image 200L constitutes the red color plane from the left camera and 200R constitutes the blue and green color planes from the right camera. When combined, into a three color plane representation, three dimensional images are produced and are viewable using standard red-blue viewers. This particular technique preserves color information as indicated in the aforesaid co-pending application. As shown in FIG. 39, the left and right views of point X are located 30 and 40 pixels displaced from the left edge of the image as indicated. There is thus a 10 pixel disparity between the position of the left and right points. By shifting the color planes so that the image 200R is displaced 5 pixels to the left and by shifting the image 200L 5 pixels to the right, the two views of point X will exactly coincide or, in other words, point X will lie in the neutral plane when viewed. FIG. 39 illustrates that the shifting is accomplished by truncating the image by 5 pixels on the left side of image 200R and by 5 pixels on the right side of 200L. Although not required, this is done because some image processing packages require that both images be of the same size in order to combine them.

Figure 40:
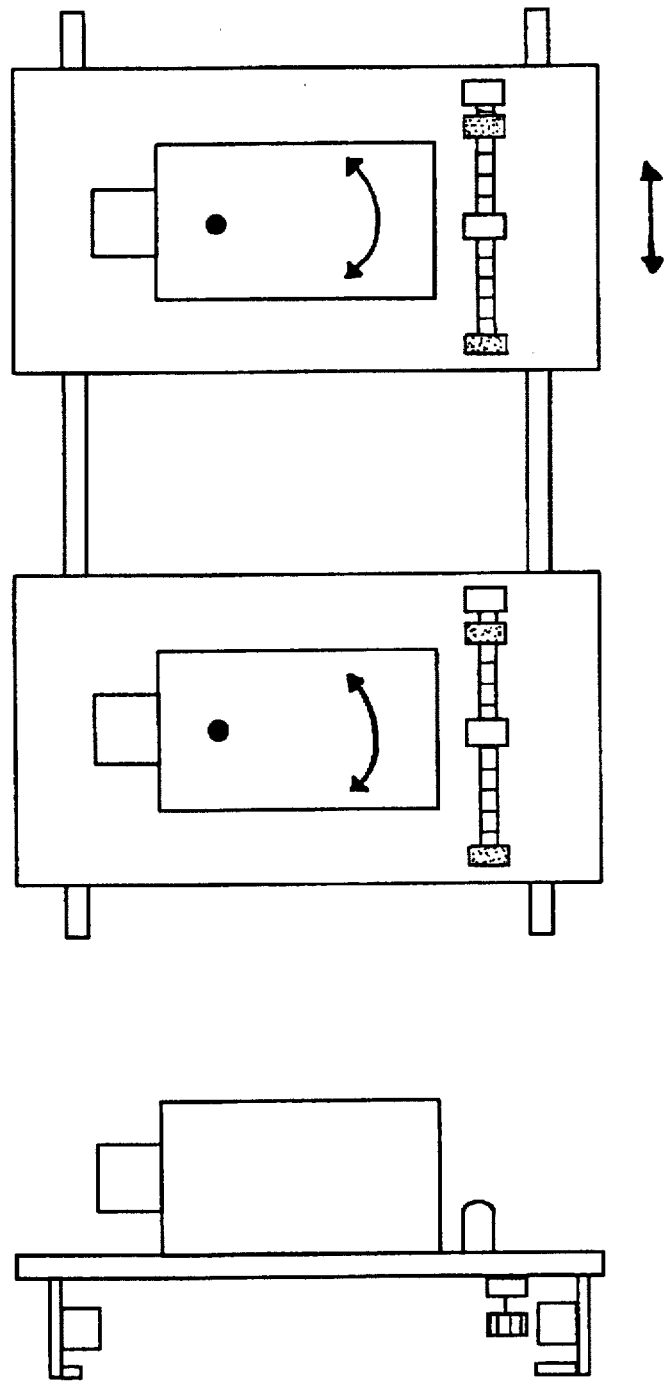
FIG. 40 illustrates two cameras used for capturing 3-dimensional images which are adjustable to control tow-in or horizontal displacement from each other.

Disparity adjustment may occur manually. FIG. 40 illustrates two different ways in which disparity adjustment can occur.

Disparity can be adjusted by changing the toe-in angle between the two cameras 300 and 300'. Each camera is illustrated as being mounted on a pivot point 320 or 320' and the angular orientation of a camera is adjusted by screwdrive 330 which moves the rear end of the camera vis-a-vis points 335A and 335B. Even if this were not required for disparity adjustment, it would be a useful mounting for ensuring parallel alignment of the two cameras.

The other method involves changing the separation of the cameras 300 and 300' by moving one with respect to the other along rails 340 and 340'. As shown in the left hand view of FIG. 3, the inner part of rail of 340' has teeth 345 which constitute part of a rack-and-pinion drive. The pinion 360 is driven by servo motor 350 to permit the entire platform to move vis-a-vis the other camera.

In the prior art, three dimensional cameras utilized fixed focal length lenses. That is, the focal length could not vary to permit a zooming function. This is somewhat inflexible since in standard movie or video making, zooming is a very convenient tool for the camera man. If one image of a stereo image pair were larger than the other by virtue of different settings of a zoom lens, image offsets would occur which would interfere with human perception of depth, and thus the stereoscopic effect would be lost.

Figure 41:
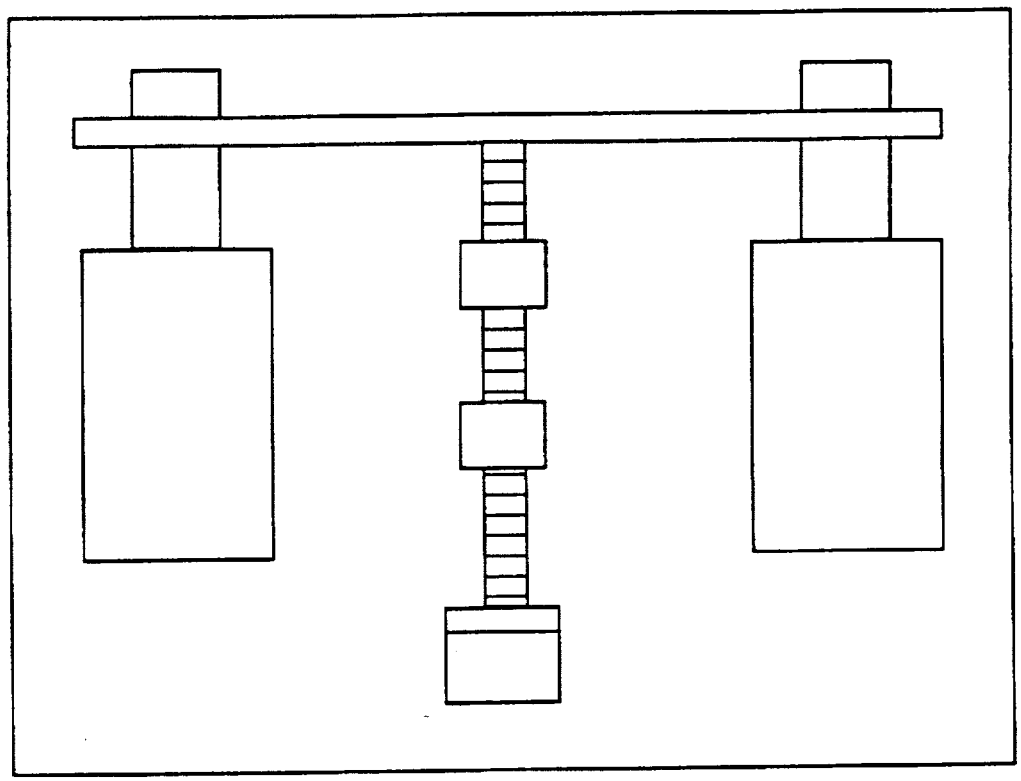
FIG. 41 shows two cameras for capturing 3-dimensional images which have zoom lenses control simultaneously.

FIG. 41 illustrates one mechanism for permitting zoom lenses to zoom in synchronism so that the integrity of the three dimensional resulting image is preserved. Cameras 400 and 400' are each equipped with zoom lenses 410 and 410', respectively. A cross member 420 engages both lenses 410 and 410' in such a way that motion imparted to one is also imparted to the other. Member 420 is driven by either a rack-and-pinion driven arm 430 or by a screw mechanism utilizing servo motor 440 with optional gearbox 450. Thus, when the arm 430 is displaced by the servo motor, zoom lenses 410 and 410' move in synchronism in and out depending on the direction of actuation.

Individual stepping motors can be used to control the zooming of individual lenses. One lens is the master, the other the slave. A combination look up table tells the slave how many steps to move relative to the movement of the master.

Figure 42:
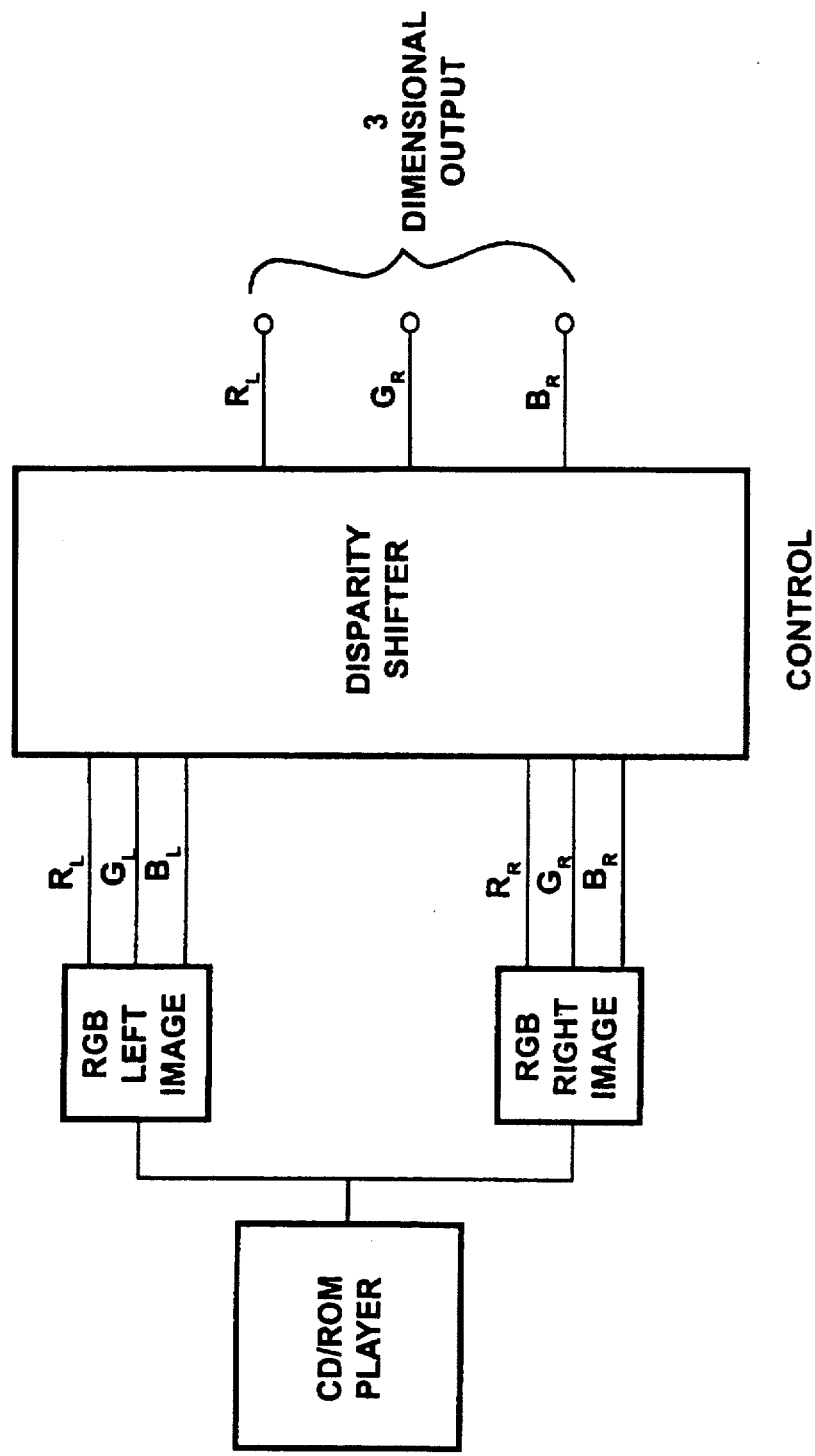
FIG. 42 shows disparity adjustment when displaying right and left static images from a storage medium.

FIG. 42 illustrates an arrangement for displaying three dimensional images which have been stored in storage such as a CD ROM. CD ROM player 500 serves left and right images of a stereo image pair. These are read into respective left and right image buffers 510 and 510'. The images are stored and the image buffers accommodate full color images, typically in 24-bit format with 8 bits of each format constituting, for example, red, green and blue image planes. Image buffers 510 and 510' output their respective image planes to disparity shifter 520. Disparity shifter 520 is described in more detail hereinafter. Again, in keeping with the disclosure of the aforesaid co-pending patent application, the red image plane of the left image is combined with the green and blue image planes of the right image to produce a composite three dimensional image. Disparity shifter 520 allows the left and right image planes to be shifted relative to each other.

Figure 43:
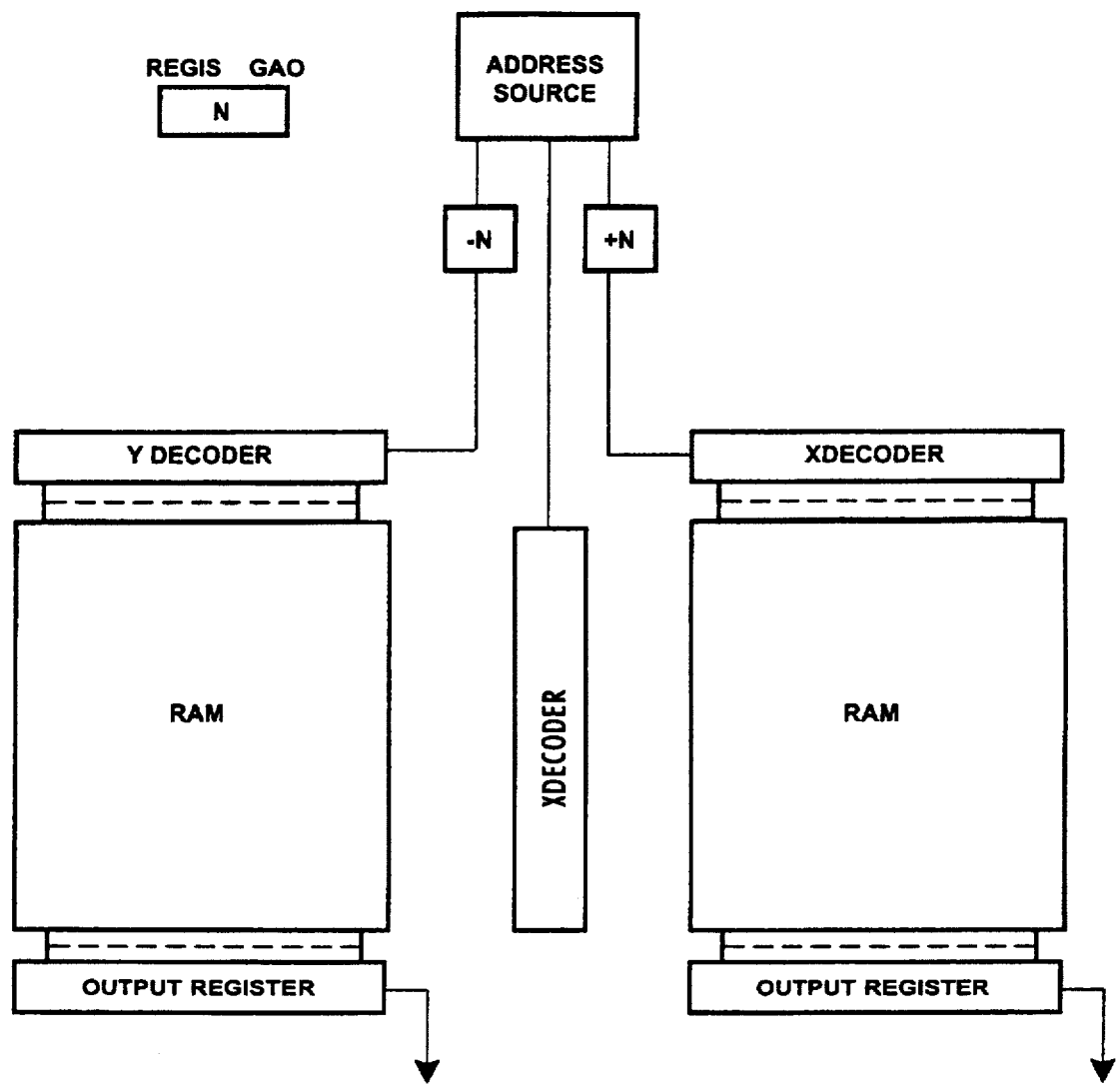
FIG. 43 illustrates a disparity shifter which utilizes address displacement.

FIG. 43 illustrates one form of disparity shifter utilizable with the arrangement of FIG. 42. Random access memory 600 and 600' may either be the actual image storage 510 and 510' of the previous figure or, when live digital images are being received, may constitute separate video RAMS. Once an image is stored in each RAM 600, the data may be read out using X and Y decoders 610, 610' and 620. An address source 630 feeds both the X and Y decoders. A register 640, contains the number "n" which indicates the amount of disparity shift desired for the image plane. Control of the amount of disparity shift can be accomplished by simply changing the value of the variable "n" in register 640. Subtractor 650 and adder 660 respectively subtract and add the value "n" to the column addresses of the Y decoders. As the address source 630 sequences through each line, the columns at the beginning and end will be truncated as shown in FIG. 2.

Figure 44:
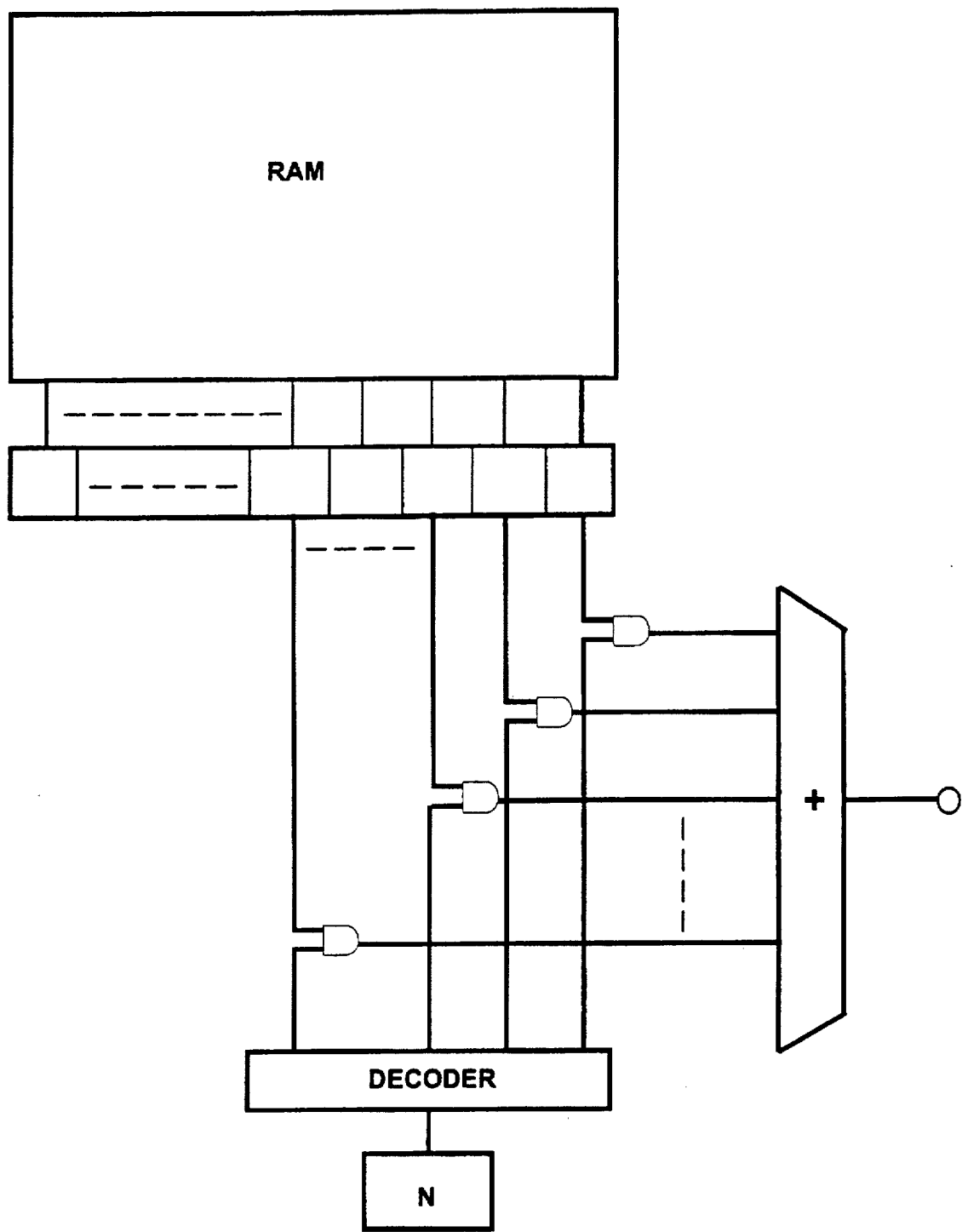
FIG. 44 illustrates another disparity shifter which utilizes a shift register output for selectable output tabs for controlling the cropping of images retrieved from storage.

FIG. 44 shows another method for disparity shifting. The output from video RAM is fed in parallel to a shift register and then the data is clocked to an output port for use. As shown in FIG. 44 by selecting which output cell to take the output from when shifting the shift register's output content to the right one can effectively delete a number of pixels "n" from the output stream. Since this is done line by line the entire image will be truncated on the right end in the version shown. A value "n" is written in register 720 and that value causes decoder 730 to select one of the outputs indicated. Activation of one of those outputs causes one, and only one, of the and gates, illustrated as 740 through 743 to permit data from the connected cell of the shift register to pass through to or gate 750 where it is passed to the output terminal. To truncate pixels from the other end of the RAM 700, one would add a number of additional shift register cells to the right of the last cell currently shown and utilize the selection gates and procedures described with reference to FIG. 44. In this alternative, a number of shifting clock pulses will be utilized equal to the number of cells in the shift register. Since there are more cells in the shift register than there are clock pulses, the last few cells from the left end of the shift register will not be read out to the output of or gate 750. The shift register is reset prior to loading in the next line of data from RAM 700.

Figure 45:
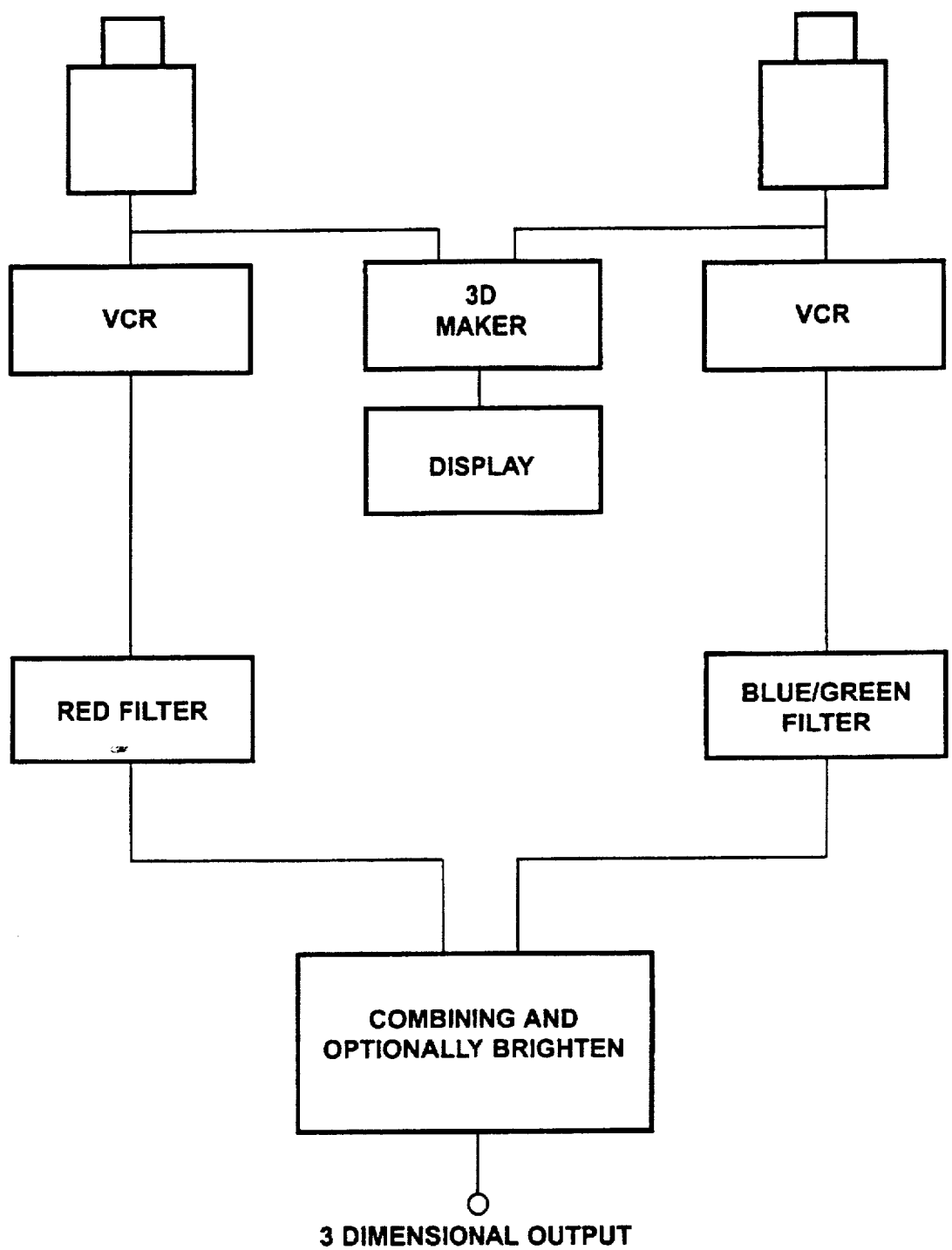
FIG. 45 illustrates methods and apparatus for the capture and reproduction of 3-dimensional images utilizing video cassette recorders.

FIG. 45 illustrates another approach to producing three dimensional images. Analog video cameras 800 and 800' record full color images of a scene on VCRs 810 and 810', respectively. When played back, the output of one of the VCRs is fed to a red filter 820 which extracts red information, and the output of the other VCR is fed to filter 830 which extracts blue/green information. The output of filters 820 and 830 are optionally brightened and combined in a frequency combiner such as an adder, and passed to output terminal 850. In the signal paths described thus far, there is no way for anyone to see the image in real time so as to determine the adequacy of the stereo production. Although a cameraman can view the scene being captured through the viewers of each of cameras 800 and 800', those views are two dimensional. By using a three dimensional image maker, such as that disclosed in the aforesaid co-pending application, the color signals from each of the analog video are converted into individual color planes and the red color plane from the left camera is combined with the green and blue color planes from the right camera to produce a three dimensional image suitable for display on color cathode ray tubes 870. When viewed through viewers, one can see in real time the three dimensional image produced by the camera pair 800 800'.

When capturing live scenes using apparatus such as shown in FIG. 45, it is sometimes necessary to track the distance of an object or person from the cameras. One way of doing this is to place a small, highly reflective material, such as 3M reflective tape, on the target to be tracked. If that target is illuminated with a light source, a highly visible point on the target will appear in the captured image. One can utilize such bright spots created by reflection for calculating target position based on the position of the high intensity target on the screen. Typically, one would monitor the intensity value of the pixels and when a very intense pixel is identified, the address of the pixel would be captured and utilized in a calculation, such as that described in one of the co-pending applications described above to determine distance from the cameras to the target. This distance then can be utilized to establish a number of camera parameters such as focus, disparity or zoom.

The presence of such a bright pixel in the output image can be easily detected and removed by routine image processing techniques either on-line or in the post production suite.

Figure 46:
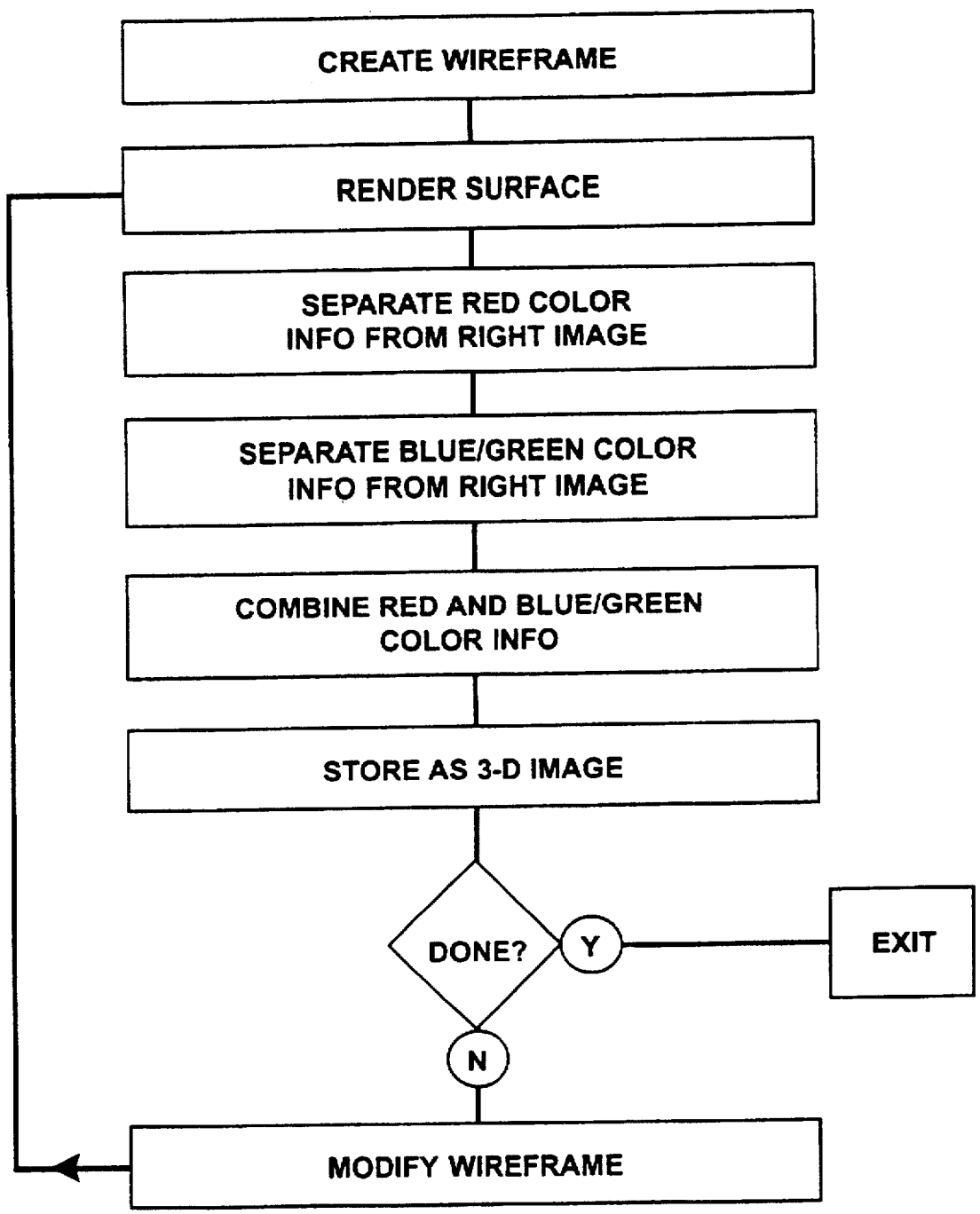
FIG. 46 is a flow chart of how to make a three dimensional computer generated animation.

FIG. 46 is a flow chart of a method for creating three dimensional computer generated animations of an object. First, the object is represented as a three dimensional wire frame (900). Then a surface is rendered on the wire frame (905). Then, two color prospective views of said rendered wire frame are created, one from the position of a first camera and another from the position of a different camera (910). Each prospective view is separated into three color planes (915). Optionally, the disparity between the two views can be controlled so that the object pops out or moves behind the neutral plane (920). One color plane from one of the views is combined with two different color planes from the other view and the combined color planes are stored as three dimensional images (930). The wire frame representation of the three dimensional object is then moved as desired incrementally (935) and steps 905 through 930 are repeated for as many iterations as desired (940). Once sets of three dimensional images are created in this manner, they may be displayed sequentially in rapid succession as part of a three dimensional animation.

FIG. 42 illustrates a vertical shift which occurs when a view of an object is tilted with respect to the camera focal plane. FIG. 42 shows a box ABCD and what happens when the planar surface of ABCD is viewed from an angle such as might occur when the camera focal plane is tilted with respect to the plane of the surface or, as illustrated, when the plane of the surface is tilted with respect to the focal plane. Tracing rays from points A and B through the focal point to the focal plane shows that the image of point B is closer to the center of the focal plane than the image of point A. Since side BD is farther away from the focal point than side AC, side BD appears smaller and size AC appears larger relatively. Thus points A and B which are the same height, appear to be different heights in the image plane.

Figure 47:
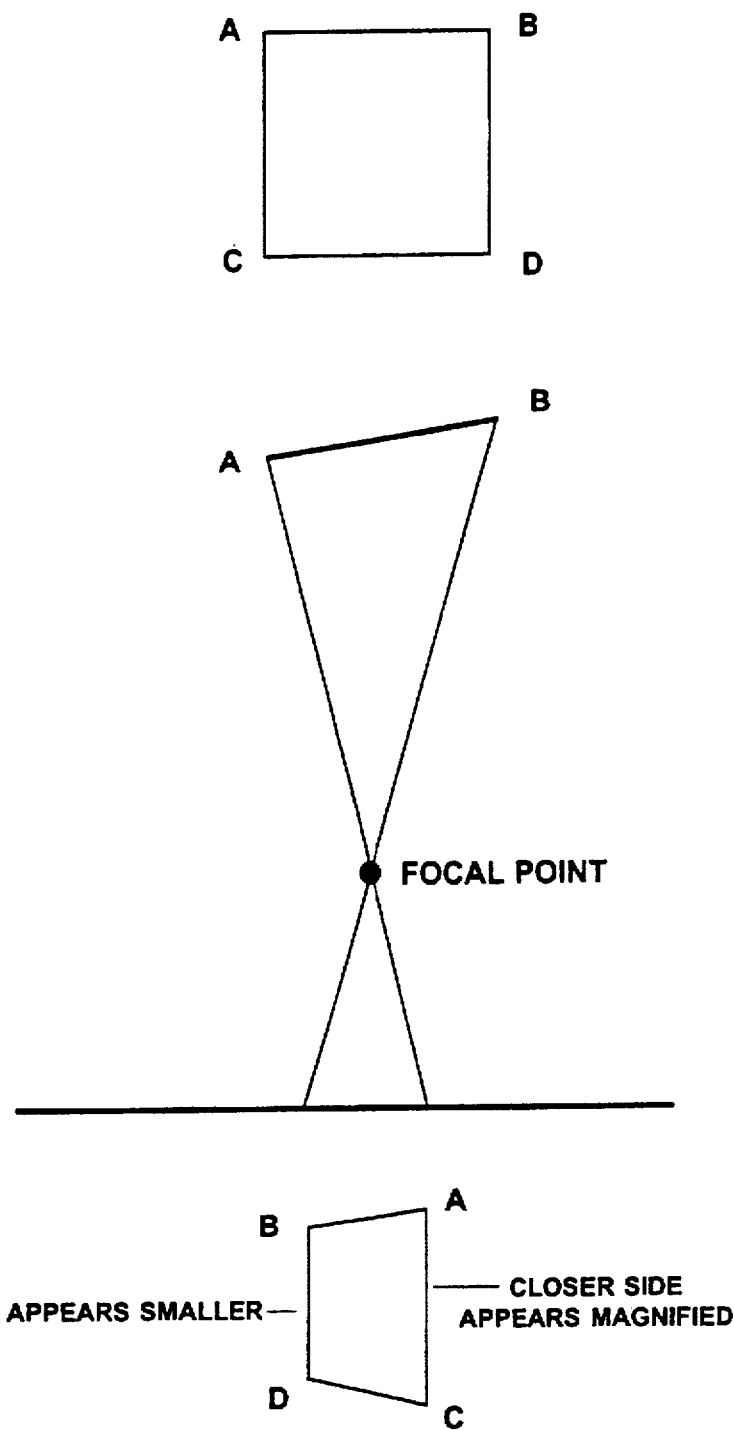
FIG. 47 is an illustration of how camera tilt produces vertical shift in points which would otherwise be at the same vertical position.

FIG. 47 shows only one projection but if the same square were projected from two different cameras both toeing in toward the object ABCD, the effect would be even more pronounced because point B on one image would be lower and the same point on the other image would be higher, thus creating a vertical shift between the same point in the left and right views of the stereo image. As the eye tries to adjust to this vertical shift, eye strain often results.

Techniques for compensating for vertical shift are discussed above and/or in one of said applications.

Figure 11:
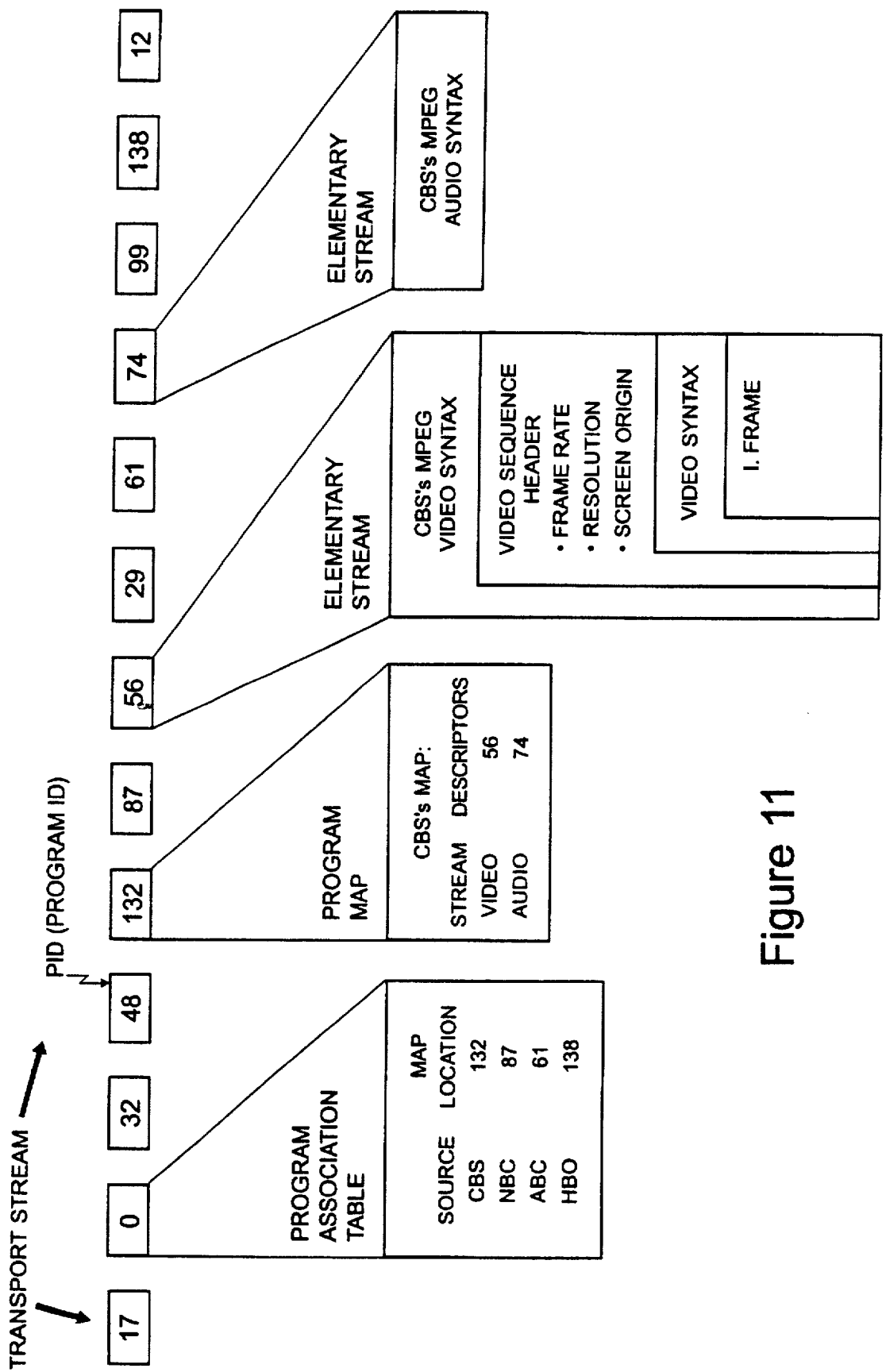
FIG. 11 depicts the use of an MPEG-2 transport stream in delivering video programming.
Figure 12:
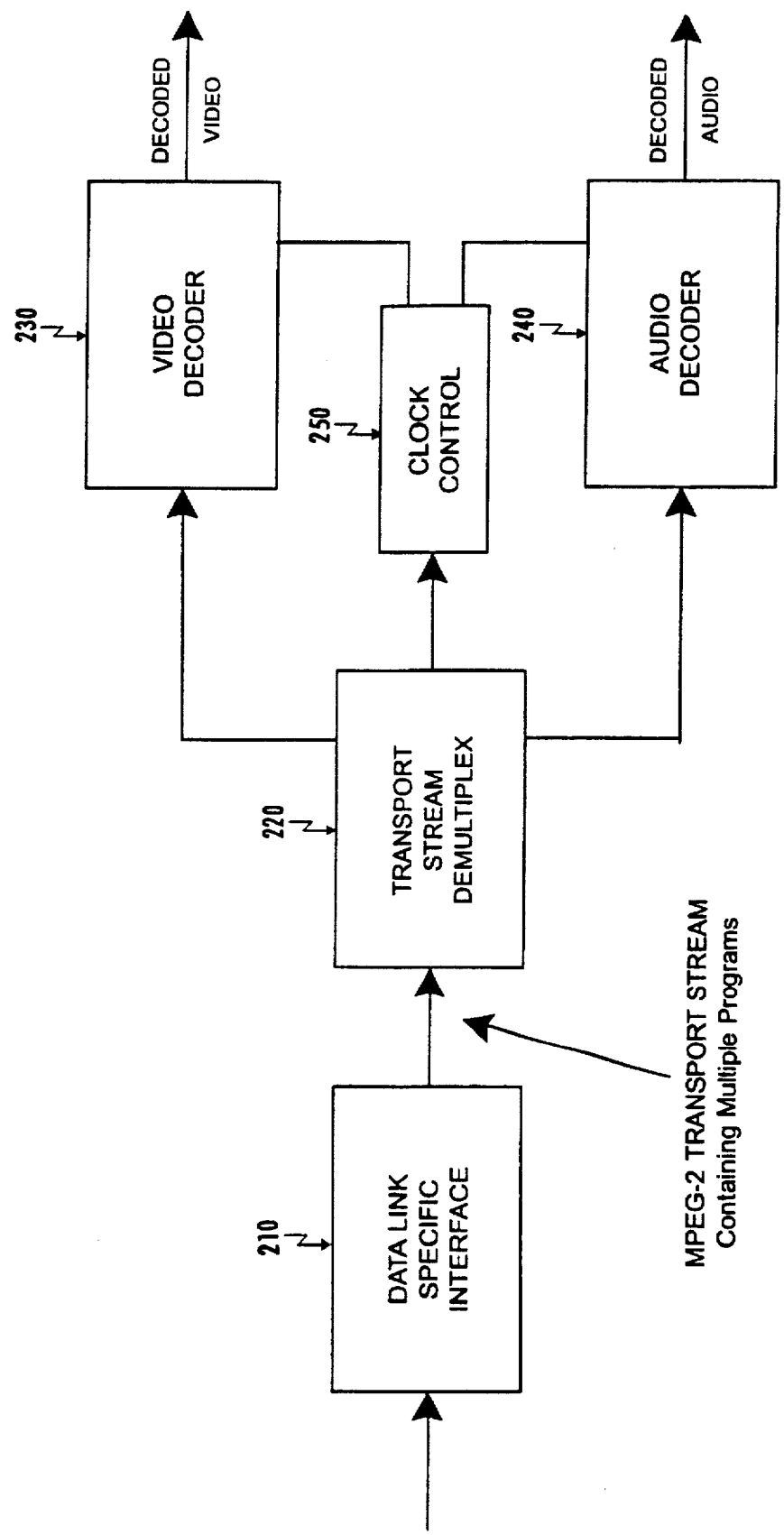
FIG. 12 depicts a generic MPEG-2 decoder.
Figure 48:
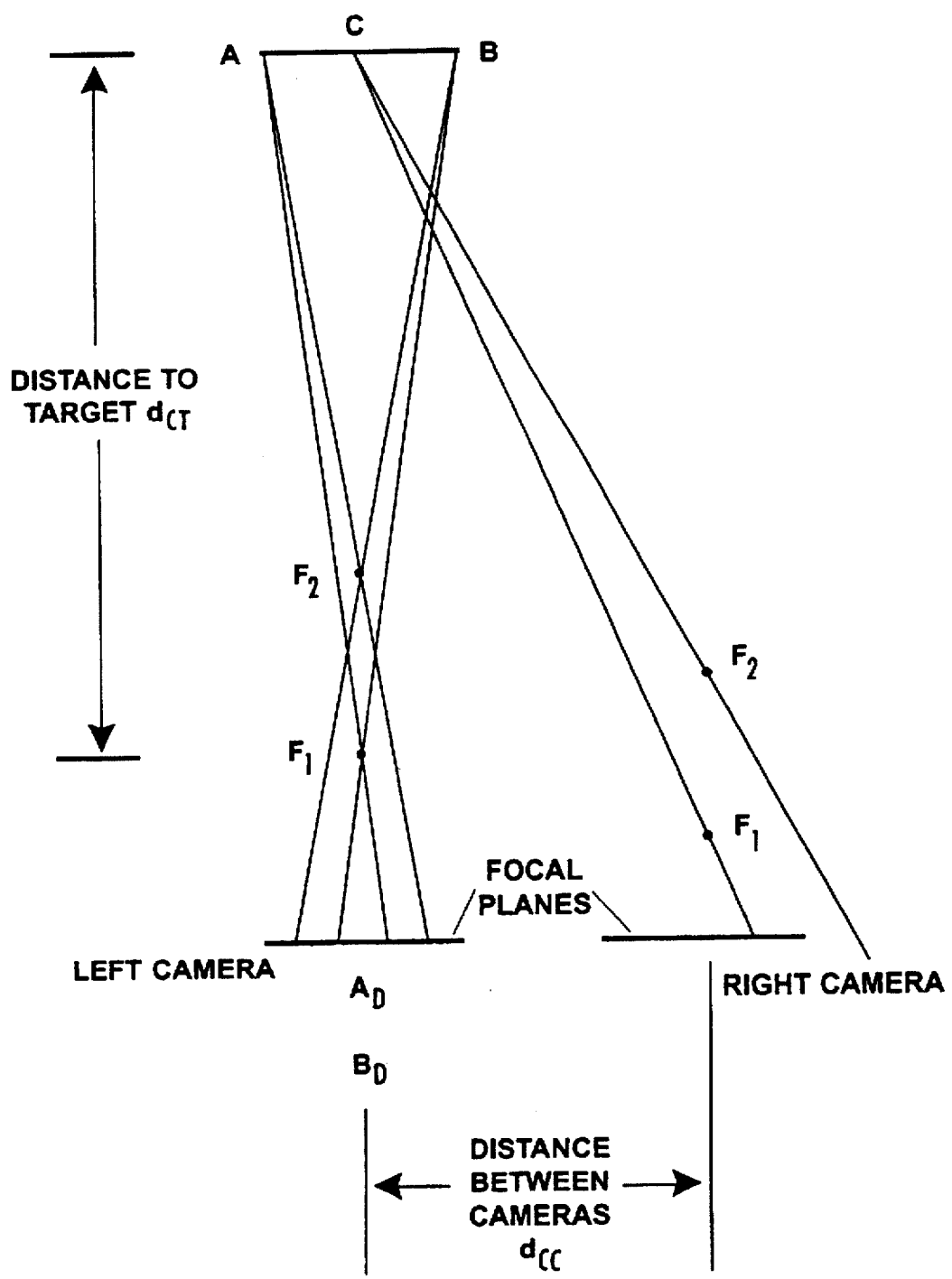
FIG. 48 illustrates the disparity problem resulting from points being different distances from an optical axis and how distance between cameras should be adjusted as a function of target distance in most situations and how disparity should be adjusted concurrently with a change in focal length.

In accordance with the invention, the axes of the two stereo cameras are kept parallel. That is, there is no toe in to compensate for disparity adjustment. However, in accordance with the invention, to avoid a loss of stereo effect, it is preferred, as a matter of default settings that the distance between the cameras be a relatively fixed fraction of the distance to the target. Preferably, the distance between cameras might be approximately 1/50 of the distance to the target. This can be accomplished by linking the operation of servo 345 of FIG. 3 which controls camera separation with an indication of distance to one target derived from a rangefinder or from autofocus circuitry. Control by a rangefinder or autofocus circuitry can be bypassed by selectively switching out its control signal and by replacing it with a manually generated one. With a 1/50 relationship, the distance will be neither too great nor too small so as to lose stereo effect. Further, it is desirable to arrange the disparity so that the target distance appears in the neutral plane. FIG. 11 also illustrates that with the change in focal distance, there is a resulting change of scale. As shown in the left side of FIG. 48, the image of line AB through focal point Fl under the focal plane has an extent $A_D$ which is smaller than the image of line AB through focal point F2 which occupies an extent $B_D$. As expected, the image size increases as focal length of the lens increases. Since line AB is centered on the optical axis of the left camera, the center of the image of line AB is at the same point for both settings of focal length, namely, it is located at the center of the image plane. However, the image of line AB through focal point F1 of the right camera and focal point F2 of the right camera are considerably displaced from the axis of the camera. Specifically, the image of point C through focal point F2 of the right camera is off the focal plane as shown whereas image of point C through focal point F1 lies barely on the image plane of the right camera. In contrast, corresponding points on the left image plane are comfortably within in the bounds of the image plane.

According to Applicant's invention, when changing focal distance, it is desirable to simultaneously change the disparity to maintain the target in the neutral plane. Thus, as zoom lenses of a pair of cameras are adjusted to simultaneously zoom in on an object at a given distance from the cameras, the disparity shift should be adjusted so that the target remains in the neutral plane. This can be accomplished, for example, by linking control of servo 345 which controls camera separation with servo 440 of FIG. 4 which controls zooming by, for example, use of a look-up table.

Figure 49:
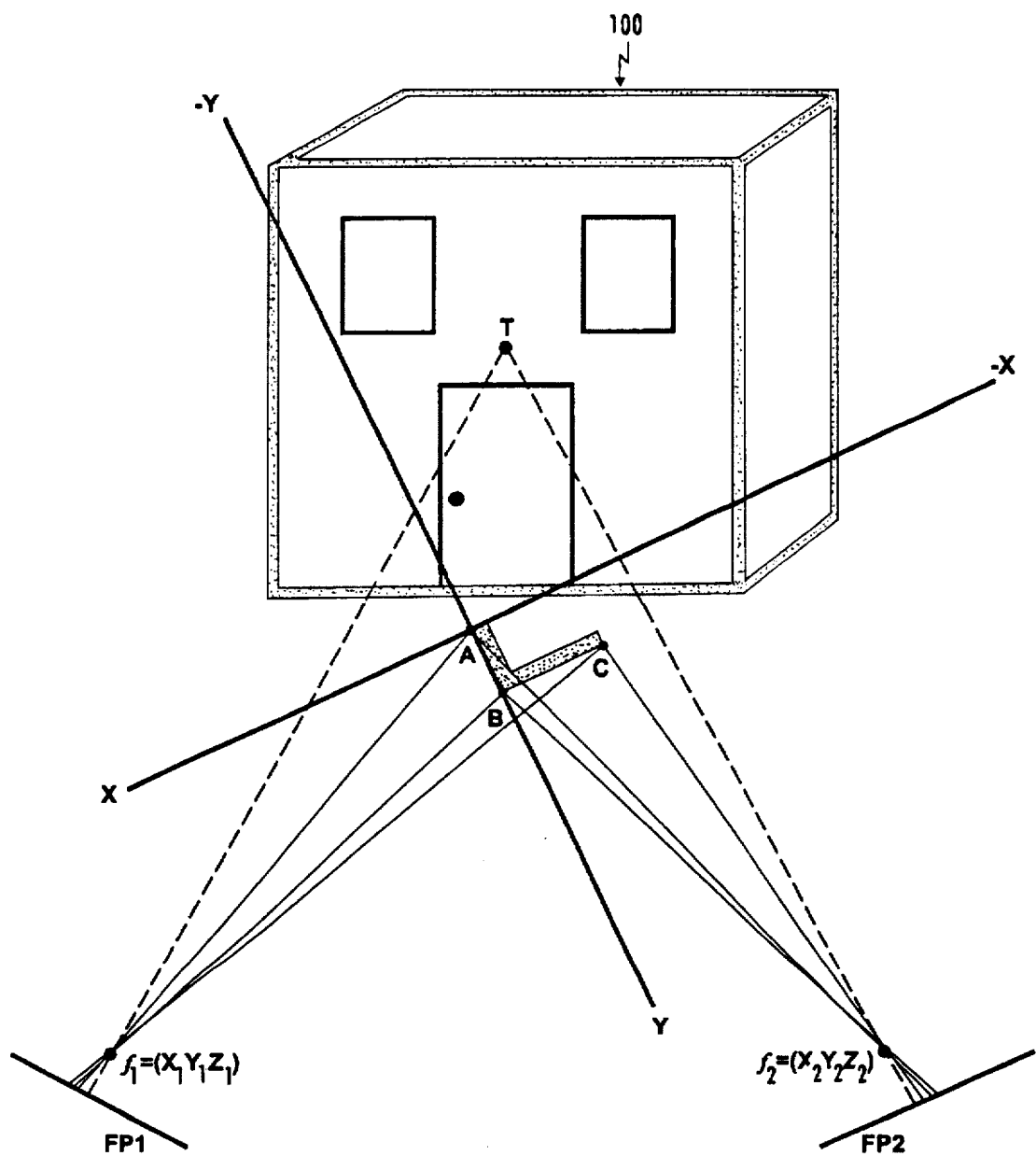
FIG. 49 is an illustration of the capture of two images of a scene, including a building, according to the invention.

FIG. 49 illustrates a building 100 in front of which is located a calibrated target such as a builder's square 110. Pictures of the building are taken from two positions. The first from point $f_1$ and the second from point $f_2$. $f_1$ is the location of the principal point of the lens or lens system of a camera and the image projected through that point falls on image plane $fp_1$. A second image of the scene is captured from position $f_2$ and the image through principal point $f_2$ is cast upon image plane $fP_2$. The positioning of the cameras is arbitrary. In some circumstances, it is desirable to capture images from two locations using the same camera. In other circumstances, it may be desirable to capture the images using different cameras.

Typically, the camera is aimed so as to center the object of interest within the viewing frame. In the picture shown, both cameras are pointed at center point T which means that the images of points A, B and C on the builder's square are not in the center of the image.

Once images are available in viewable form for analysis, knowing the distance between the principal point and the image plane of the camera (principal distance) and the physical displacement of the points on the reproduced image, one may calculate the angles $Af_1B$, $Bf_1C$ and $Cf_1A$ because the angles subtended by pairs of points vis-a-vis the principal point are identical whether they are measured in the real scene or on the image plane side of the focal point.

In the implementation of this invention, a real world coordinate system is defined with the Y axis running through points A and C and an X axis defined perpendicular to the Y axis through point A in the plane of A, B and C, thus forming an origin 0 at point A. A Z axis is defined perpendicular to the XY plane and running through point A. By convention, the +Y direction runs from the origin at A to point C, the +X direction runs to the right when standing at the origin and facing the +Y direction and the +Z direction proceeds in a vertical direction from the origin out of the XY plane in a direction indicated by the cross product of a vector in the +X direction with a vector in the +Y direction.

Given this coordinate system, it is desirable to calculate the location of the camera, namely, the location of the principal point of the camera from which an image was captured. Thus, principal point $f_1$ is located at $(X_1, Y_1, Z_1)$. Likewise, the principal point $f_2$ is located at $(X_2, Y_2, Z_2)$.

With respect to that coordinate system, one can see that a camera directed at target point T has both an azimuth and an elevation which can be specified utilizing the coordinate system. In addition, the camera may be rotated about the optical axis of the camera differently when the two pictures were taken. In short, there is no guarantee that the camera was horizontal to the XY plane when the picture was taken and thus, the orientation of the images may require correction prior to processing.

Figure 50:
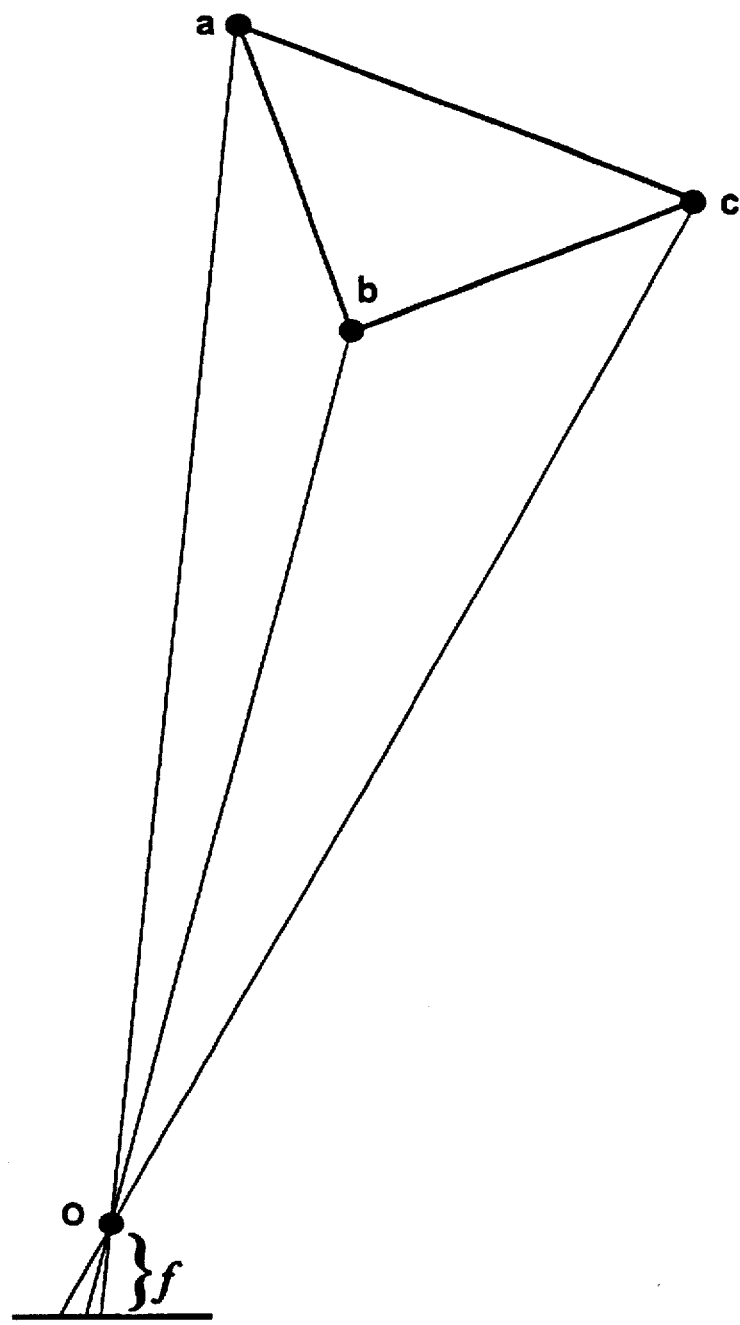
FIG. 50 is an illustration of a viewing pyramid of three calibration points as projected through the focal point of a camera.

FIG. 50 illustrates a viewing pyramid formed by the three points A, B and C vis-a-vis the origin O (the principal point of a camera). The viewing pyramid can be viewed as having three surfaces, each corresponding to a surface triangle, namely, triangles AOB, BOC and COA. If one were to view the pyramid shown in FIG. 50 as hollow and made of paper and if one were to cut along the line OA and flatten the resulting pattern, one would achieve a flattened pyramid such as shown in FIG. 51.

Figure 51:
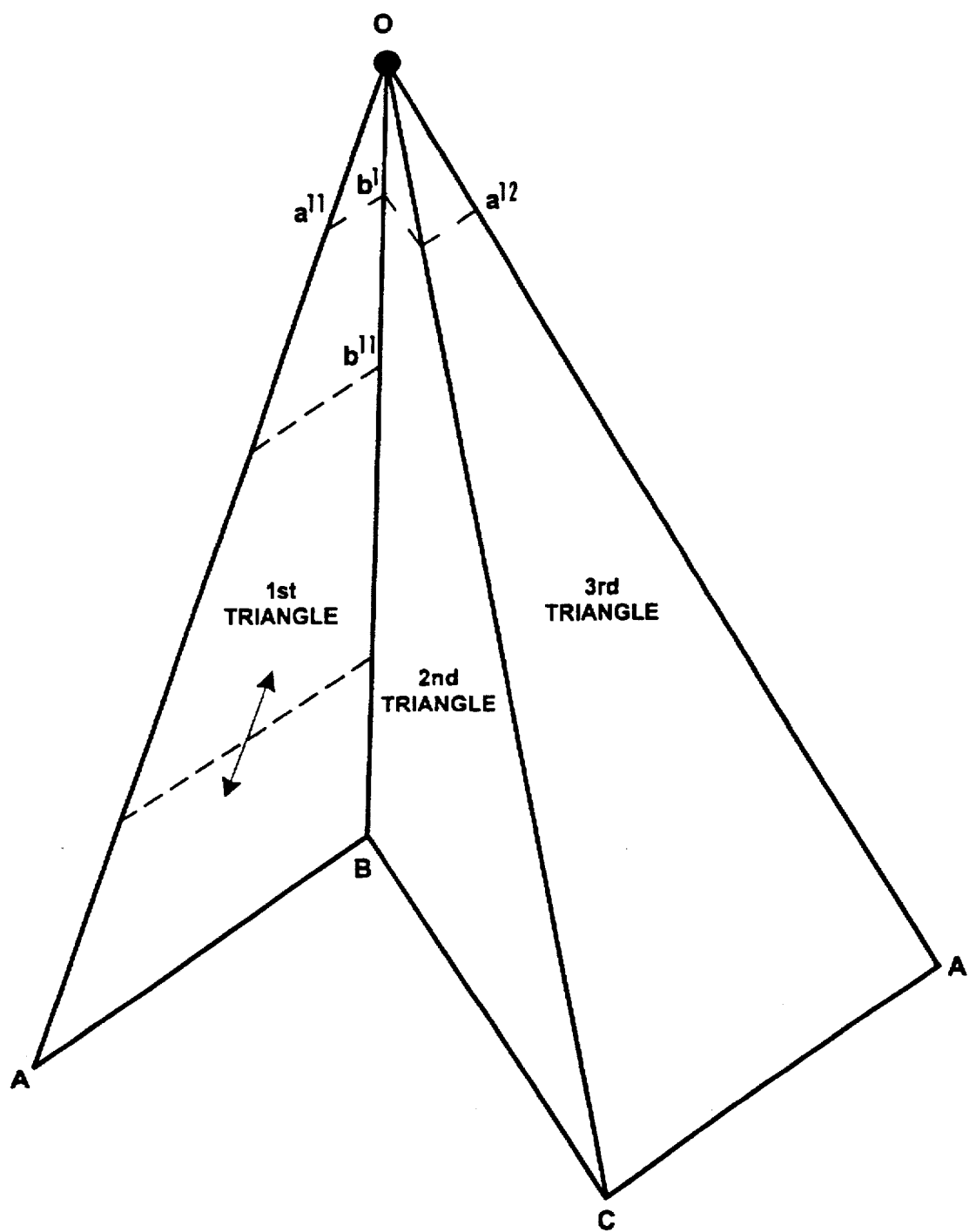
FIG. 51 is an illustration of a flattened pyramid used for calculation of camera distance.

FIG. 51 will be utilized to describe the process by which camera position is determined in accordance with the invention. The distance OA represents the distance from point A which is at the origin of the coordinate system to point O which is at the principal point of the lens.

At the beginning of the determination, one knows values for angles AOB, AOC and BOC by virtue of knowing the distance between the principal point and the image plane and the measured distance separating two points on the image plane.

Figure 52:
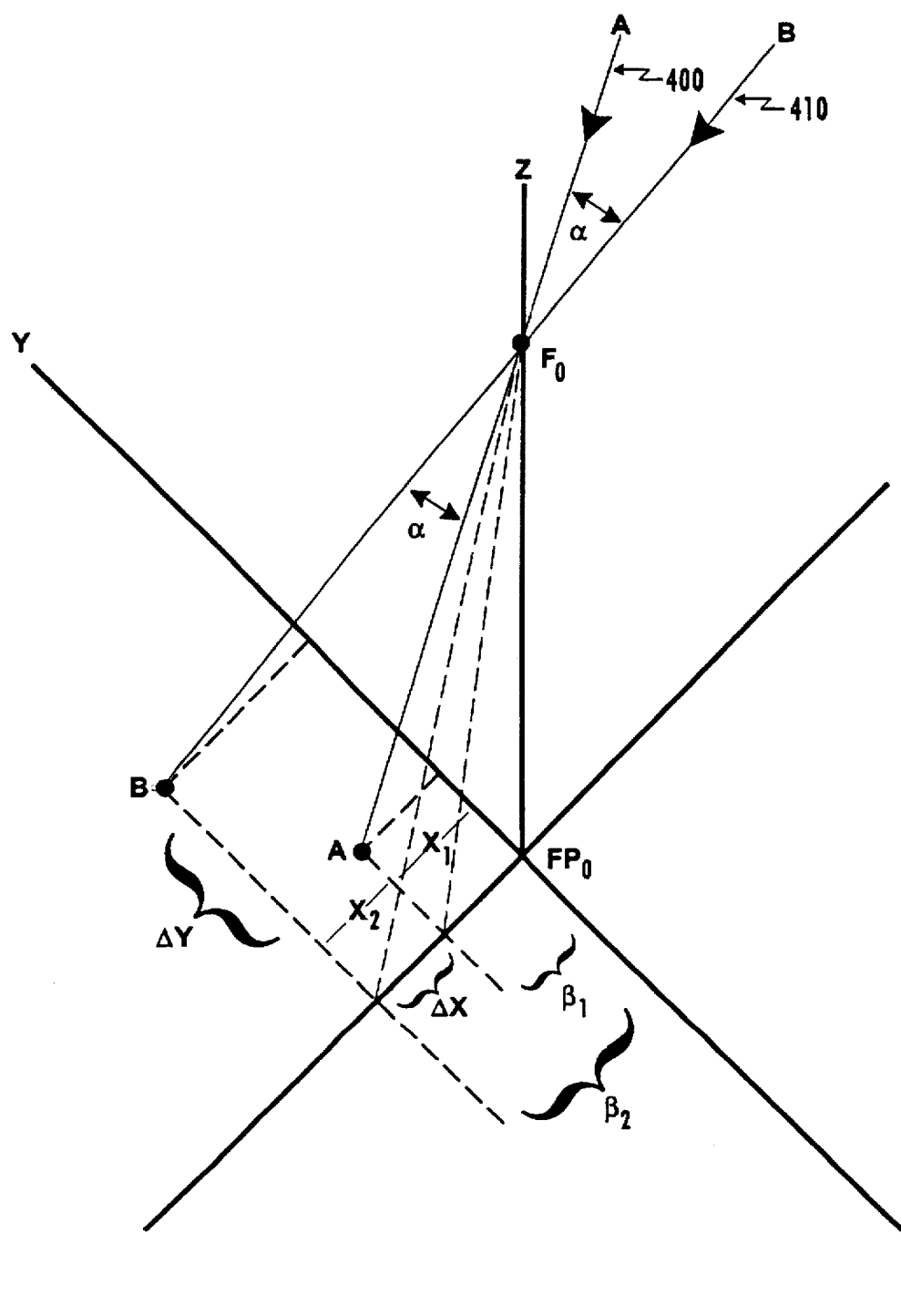
FIG. 52 is an illustration of viewing angle determination used in calculation of camera distance.

FIG. 52 assists in illustrating how this is done. In FIG. 52, the XY plane constitutes the image plane of the camera. $f_O$ is the principal point of the lens. Images of points A and B are formed on the image plane after passing through the principal point at locations A and B shown on the XY plane. The incoming rays from points A and B are respectively shown at 400 and 410 of FIG. 4. For purposes of image plane analysis, an image plane origin $FP_O$ is defined and an X axis is defined as parallel to the longest dimension of the image aspect ratio. The Y axis is formed perpendicular thereto, and the origin $FP_O$ lies directly under the principal point. Rays from points A and B form an angle alpha ($<\alpha$) as they pass through the focal point. The projection of those rays beyond the focal point also diverge at $<\alpha$. $<\alpha$ corresponds to $<AOB$ of FIG. 3.

By taking careful measurements from the image capture medium (e.g. photographic film, digital array etc.), one can determine the distances $AFP_O$ and $BFP_O$.

Calculating the distances $AF_O$ and $BF_O$ using the Pythagorean Theorem using the known distance FOFPO (the distance between the principal point and the focal plane) and measured distance $AFP_O$ and $BFP_O$, one may determine angle 2 using the law of cosines as follows:

$$AB^2 = (F_O A)^2 + (F_O B)^2 - 2(F_O A)(F_O B) \cos \alpha \quad (1)$$

$$\alpha = \arccos \left[ ((F_O A)^2 + (F_O B)^2 - (AB)^2)/2(F_O A)(F_O B) \right] \quad (2)$$

Thus, by analyzing points in the focal plane, the angles separating points A, B and C can be determined in the manner just described.

The distances separating points A, B and C are also known, either a priori by placing a calibrated target, such as a carpenter's square in the scene being photographed, or by measuring the distances between three relatively permanent points in the scene previously captured after the images have been formed.

In FIG. 51, the distance OA represents the distance from the principal point of the camera (O) to point A which is the origin of the coordinate system utilized to define camera position. At a high level, this is done by first assuming a very low estimate for the distance OB, such as the distance $Ob^1$, then with that assumption, triangle AOB is solved. "Solving a triangle" means establishing (e.g. calculating) values for the length of each side and for each of the angles within the triangle. With the distance $Ob^1$ assumed, the first triangle is solved using known, assumed or calculated values. In the process, a value for distance OA is calculated. Using the estimate $Ob^1$, the second triangle BOC is solved and the derived distance OC is then utilized to solve the third triangle COA. When the third triangle is solved, the calculated value for OA of the third triangle is compared with the calculated value of OA of the first triangle and the estimate $Ob^1$ is revised by adding the difference between the values for OA from the third triangle and the value for OA from the first triangle to the estimate $Ob^1$ and the process is repeated. By successive iterations, the estimate $Ob^1$ will be improved until the difference between the calculated values of OA reduces to a value less than $\epsilon$. When $\epsilon$ is low enough for the accuracy needed, the iterations cease and the true value of OA is assumed to lie between the values calculated for the first and third triangles.

A calculation of one iteration will illustrate in detail how this is done.

From the law of sines, one knows:

Distance $Ob^1$ is the estimate of the length of OB, which, at the outset, is set to be low. The distance AB $$\frac{\sin <AOB}{AB} = \frac{\sin <OAB}{Ob^1} \quad (3)$$

is known because the dimensions of a calibrated target are known or because the distance AB has been measured after the images are captured. The value for $<AOB$ is calculated from measurements from the image plane as illustrated in FIG. 52 and discussed in connection with equations 1–7 of this section. Therefore, $<OAB$ can be calculated as follows:

$$<OAB = \sin^{-1} \left[ Ob^1 \times \frac{\sin <AOB}{AB} \right] \quad (4)$$

Once the first estimate of $<OAB$ is known, the first estimate of $<OBA$ can be calculated as follows:

$$<OBA = 1800° - <AOB - <OAB \quad (5)$$

At this point, one knows all three angles of the first triangle of FIG. 51 and is in a position to calculate a value for OA of the first triangle. Again using the law of sines, OA can be determined as follows:

$$\frac{\sin <OAb^1}{Ob^1} = \frac{\sin <Ob^1 A}{OA} \quad (6)$$

$$OA = \frac{(\sin <Ob^1 A)(Ob^1)}{\sin <OAb^1} \quad (7)$$

At this point, the first triangle is entirely solved under the assumption that the distance $Ob^1$ is the actual value of length OB.

Turning to the second triangle, $Ob^1$ is assumed to be the distance OB. Distance BC is known from the target or measurements and angle BOC is known from measurements from the image plane. Thus, there is enough information to solve the second triangle completely as shown in equations 8–12.

$$\frac{\sin <BCO}{Ob^1} = \frac{\sin <BOC}{BC} \quad (8)$$

$$<BCO = \sin^{-1} \left[ \frac{Ob^1 \times \sin <BOC}{BC} \right] \quad (9)$$

-continued $$\angle OBC = 180° - \angle BCO - \angle BOVC \quad (10)$$

$$\frac{\sin \angle OBC}{OC} = \frac{\sin \angle BOC}{BC} \quad (11)$$

$$OC = \frac{BC \times \sin \angle OBC}{\sin \angle BOC} \quad (12)$$

With the distance OC calculated as shown in equation 12, the same information is available with respect to the third triangle that was available at the beginning of the solution of the second triangle. Therefore, the third triangle can be solved in a manner completely analogously to the solution of the second triangle substituting in the corresponding lengths and angles of the third triangle in equations 8–12.

One result of the solution of the third triangle is the distance OA which has been calculated as set forth above. This distance OA from the third triangle will have been derived based on calculations from the first, second and third triangles. Note, however, that the distance OA from the third triangle and the distance OA from the first triangle should be identical if the assumed value $Ob^1$ were equal in fact to the real length OB. Since $Ob^1$ was initially assumed to be of very low value, there will be generally a difference between the value of OA from the third triangle as compared with that from the first triangle. The difference between the two calculated lengths is added to original estimate $Ob^1$ to form an estimate $Ob^2$ for the second iteration.

With the distance assumed to be $Ob^2$, the calculations set forth above for the solution of the first, second and third triangles are repeated and the resulting values for OA from the first and third triangles are compared once again and an adjustment made to the estimate $Ob^2$ based on the difference between the lengths as set forth above.

By successive iteration, the estimate for the distance OB can be made accurate to whatever degree of resolution one desires by continuing the iterative process until the difference between OA from the first triangle and that from the third triangle is reduced to an acceptable level, ε. The distance OA which results from the iterative process is then equal to the distance of the principal point of the camera shown at O in FIG. 3 to point A which is the origin of the coordinate system defined for this set of measurements.

If the values for OA from the first and third triangles agree within ε, all of the triangles are solved and therefore the entire viewing pyramid is solved.

Figure 53:
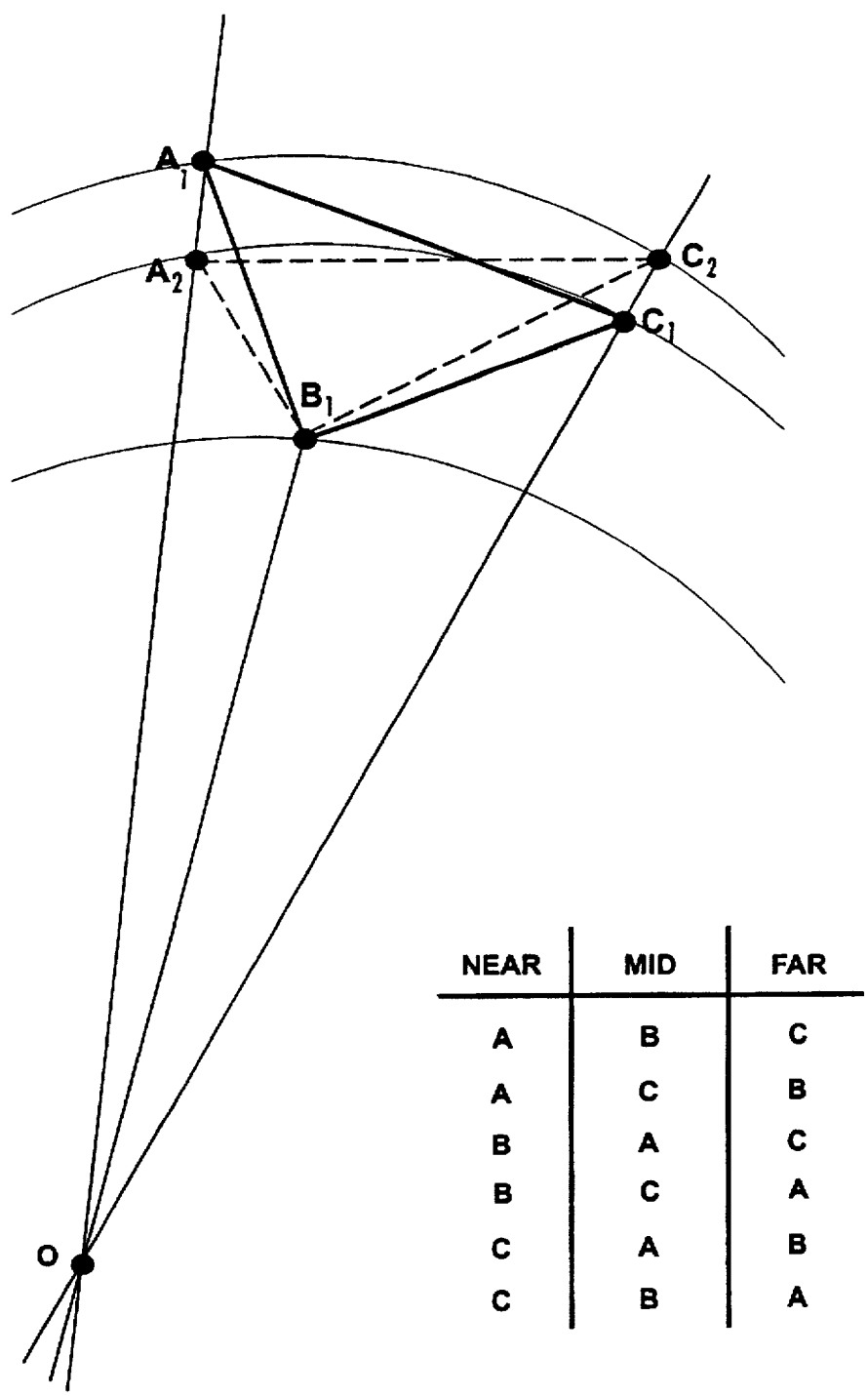
FIG. 53 is an illustration of near, mid and far ambiguity.

Turning to FIG. 53, when viewing the points A, B and C from the principal point of the camera, one cannot necessarily determine which of points A, B and C are closest and next closest to the camera. For example, in FIG. 53, given that point $B_1$ is closest to the camera, it is possible that either point A is closer and point C farther, or alternatively, that point C is closer and point A farther. These differences are reflected in triangles $A_1B_1C_1$ as compared with triangle $A_2B_1C_2$. The table shown in FIG. 53 illustrates that the relationship between points A, B and C may in general result in six different permutations. There will always be these combinations of near, mid and far when working toward a solution. Right at the start, one doesn't know which point is closest to the camera and which is furthest and which is midpoint.

To avoid incorrect answers, it is desirable to try all combinations. For each of the combinations one assumes that one knows which one is which and then tries the calculation. If the calculation converges to a potential solution, then one holds that solution over for further analysis. If one is close to the plane of a particular triangle, there can be as many as five potential solutions or orientations of the triangle that will give you the same relationship of side lengths and viewing pyramid apex angles.

If a particular combination of near, mid and far is not feasible, the calculations do not converge and the process blows up, usually terminating in a math error, typically in a trigonometric function. However, if the calculations proceed normally, then potential solutions are realized and each potential solution is retained for further investigation.

In FIG. 53, it is clear that sometimes there may be degeneracy in which two or more points are located at exactly the same distance from the focal point. That reduces the number of different possible solutions.

During the iterative process, in the example shown above, the difference between OA of the first and third triangles is added to the estimate $ob^1$ to determine the estimate to be utilized in the next iteration. It is, of course, possible to utilize a factor other than 1 to 1 and to adjust the estimate by a fraction or a multiple of the difference between the values of OA for the first and third triangles. The preferred adjustment, however, is 1 to 1.

When utilizing a calibrated target, it is preferred that a right angle calibration target be used, like an 8½×11 piece of paper or a carpenter's square.

The six potential arrangements of near, mid and far for points A, B, C can be viewed as different ways of flattening the pyramid. Three sets of flattened pyramids can be formed by using each vertex OA, OB and OC as the edge which is "opened" (e.g. If the pyramid were formed by folding paper into a pyramid shape, and one vertex were cut open and the pyramid unfolded into a pattern like that shown in FIG. 51, three different sets of flattened pyramids are formed, each by cutting a different vertex). Each set has two members corresponding to the two orders in which the triangles may occur. As illustrated in FIG. 53, for example, the triangles are solved in 1-2-3 order. This ordering represents one of the 2 members. The other member is formed by flipping the flattened pyramid over on its face so that triangle 3, as shown in FIG. 51 is put in the triangle 1 position. This member of the set is solved in 3-2-1 order as labeled.

The 1-2-3 ordering of the solution of the triangle of a flattened pyramid implicitly assumes that the left (and right) exterior edge (OA in the figure) is the farthest, the next (OB) is intermediate (mid) and OC is closest.

When searching for a solution for each of the possible arrangements of near, mid and far, the algorithm converges only for that (those) solution(s) which are "possible". Usually only one of the 6 combinations is possible. However, sometimes degeneracy occurs when 2 (or 3) points are exactly the same distance away. In such a case, multiple solutions are possible but they will yield to the same result.

Thus convergent solutions will uniquely define the X, Y and Z locations of the camera in the coordinate system defined by the points A, B and C as set forth above.

The techniques described herein are applicable to images photographed without a calibrated target. By selecting 3 convenient points on the image and physically measuring the distance between them after the image has been captured, the same effect can be achieved as is achieved using a calibrated target at the time the image is captured.

Figure 54:
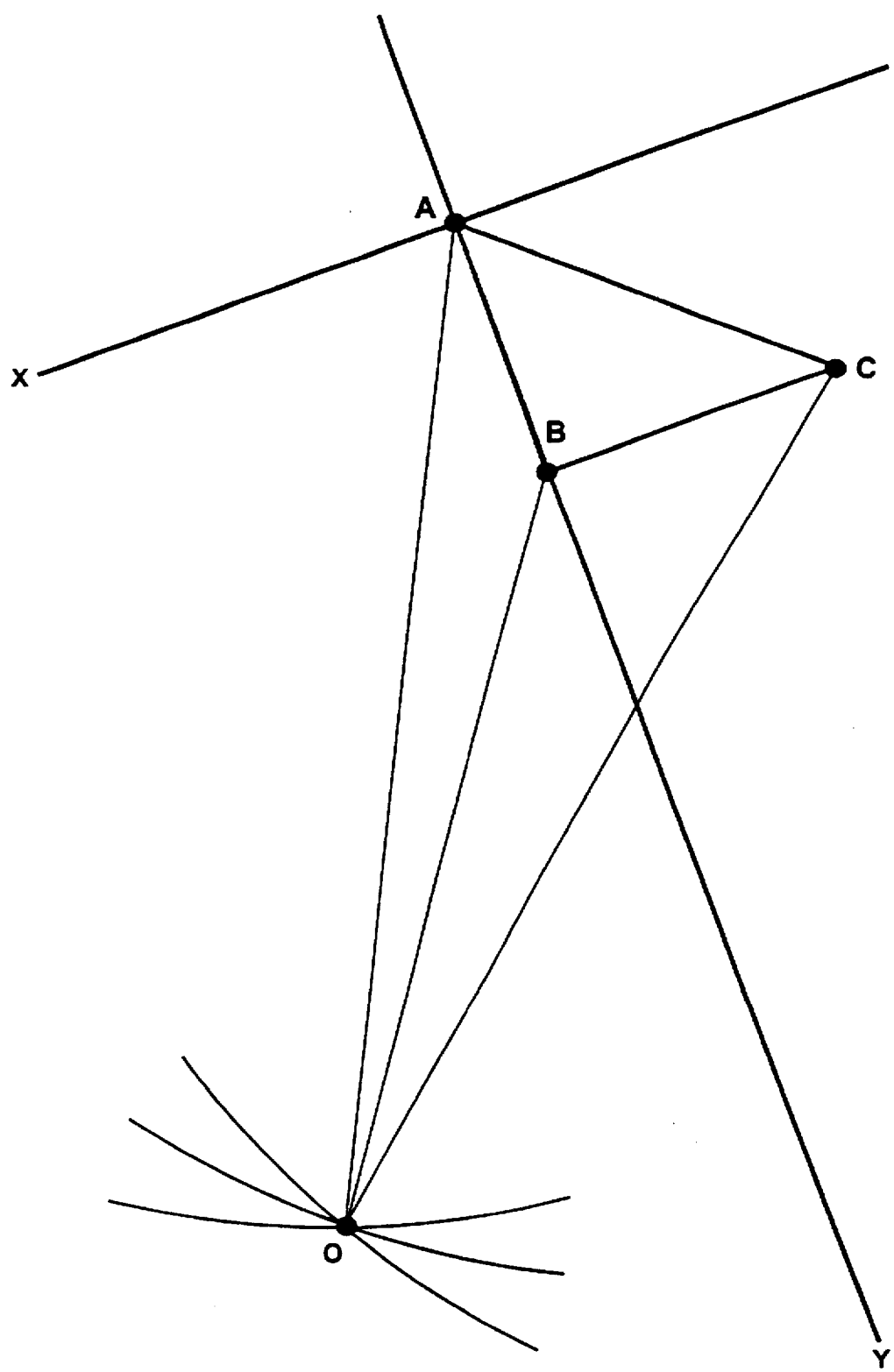
FIG. 54 is an illustration of how to resolve near, mid and far ambiguity.

To resolve the near, mid and far ambiguities, as shown in FIG. 54, one notes that the principal point of the camera is going to be where the known lengths of OA, OB and OC coincide at point O. For each of the possible solutions for the location of point O, one can then write an equation for a sphere about the point A, about point B and then about point C. The intersection of the spheres can be understood by visualizing two soap bubbles coming together. As they get progressively closer, they can touch at one point and then as one penetrates the other it will generate a circle which will be a locus of points that is common to the two spheres. As long as the spheres are not identically the same size, one bubble will go inside of the other and as it goes inside it will, at worst case, touch again at one point. As it goes out the other side, it will touch at a point, form a circle, and then as it leaves it will touch a diametrically opposite point.

By writing equations for spheres centered at points A, B and C with radii respectively of length OA, OB and OC, one obtains three equations in three unknowns (assuming a rectangular coordinate system).

Each of the possible solutions for near, mid and far is utilized to generate a set of spheres which are then solved for common points of intersection. Looking at FIG. 54, one can see that in addition to intersection at point O of the three spheres in the +Z plane, there will be a symmetrical solution in the -Z plane. By convention, one assumes that the horizontal control grid established by the XY plane is viewed from the +Z direction looking down on the XY plane. By that convention, there is only one solution and that is the one is the +Z space and the -Z space solution is eliminated. That then determines the XYZ location of the principal point of the camera.

Figure 55:
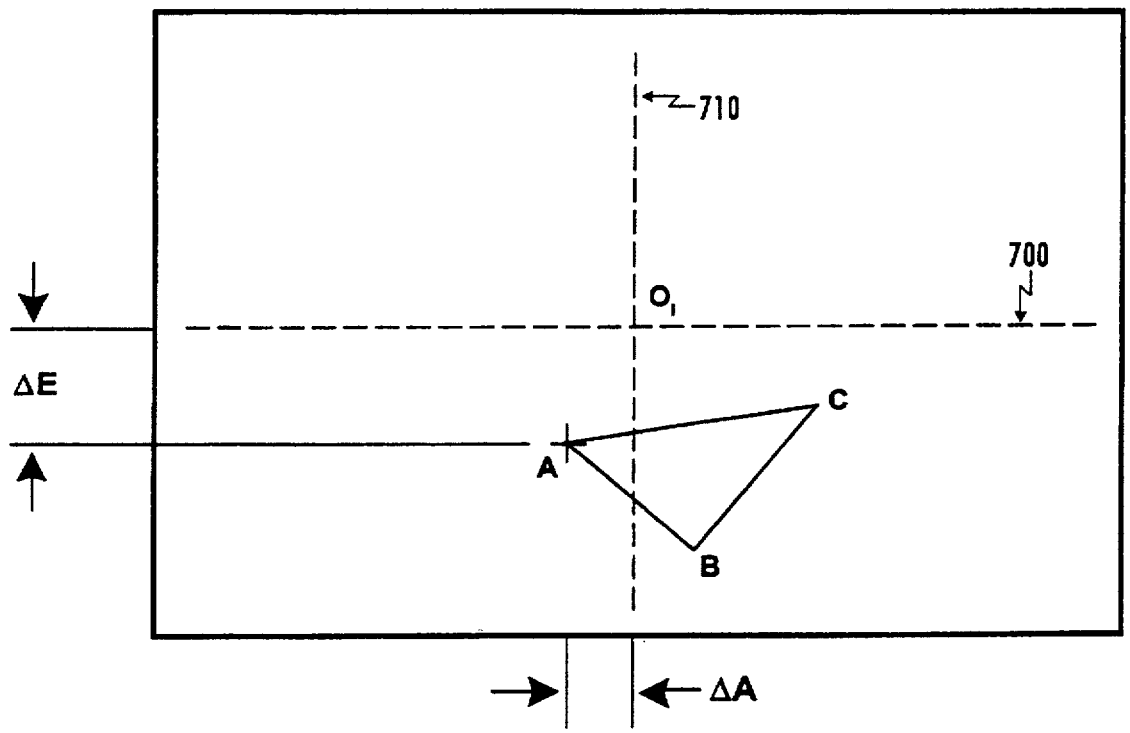
FIG. 55 is an illustration of azimuthal and elevational correction.

Once the camera position is determined, there are three possible orientations for the camera which need to be specified. They are (1) the azimuthal rotation, (2) the elevation rotation and (3) the tilt about the optical axis. FIG. 55 illustrates how azimuthal and elevational corrections are determined. FIG. 55 illustrates the image plane. Points ABC are the same points ABC utilized to define a coordinate system and to calculate the distance of the camera in that coordinate system. Points A, B and C are illustrated as part of the image shown in the image plane. A center of the plane (i.e. the center of the picture) is typically placed on the object of interest so that the object of interest appears in the center of the image. A calibrated target or the three points utilized to establish a coordinate system, A, B and C, are typically not at the center of the photograph. The azimuthal correction is essentially that required to displace point A, the image of the origin of the external world coordinate system so that it lies exactly on top of the photographic location of point A shown to the right of axis 710 of the coordinate system of the image plane. The elevational correction is the angle of elevation or declination required to place the image of point A exactly on top of the photographic location of point A shown below the abscissa of the image plane coordinate system 700. In short, azimuthal and elevational corrections are determined such that if they were applied to the camera, point A, the origin of the real world coordinate system would coincide with point A, the origin as captured on the photograph.

Mathematically, the differential offset angles, that place the image of the origin of the real world coordinate system exactly on point A in the image plane, are calculated as follows:

$$\theta_A = \tan^{-1}\left(\frac{\Delta A}{f}\right) \quad (13)$$

$$\theta_E = \tan^{-1}\left(\frac{\Delta E}{f}\right) \quad (14)$$

The corrections required to coalign or superimpose points A are shown in FIG. 55.

FIG. 55 assumes that if A is correctly located, points B and C will be correctly located. However, this is generally not true because of tilt of the camera about the optical axis. Once points A have been superimposed, one knows where point B should be because of the axis definitions in the real world coordinate system. If the origin of the real world coordinate system centered on A, and the origin of the image plane coordinate system, now also centered on A by virtue of the azimuthal and elevational corrections applied in connection with FIG. 55, then point B on the image plane should be located where point B in the real world coordinate system is located. This would be the case if the camera were absolutely horizontal when the picture was taken. However, if there is tilt, B will be displaced off the axis. On the image plane, one knows the actual angle that the line AB makes to the X axis of the image plane by measurement from the image plane. By taking the viewing pyramid and projecting it onto a projection plane, as is commonly done when projecting three dimensional images onto a two dimensional surface, one can determine what angle BAC should be on the image plane. To correct for camera tilt, one must rotate the image plane about the optical axis. However, doing so potentially changes the location of points A, B and C requiring another iteration of corrections in which points A are superimposed and the amount of tilt recalculated until the points converge to an arbitrary amount of error $\epsilon_1$.

Using these techniques, convergence can commonly be achieved to an accuracy of 1 part in $10^{-14}$. If there is more than one convergent candidate, the B point residual error and the C point residual error are utilized as a discriminators.

Figure 56:
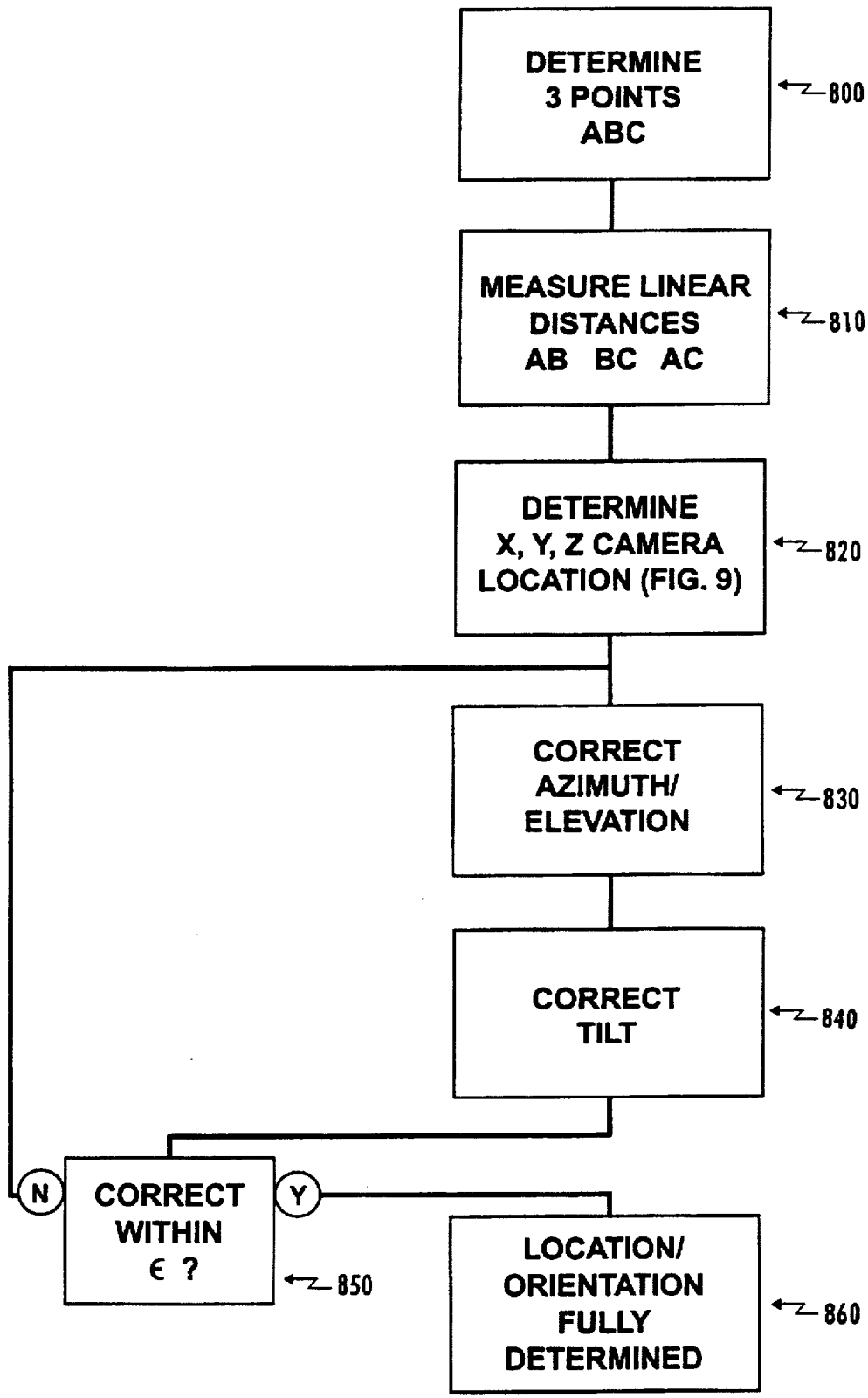
FIG. 56 is a flow chart of the algorithm used to determine camera distance and orientation.

FIG. 56 illustrates the process utilized to fully determine the location and orientation of a camera from the image. At step 800, one determines the location of the calibration points A, B and C and either knows or measures the distances between them (810). The camera location in XYZ coordinates is determined using the technique set forth in FIG. 9. Once the XYZ camera location is determined, corrections are made to azimuth and elevation (830) and then to tilt (840). With azimuth and tilt correction made, one determines whether the points are correctly located within a desired accuracy $\epsilon$ (850). If they are, the location and orientation of the camera is fully determined (860) and the process ends. If they are not, another iteration of steps 830 and 840 is undertaken to bring the location determination within the desired accuracy.

Figure 57:
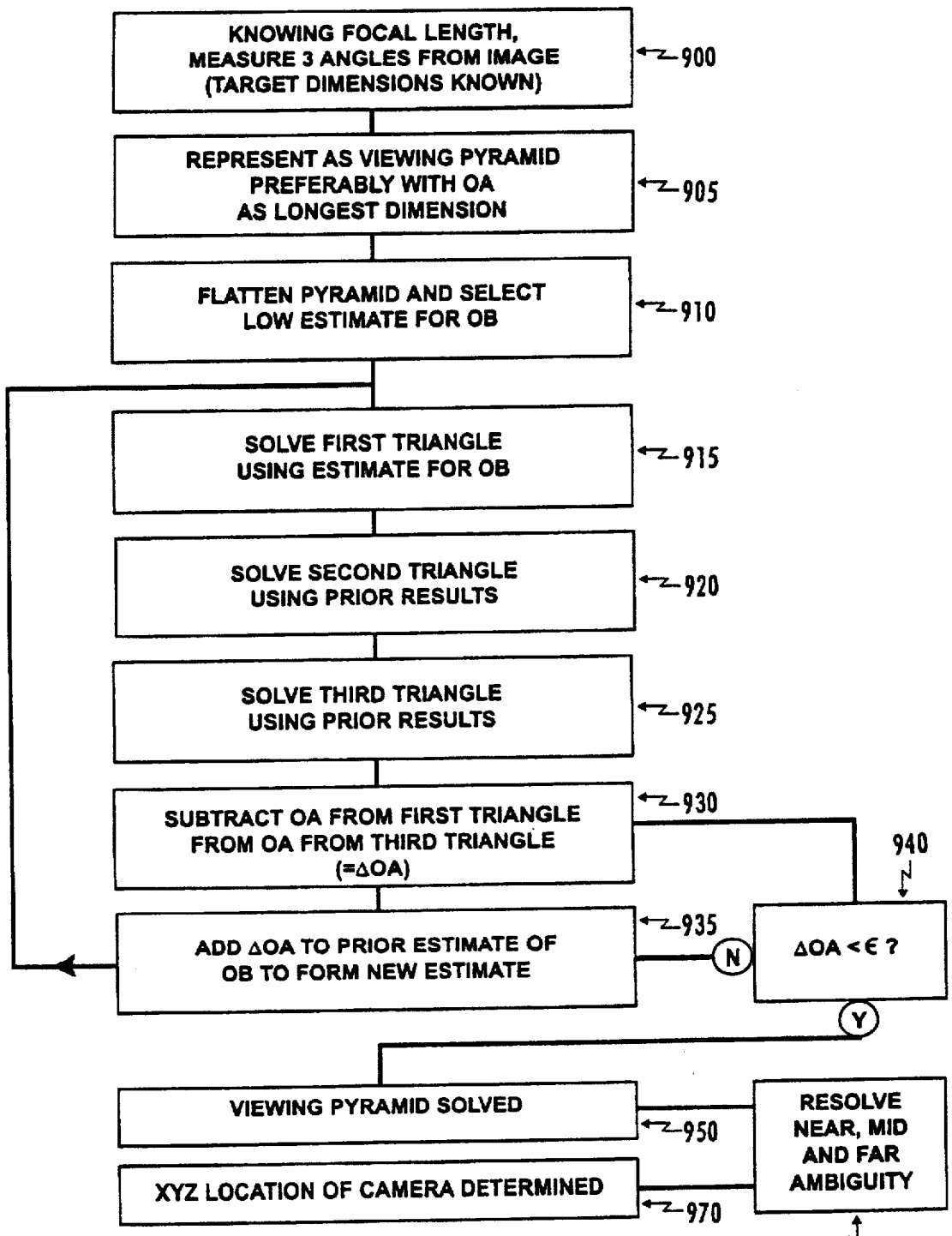
FIG. 57 is a flow chart of the algorithm used to calculate camera location.

FIG. 57 illustrates the details of block 820 of FIG. 56. Knowing the principal distance of the camera, one measures the three angles AOB, BOC and COA from the image plane (900). A viewing pyramid is constructed with distance OA assumed as the longest dimension (905). The pyramid is flattened and a value estimated for line segment OB which is known to be low (910). Using the estimate for OB, the first triangle is solved (915). Second and third triangles are then sequentially solved using the results of the prior calculations (920 and 925). If the difference between the value for OA calculated in connection with the first triangle differs from the value for OA calculated from the third triangle (930) by an amount greater than $\epsilon$ (940), the value $\Delta$OA is added to the prior estimate of OB to form a new estimate and a new iteration of steps 915, 920, 925, 930 and 940 occurs. If $\Delta$OA<$\epsilon$ (940), then the viewing pyramid is solved (950) and it is only necessary to resolve the near, mid and far ambiguity (960) before the objective of totally determining the position and orientation of the camera (970) is achieved.

Figure 58:
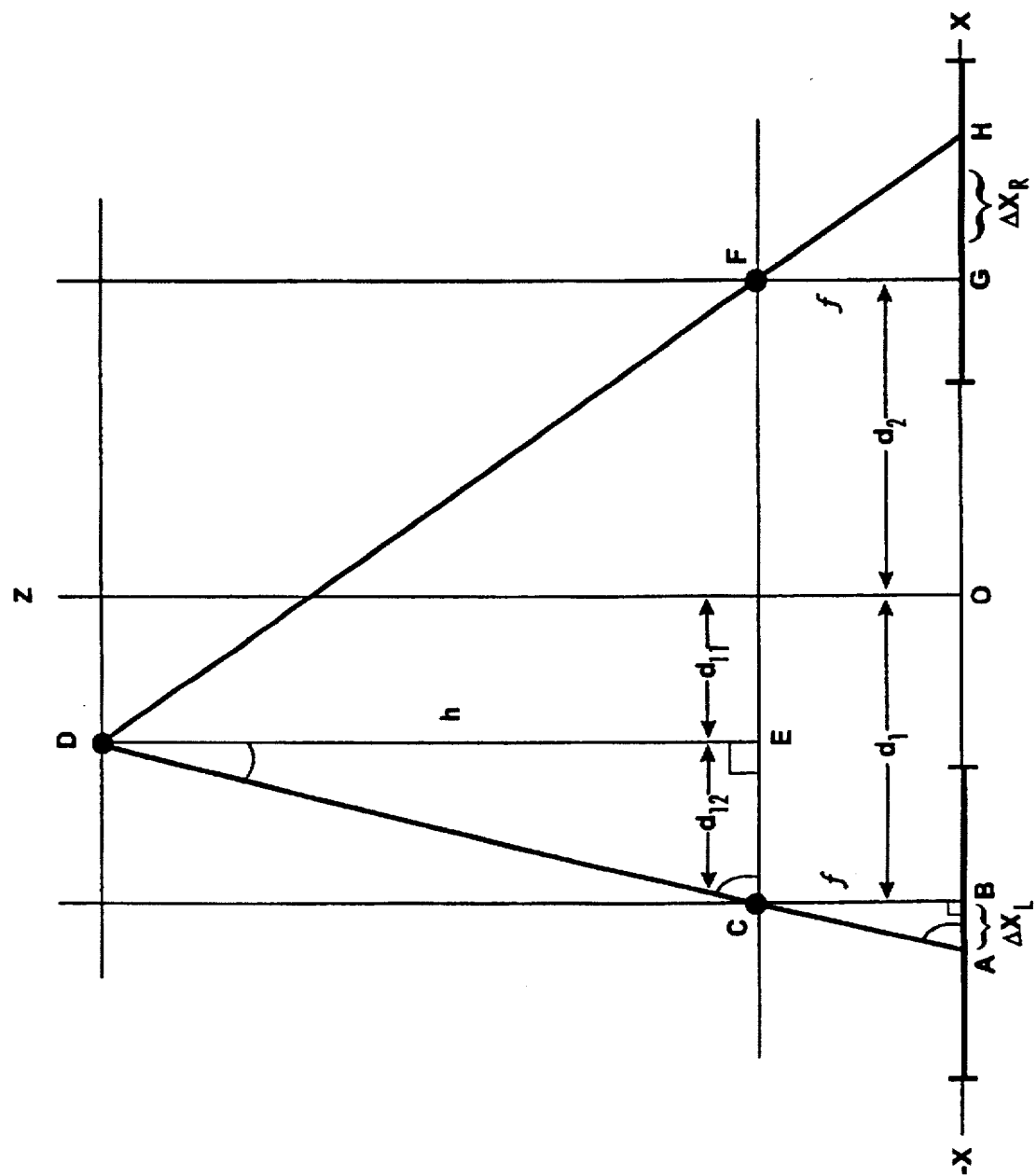
FIG. 58 is an illustration of how to calculate the distance of a point from a line joining the principal points of two cameras.

If the images had been captured with two cameras aligned as shown in FIG. 58, the location of the point $X_1$, $Y_1$, $Z_1$ would be calculated as follows:

Assume a set of axes with origin at 0, the X and Z axes as shown in FIG. 58 and the Y axis being perpendicular to the plane of the page. Assume that the images are captured with an objective at point C and an objective at point F in FIG. 58. The distance between C and F being $d_1+d_2$. The camera capturing the image will have a known focal length F and the image plane corresponding to each of the points at which the image is captured is shown in a heavy line on the X axis. The distance of the point labeled D from the line joining the focal points of the camera (C & F) can be calculated as follows:

Triangles ABC and CED are similar in a geometric sense and triangles DEF and FHG are also similar.

Because they are similar, $$\frac{h}{f} = \frac{d_{12}}{\Delta X_L} \qquad (15)$$

$$\frac{h}{f} = \frac{d_2 + d_{11}}{\Delta X_R} \qquad (16)$$

$$d_1 = d_{11} + d_{12} \qquad (17)$$

$$\frac{h}{f} = \frac{d_{12}}{\Delta X_L} = \frac{d_2 + d_{11}}{\Delta X_R} \qquad (18)$$

Equating (20) and (21) as shown in (23) and the subtracting the right hand term from both sides of the equation results in:

$$\frac{d_{12} \Delta X_R - (d_2 + d_{11}) \Delta X_L}{\Delta X_L \Delta X_R} = 0 \qquad (19)$$

For (24) to be true, the numerator must=0.

$$d_{12}\Delta X_R - (d_2 + d_{11}) \Delta X_L = 0 \qquad (20)$$

Solving equation 22 for $d_{11}$, substituting in equation 25 and moving the right term to the right side of the equation results in:

$$d_{12} \Delta X_R = (d_2 + d_1 - d_{12}) \Delta X_L \qquad (21)$$

$$d_{12} (\Delta X_R + \Delta X_L) = (d_2 + d_1) \Delta X_L \qquad (22)$$

$$d_{12} = \frac{(d_2 + d_1) \Delta X_L}{(\Delta X_R + \Delta X_L)} \qquad (23)$$

$$d_{11} = d_1 - \frac{(d_2 + d_1) \Delta X_L}{(\Delta X_R + \Delta X_L)} \qquad (24)$$

$$h = f \frac{(d_2 + d_{11})}{\Delta X_R} = f \frac{d_{12}}{\Delta X_L} \qquad (25)$$

Figure 59:
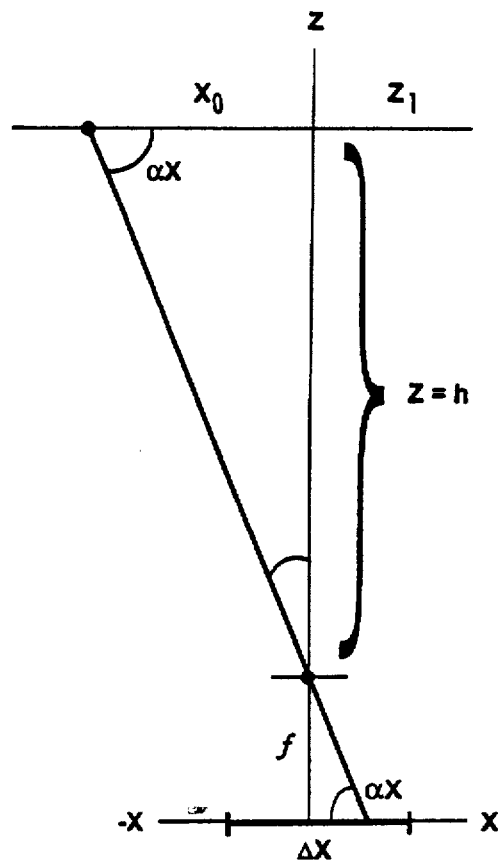
FIG. 59 is an illustration of the calculation of the location of a point in the X direction.
Figure 60:
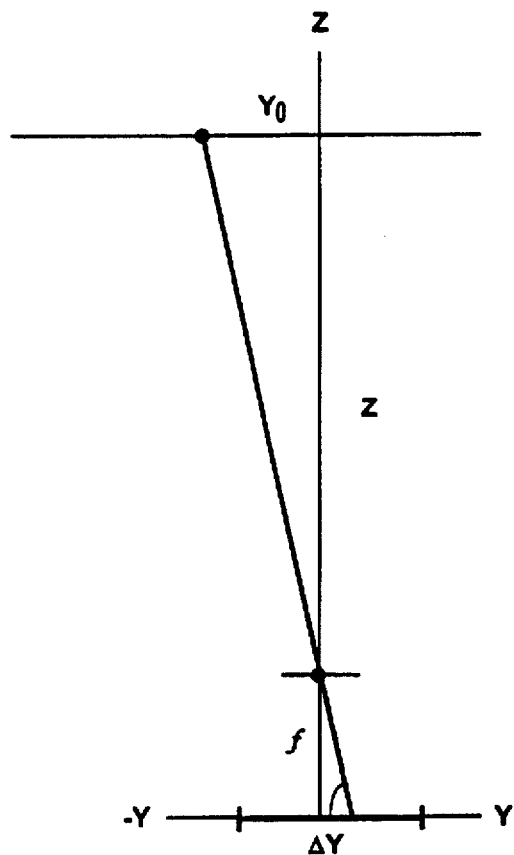
FIG. 60 is an illustration of the calculation of the location of a point in the Y direction.

Once h is known, the coordinates $X_O$ and $Y_O$ of the point O can be defined with respect to a camera axis by the following. See FIGS. 59 and 60.

$$\alpha_x = \tan^{-1} f/\Delta X \qquad (26)$$

$$\alpha_y = \tan^{-1} f/\Delta Y \qquad (27)$$

$$X_O = -h \cot \alpha_x \qquad (28)$$

$$Y_O = -h \cot \alpha_y \qquad (29)$$

In capturing images under field conditions, the positioning of cameras as shown in FIG. 58 is rarely so cleanly defined.

Figure 61:
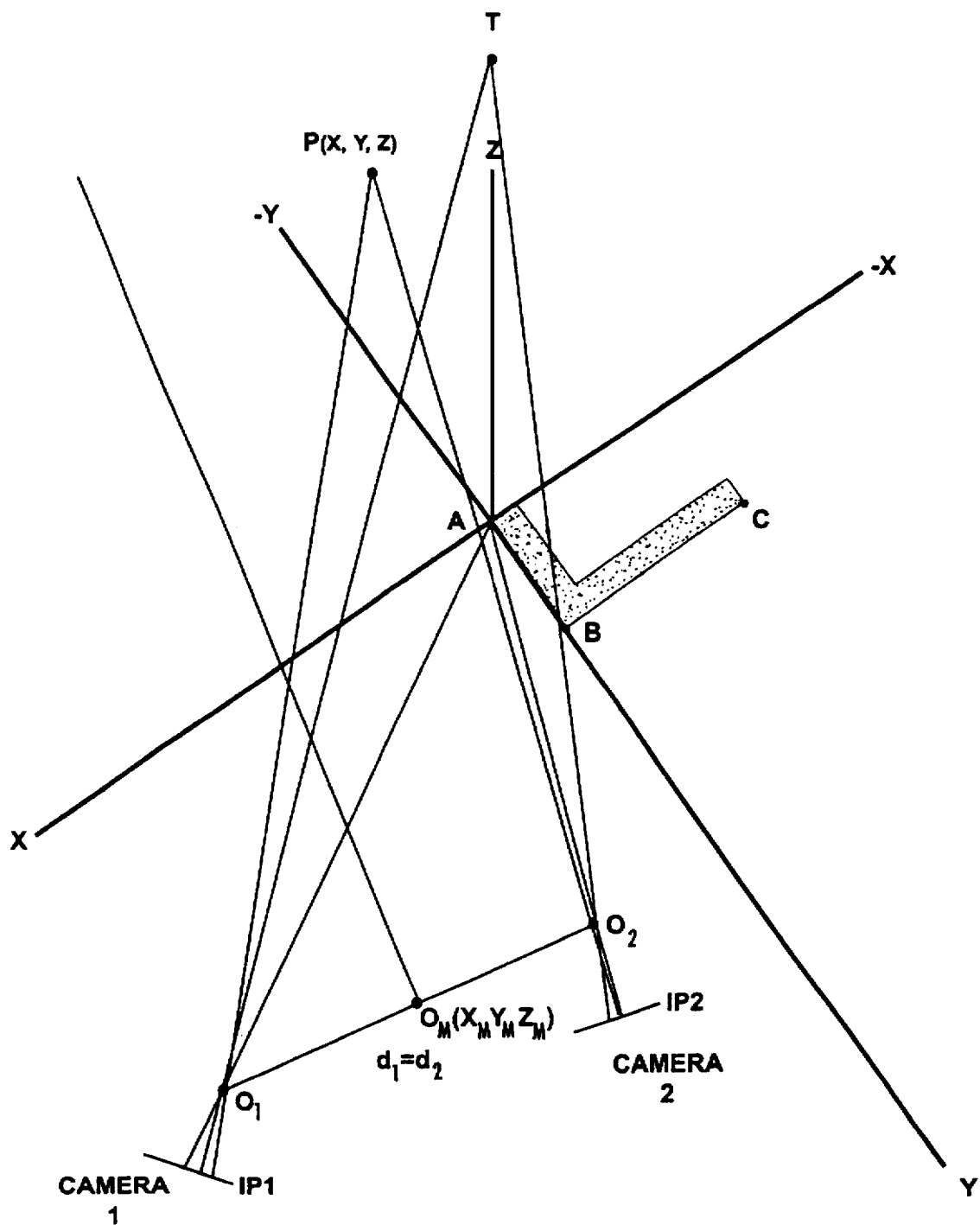
FIG. 61 is an illustration of how to calculate point location generally given a determination of the location and orientation of the camera at the time when two images were captured.

FIG. 61 illustrates a typical real world situation. In FIG. 61 the points A, B and C represent the calibrated target or the points measured subsequent to image capture. The coordinate system X, Y and Z is established in accordance with the conventions set forth above with A as the origin. Camera positions 1 and 2 illustrated only by their principal points $O_1$ and $O_2$ respectively and their image planes $IP_1$ and $IP_2$ respectheily, are positioned with their principal points located at $O_1$ and $O_2$ and with their optical axis pointed at point T which would be the center of the field on the image plane. One desires to obtain the coordinates $(X_1, Y_1, Z_1)$ for an arbitrary point P.

Figure 10:
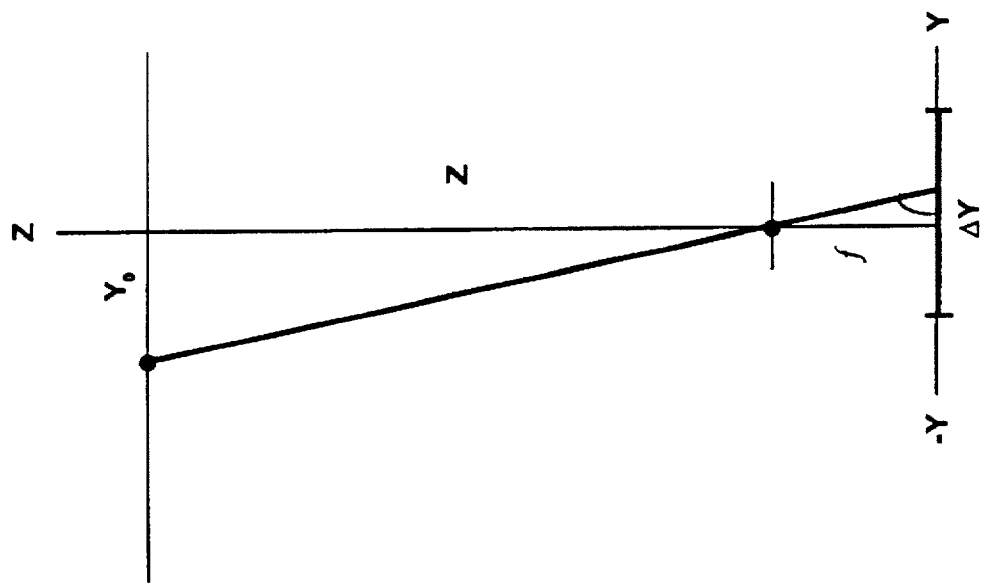
FIG. 10 is a representation of relationships utilizable to obtain the Y offset from the Z coordinate and image information.

This can be accomplished by a two-stage transformation. If one were to draw a line between the focal points $O_1$ and $O_2$ and define a mid-point OM $(X_m, Y_m, Z_m)$ at the center of that line, and then if one were to perform an azimuthal rotation and if the same kind of rotation were applied to camera 2 about focal point $O_2$ then, the cameras would be oriented as shown in FIG. 10 and the coordinates for point P could be calculated using equations 15–19 as shown above. However, the coordinates calculated are with reference to point O of FIG. 58 which corresponds to point $O_m$ of FIG. 61. To obtain the coordinates of point P with reference to the world coordinate system defined for measurements requires then only a simple coordinate transformation to change the representation from a coordinate system centered at $O_m$ to one centered at point A. This is done routinely using well-known mathematics.

Figure 62:
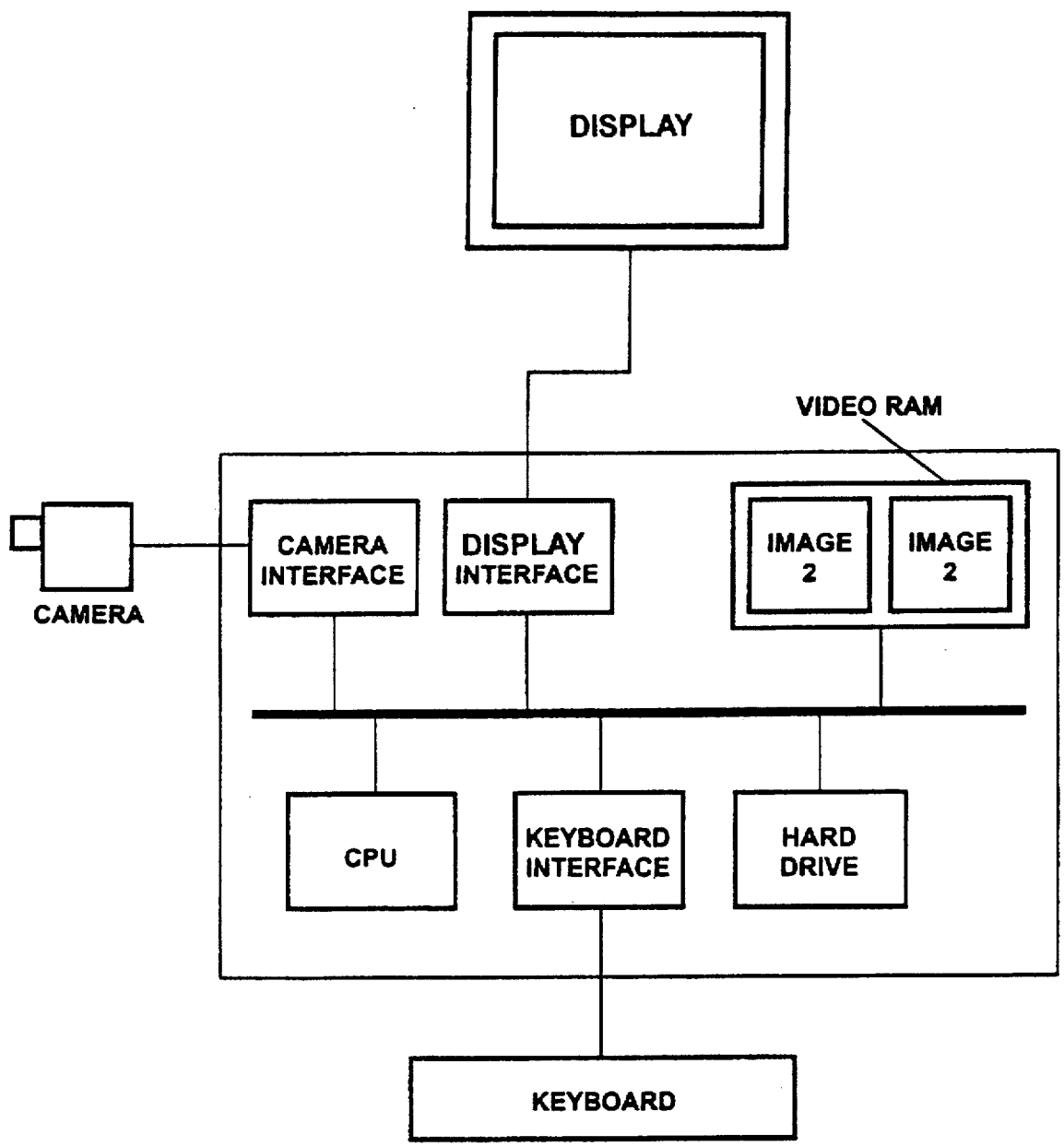
FIG. 62 is an illustration of hardware utilized in accordance with the invention.

FIG. 62 illustrates hardware utilized to carry out certain aspects of the invention. Camera 1400 is used to capture images to be analyzed in accordance with the invention. Camera 1400 may be a digital still camera or a video camera with a frame grabber. Images from the camera are loaded onto computer 1420 using camera interface 1410. Normally, images loaded through interface 1410 would be stored on hard drive 1423 and then later retrieved for processing in video RAM 1430. However, images can be loaded directly into video RAM if desired. Video RAM 1430 preferably contains sufficient image storage to permit the simultaneous processing of two images from the camera. Video display 1440 is preferably a high resolution video display such as a cathode ray tube or a corresponding display implemented in the semiconductor technology. Display 1440 is interfaced to the computer bus through display at interface 1424 and may be utilized to display individual images or both images simultaneously or three dimensional wire frames created in accordance with the invention. Keyboard 1450 is interfaced to the bus over keyboard interface 1422 in the usual manner.

When utilizing a computer implementation, such as found in FIG. 62, distance measurements may be conveniently measured in number of pixels in the vertical and horizontal direction which may be translated into linear measurements on the display screen knowing the resolution of the display in vertical and horizontal directions. Numbers of pixels may be readily determined by pointing and clicking on points under consideration and by obtaining the addresses of the pixels clicked upon from the cursor addresses.

Thus, by knowing the position and orientation of the cameras or other image capture devices, as determined from images analyzed after the capture, one can calculate the precise position in terms of the XYZ real world coordinates in a system centered at point A thus enabling one to specify with great accuracy the position of those points relative to the real world coordinate system.

The techniques set forth herein permit accurate forensic surveying of accident or crime scenes as well as accurate surveying of buildings or construction sites, particularly in the vertical direction which had heretofore been practically impossible.

Figure 63:
FIG. 63 is an illustration of one view of a face to be utilized to create a wire frame representation.

The creation of a wire frame representation of a complex image, such as that shown in FIG. 63, is difficult because a large number of vertices must be defined to give a realistic approximation of the overall structure of the complex object, such as that of a head. As described herein and in the aforesaid patent applications, one way of identifying the location of points in a three-dimensional space involves the use of two images, captured from two different perspectives. By identifying corresponding points on the two images, and by knowing certain information about the camera locations, one can calculate the location of the common point in a three-dimensional coordinate system.

To create a wire frame representation of a complex object such as a head in a three-dimensional coordinate system therefore requires a tedious process by which two images are viewed in corresponding points on those two images or identified, one set of points at a time, and for each set of points a calculation is undertaken to identify the location of that point in the three-dimensional coordinate system. A data base of points in the three-dimensional coordinate system then is utilized to define the vertices of a wire frame representation. For complex surfaces, it may be necessary to identify hundreds or thousands of points in order to create a realistic wire frame representation. This is a long and tedious process which deters ready use of the technology.

Figure 64:
FIG. 64 is an illustration of the face shown in FIG. 1 showing the placement of certain wire frame vertices at certain points important to a realistic wire frame representation of a face.

FIG. 64 illustrates the image of FIG. 63 with several points identified which might be utilized in the capture of the wire frame of the face shown in FIG. 63.

Another problem associated with the capture of three-dimensional wire frames is the fact that some objects contain large areas of smooth surfaces without identifying characteristics thus making it difficult to identify corresponding points in the images captured from different perspectives. For example, in FIG. 2, the cheek areas lack any significant detail which could serve as landmarks for identifying the corresponding point in two images captured from different perspectives. Thus, accurate profile information is difficult to obtain for such smooth areas.

Figure 65:
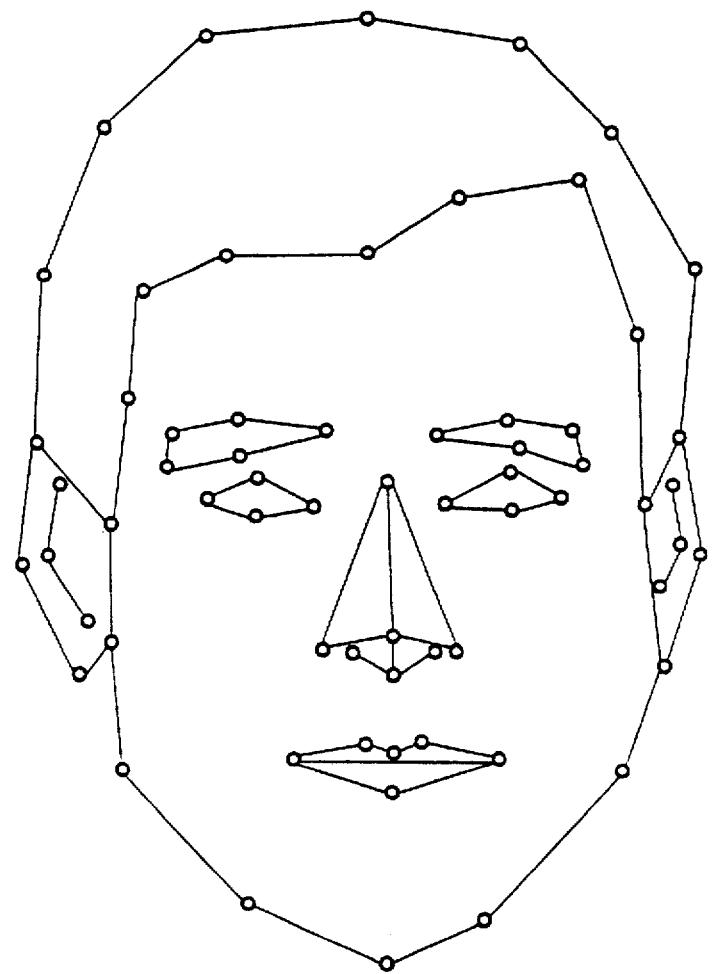
FIG. 65 is an illustration of certain wire frame vertices shown in FIG. 2.

FIG. 65 illustrates a perspective view of the wire frame vertices depicted in FIG. 64. As one can see from FIG. 65, a wire frame, while capturing depth information, lacks surface detail necessary to render a realistic object. The process of adding surface detail to a wire frame, analogous to placing a skin over the wire frame so it appears real is called "rendering." Techniques for rendering wire frames are found in the above-identified applications. The realistic nature of the rendering described in this application permits realistic representations even when relatively few vertices are utilized in the wire frame because the surface representations transformed appropriately for orientation give realistic queues to depth that would otherwise be missing. Thus, using the rendering techniques of the aforesaid application, fewer vertices may be selected which enables easier wire frame capture because not so many point sets need to be processed. Such rendering also relaxes the processing requirements on the image processing software and hardware because fewer points need to be processed. When the wire frame of FIG. 65 is appropriately rendered, the objective, of course, is to give a reconstructed appearance like unto to that shown in FIG. 63 which, because the wire frame representation can be rotated or otherwise manipulated in three-dimensional space, permits either three-dimensional stereo or regular perspective viewing.

Figure 66A:
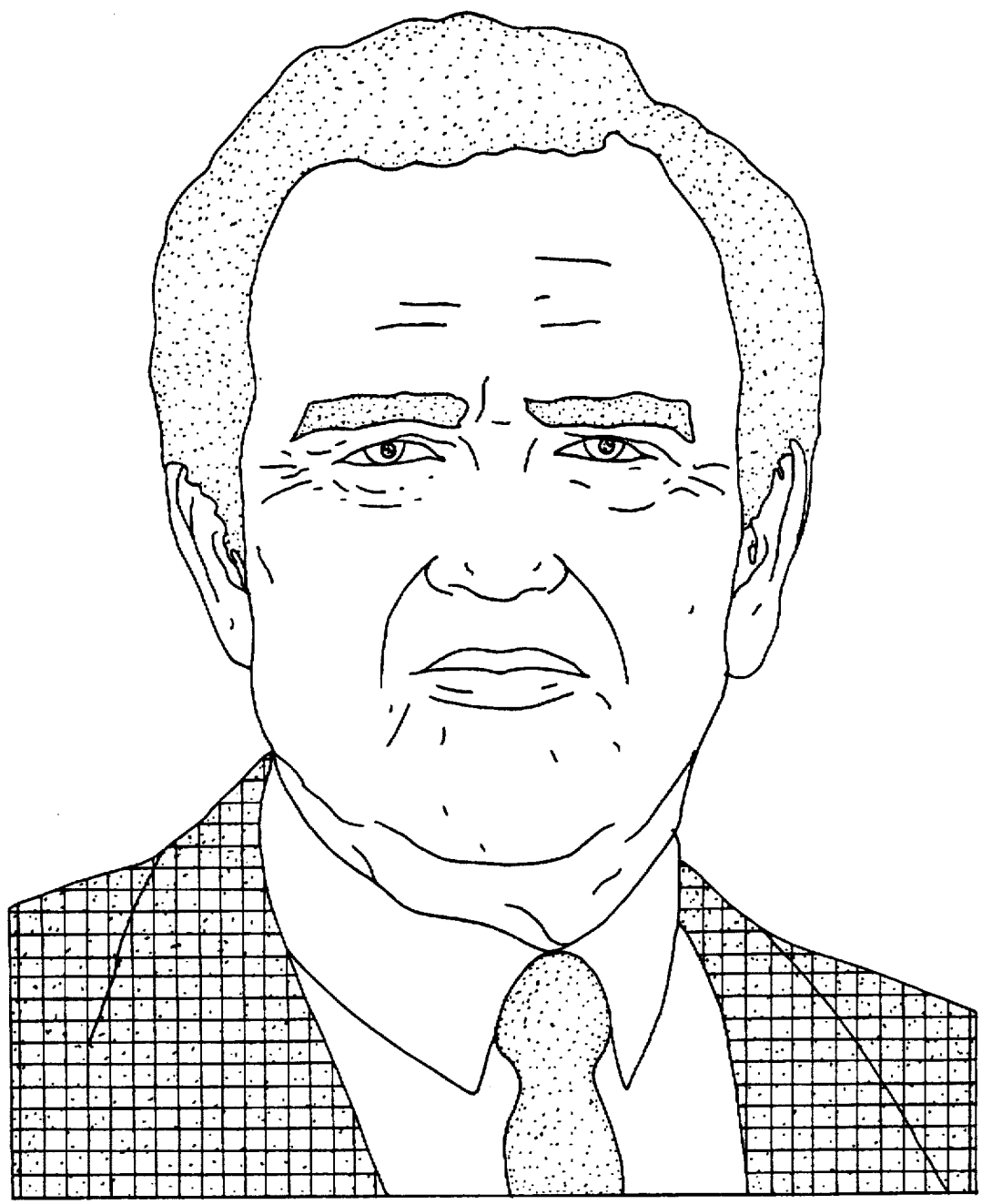
FIG. 66A is an illustration of a view of a different face from that shown in FIGS. 1-3.

If one were to desire to capture a wire frame of a second complex image, such as the face shown in FIG. 66A, one would need to go through the entire tedious and laborious process described above of capturing points for the wire frame by repeatedly identifying point sets in two images to permit calculation of depth. In accordance with the invention, creation of wire frames is vastly simplified by utilizing a prototypical or generic wire frame for the class of objects involved. For example, if the wire frame illustrated in FIG. 65 were captured, it could be utilized as a generic wire frame or a template for the creation of a wire frame of the face shown in FIG. 66A.

Figure 66B:
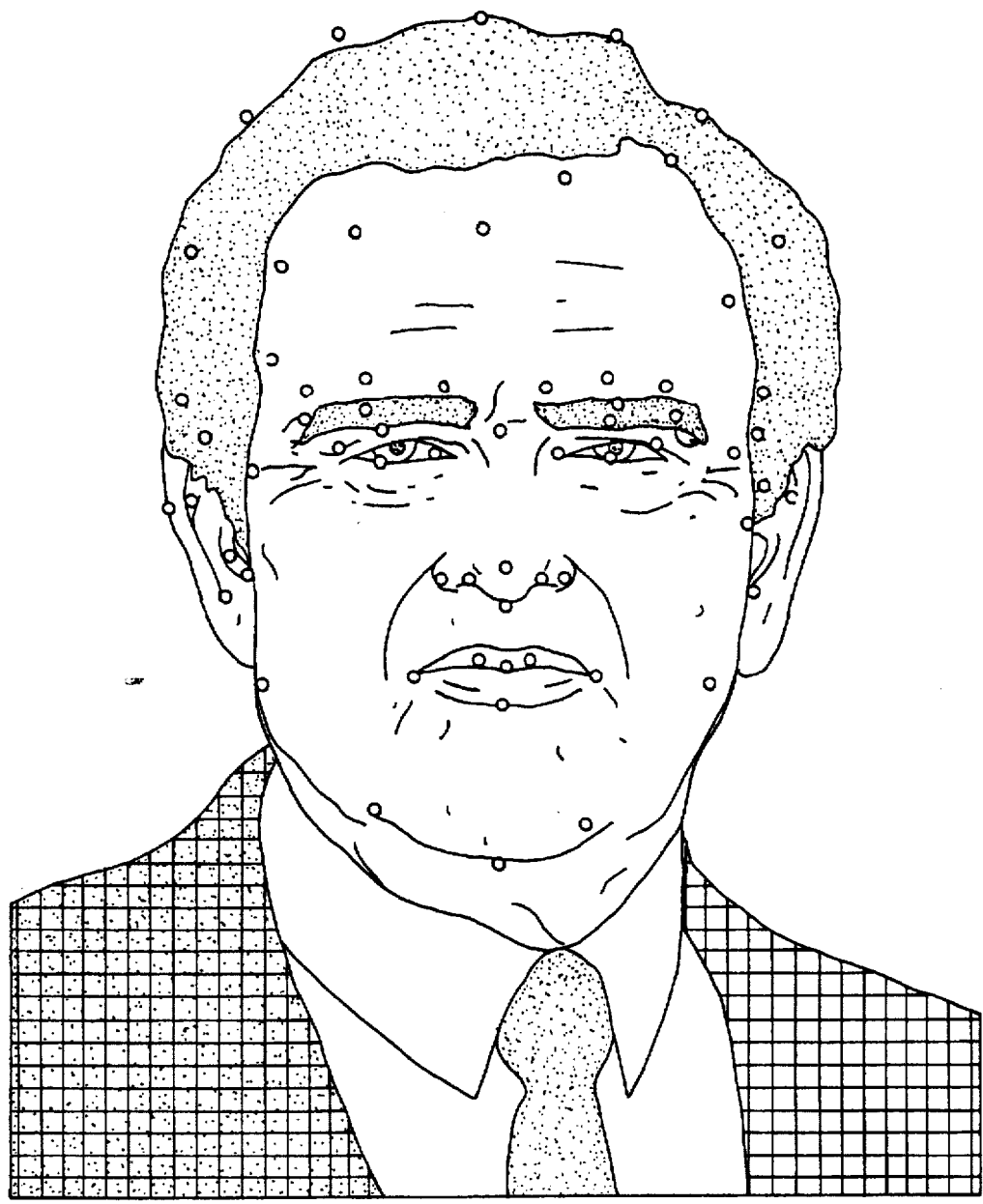
FIG. 66B shows the face of FIG. 4A with certain wire frame vertices shown in FIG. 3 superimposed.

FIG. 66B shows the wire frame of FIG. 65 overlaid on the image of FIG. 66A. The generic wire frame of FIG. 65 is comprised of vertices including, inter alia, the visually more important points for identification of a face. These include points such as the corners of the eye, the edges of the mouth, the extremes of the eyebrow, the point of the nose and points demarking the width of the nose.

Considering FIG. 66B, one point, preferably the point of the nose, is utilized to align a generic wire frame overlay on the images which are desired to be represented as a three-dimensional wire frame. One does not expect a generic wire frame to match the face to be represented in a wire frame. However, with this super position, it is a relatively easy task to modify the location of vertices by dragging and dropping on the respective images so that the points of the generic wire frame are relocated to coincide with corresponding points on the image to be captured in a wire frame representation. Thus, by editing a generic wire frame utilizing drag and drop of the respective vertices, one can modify a generic wire frame into a custom or specific wire frame which captures the particular object of the class of objects represented by the generic wire frame. In FIG. 66B, this is illustrated by arrows showing the movement of certain vertices, represented as small circles from their location in the generic wire frame to the appropriate position on image 4A. By these modifications, a generic wire frame is customized into a specific wire frame representing the image desired to be captured. This editing process is vastly simplified compared with the time and effort required to capture a wire frame from source images.

It is clear that different classes of objects would have their own prototypical or generic wire frame. For example, a wire frame of a car might be captured and utilized as a basis for the creation of new wire frames such as those associated with the design of a new vehicle without the necessity of creating the model of a new vehicle and capturing the wire frame from images of the model captured from different perspectives. In accordance with the invention, it may be desirable to provide a tool box of generic wire frames bundled with editing software to facilitate the rapid creation of custom wire frames that are suitable to a user's needs. Alternatively, one can utilize the first instance of a wire frame created for a particular instance of a class of objects and utilize that as a generic wire frame for creating additional instances having different appearances.

Figure 67:
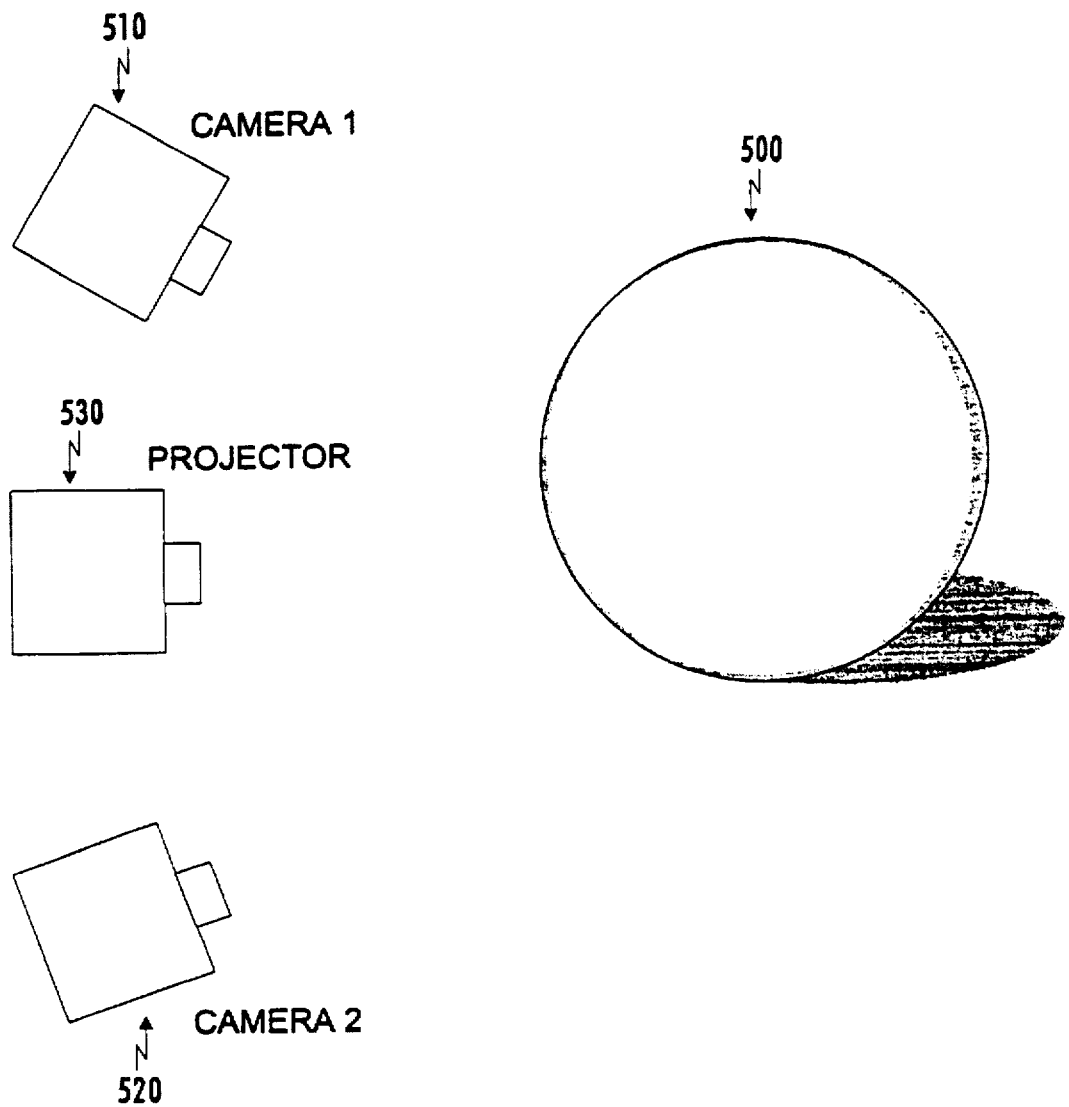
FIG. 67 is an illustration of the use of a projection to assist in the capture of wire frame information.

FIG. 67 illustrates a technique for capturing wire frame information where considerable areas of smooth surfaces exist without identifying detail which would permit the identification of point sets corresponding to a common physical point on the images captured from different perspectives. A sphere 500 with a smooth surface would be a difficult object for identifying corresponding points on two images captured by either one camera at location 510 which is then moved to location 520 or by two cameras at respective locations 510 and 520.

In accordance with the invention, projector 530 is utilized to project onto the smooth surface a pattern which can be utilized for the identification of points on the surface. In one embodiment, the pattern is a grid. However, in the preferred embodiment, the pattern is a colored confetti projection. That is, the pattern consists of projection of randomly spaced bright colored dots onto the surface. These bright colored dots would then appear in the image and could be utilized to locate corresponding points using simplified image processing of the type set forth above. Automatic correlation techniques as described above could be utilized to identify corresponding points of two images automatically using the projected patterns and a very accurate depth profile could be achieved for the smooth surface as described in the aforesaid patent application without the need for the manual entry of points on the two images.

The projection of a pattern can be utilized to identify corresponding points in two images captured with the projector on. The colored dots could then be eliminated from the captured image by image processing techniques after capture or, alternatively, one could capture rendering information in a separate image from the same camera locations with the projector off. By utilizing the projected pattern as reference points, corresponding points in the two images can be identified and a very accurate wire frame generated.

By capturing images from a number of perspectives around, above and below the object, a complete wire frame representation of the image in three dimensions can be obtained. As shown in FIG. 67 by the camera positions, each image has a perspective point of view determined by the position of the camera. The camera position is essentially the same as the perspective of a view of the image captured with the camera. The image captured differs depending upon where the camera is positioned. It can be positioned closer (zooming in), it can be positioned further away (zooming out) or it may be positioned at any location around, above or below the object.

Figure 68:
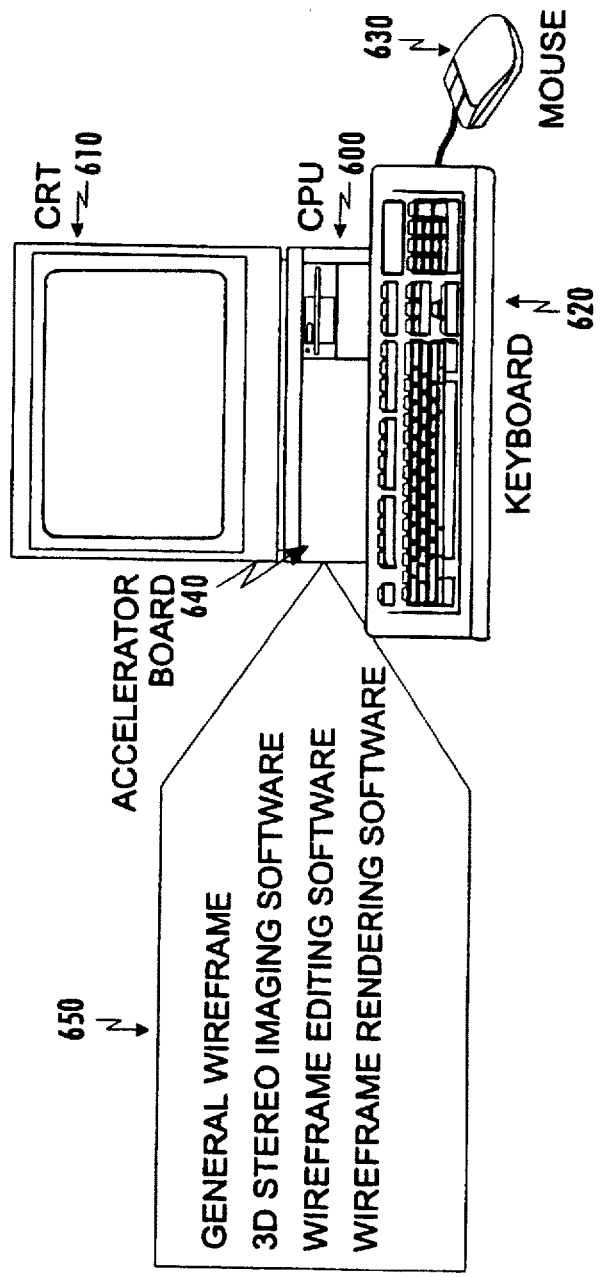
FIG. 68 is an illustration of computer apparatus suitable for implementing the invention.

When using a three dimensional wireframe to view an object, the position of the viewer, like the position of the camera determines what the view of the wireframe is. FIG. 68 illustrates computer hardware and software which can be used for implementing the invention.

CPU 600 is a standard personal computer class CPU preferably of the 68486 class or better with an appropriate display 610, preferably a high resolution display. Input output devices comprise keyboard 620 and mouse 630 and may optionally or alternatively include any of a large number of I/O devices. The hardware compliment is supplemented with an accelerator board 640 of the type shown in FIG. 1. In addition to the usual compliment of operating system and communication software, the computer is equipped with some specialized files and software as indicated in 650. A set of generic wire frames is preferably stored for access in the development of wire frames of various sorts. Software for the creation of three-dimensional stereo images is included along with software for editing wire frames as described herein. Software for rendering wire frame images is preferably a rendering package sold under the trademark QuickLook™ from Synthonics™ Incorporated of Westlake Village, Calif.

Figure 69:
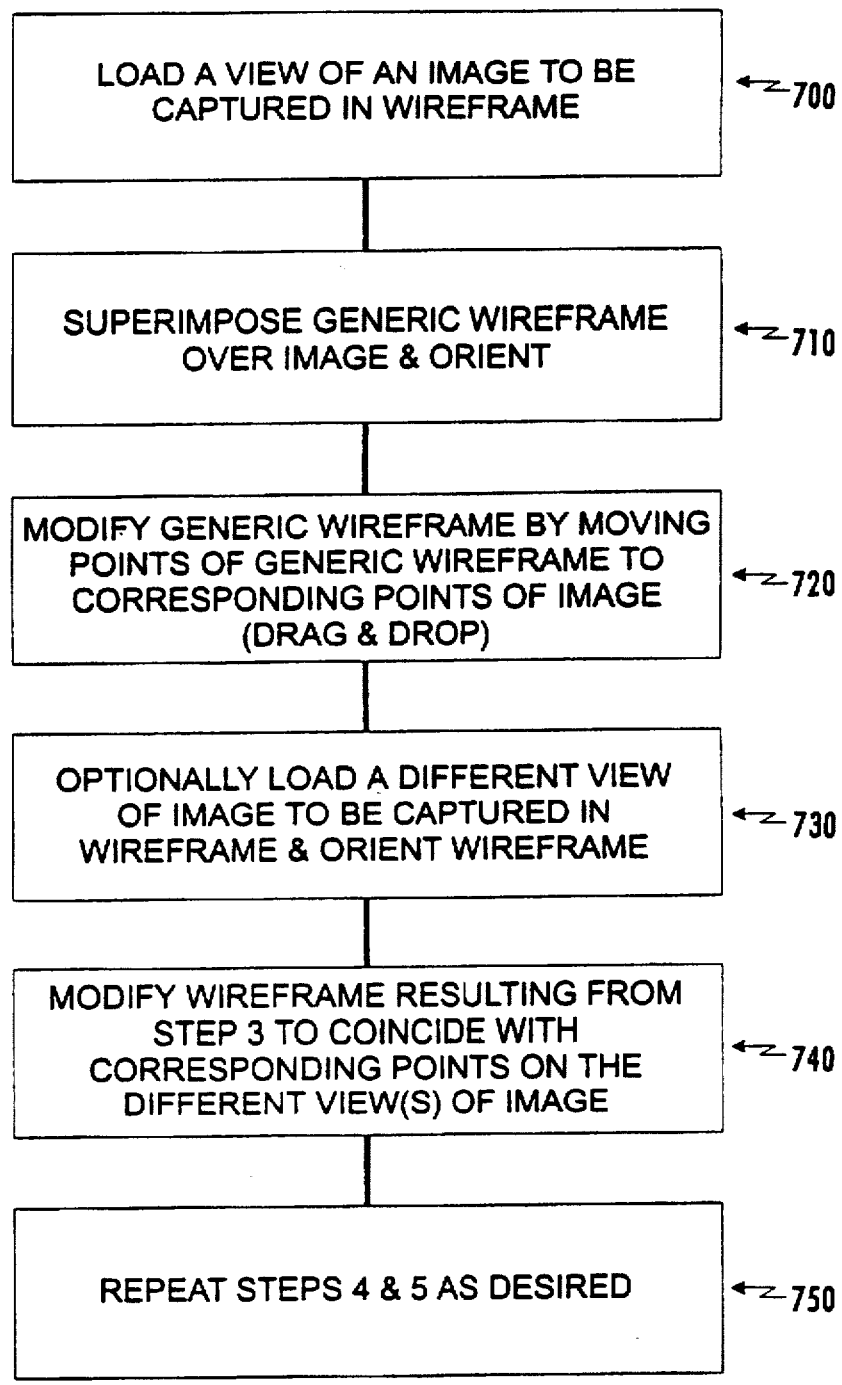
FIG. 69 is a flow chart of a method by which generic wire frames are customized to specific applications.

FIG. 69 is a flow chart of the method by which generic wire frames are customized to specific applications. At step 700, a view of one or more images to be captured in wire frame is loaded into the memory of the computer (700) and displayed on the display screen. This corresponds to image 4A, as described above. A generic wire frame, such as that illustrated in FIG. 65, is superimposed over the image loaded in step 700 and oriented so that at least one common point, such as the point of the nose, coincides with the corresponding point on the image (710).

At step 720, the generic wire frame is modified by moving points of the generic wire frame to positions which correspond to points on the image to be represented in a wire frame using drag and drop. As shown in FIG. 66B, at least some of the wire frame vertices from the generic wire frame do not coincide with what should be corresponding points on the face to be represented in wire frame. However, many of them do coincide. In FIG. 66B, only small relocations are required for vertices in the vicinity of the nose whereas more substantial relocation is required for vertices near the upper portion of the eyebrow. Using a generic wire frame, much of the tedium associated with identifying and locating vertices to be used in the creation of the wire frame is avoided.

Rather, existing vertices are simply moved utilizing drag and drop techniques to new locations where they will more closely approximate the image to be captured on wire frame.

At step 730, if a full 360° generic wire frame is utilized, it is desirable to have images of the object to be represented in wire frame which view the object from perspectives which cover the entire 360° of rotation as well as above and below. Step 730 reflects this where a plurality of different views of an image to be captured in wire frame are sequentially loaded and the generic wire frame oriented to match the view of that image. Then, vertices which are not aligned with the new view of the image are adjusted using drag and drop to be appropriately located (step 740).

This process can then be repeated for as many images as are required to obtain the desired three-dimensional stereo wire frame representation.

Information about wire frame vertices or points are maintained in a point data base, a sample of which is illustrated in FIG. 70. Each vertex is assigned a point number in the order in which the point numbers are entered into the data base. Associated with each point number are the coordinates of the left image at which location the point appears and the coordinates of the right image at which the same point appears in the right view. A real world coordinate system is defined as set forth above and the real world coordinate system is utilized for locating points in a three-dimensional space consistently across views. Each point contains optional fields identifying the predecessor and successor point which are utilized in adding points or deleting points so that more details can be added or unnecessary details deleted from the representation.

Figure 71:
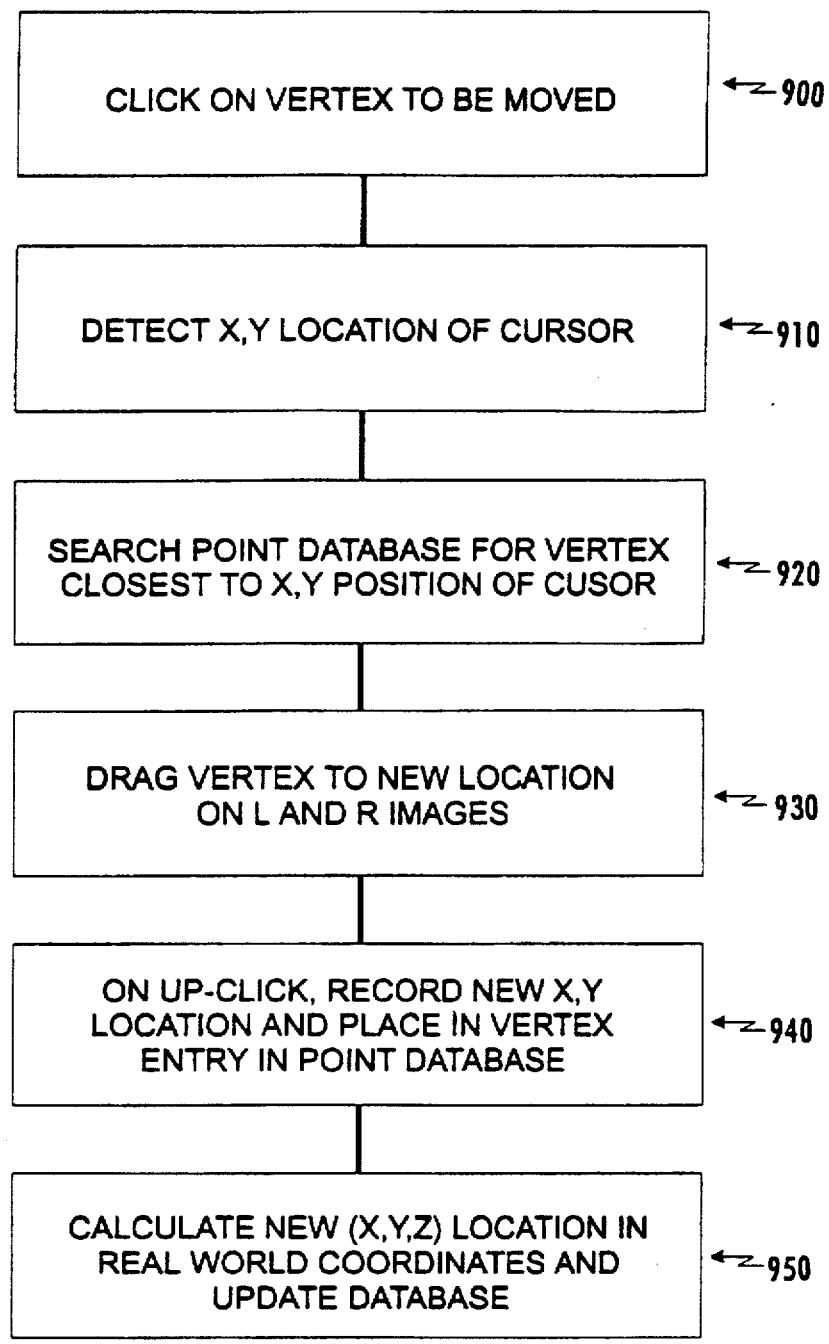
FIG. 71 is a flow chart of how to modify a vertex of a wire frame using drag and drop.

FIG. 71 is a flow chart of how to modify the location of a vertex of a wire frame using drag and drop. Initially, a user places the cursor on or near the vertex to be moved and depresses a mouse button (900). Upon depression of the mouse button, the location of the cursor on the XY screen is detected (910) and a search is undertaken (920) to identify the vertex closest to the XY position of the cursor in the point data base. Holding the mouse button down, cursor is dragged to a new location on one of the left and is right images and the mouse button released. When the mouse button is released, the new X and Y coordinates are recorded in the appropriate entry in the point data base. The same operation is repeated for the other of the left and right image. Once the vertex has been relocated in both the left and right images, a new XYZ location in the real world coordinate system is calculated and the database updated (950).

Figure 72:
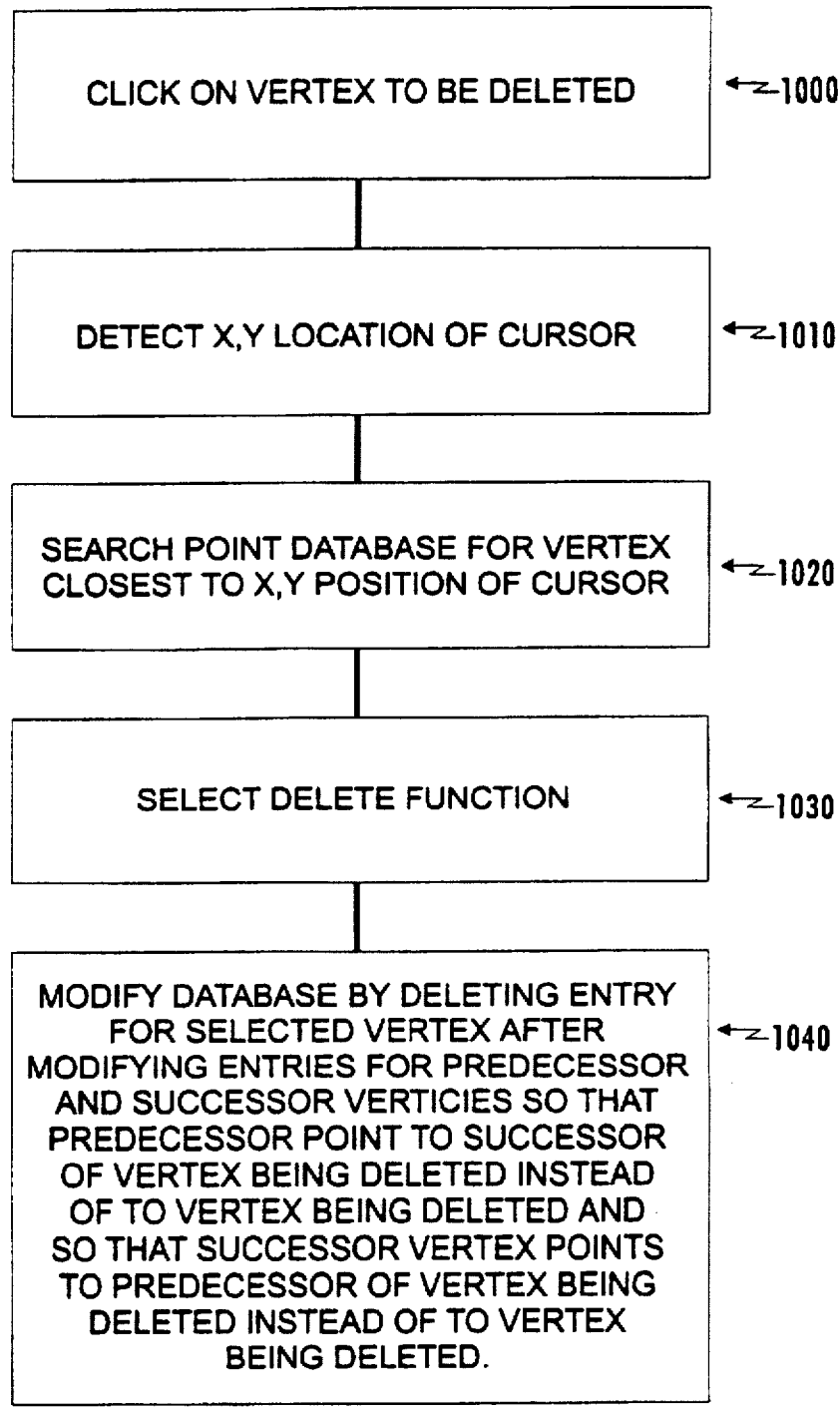
FIG. 72 is a flow chart of how to delete a vertex.

FIG. 72 is a flow chart of how a vertex can be deleted from the wire frame. Using the mouse, the cursor is placed on or near the vertex to be deleted (1000) and the mouse button depressed. The XY location of the cursor is detected (1010) and a search is undertaken to identify the vertex closest to the XY position of the cursor in the point database (1020). A "delete vertex" function is selected (1030) and executed. During execution, the point database is modified by deleting the entry for the selected vertex after modifying entries for predecessor and successor vertices so that the predecessor vertex points to the successor of the vertex being deleted instead of to the vertex being deleted and so that the successor vertex points to the predecessor of the vertex being deleted instead of to the vertex being deleted. Thus, a consistent chain of successor and predecessor vertices is maintained.

Figure 73:
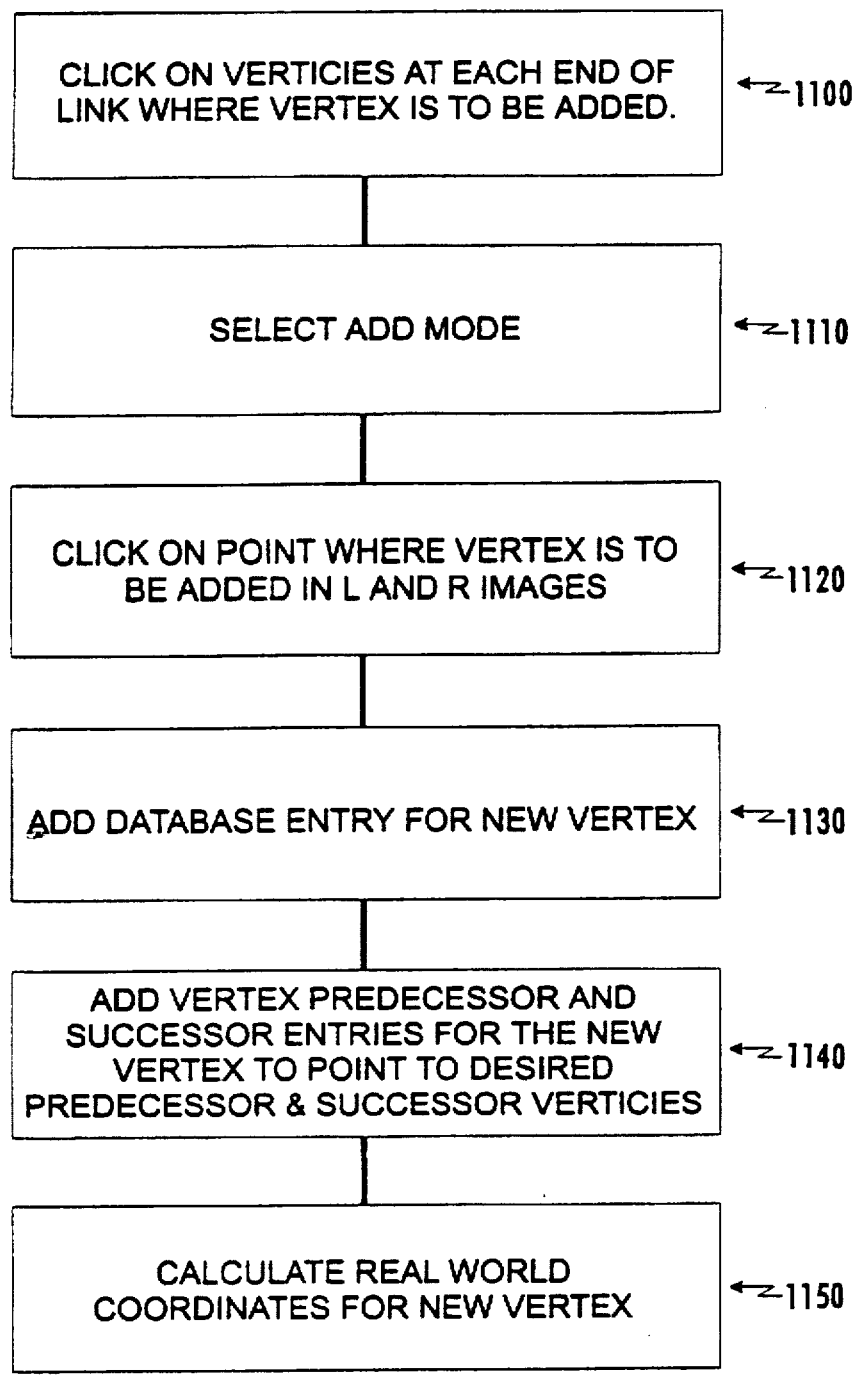
FIG. 73 is a flow chart of how to add a vertex.

FIG. 73 is a flow chart of how to add a vertex to the wire frame. Such addition may be desirable when additional detail needs to be depicted and a path between two vertices needs to be rerouted through one or more additional points.

To add a vertex, one clicks on the vertices at each end of the link joining two vertices between which the additional vertex is to be added (1100) and an add execute mode is selected (1110). Then, the point where the vertex is to be added is clicked on in one of the left and right images and the corresponding point clicked on in the other of the left and right images. A new entry is added to the point database (1130) and the XY coordinates for each of the left and right images are stored in a new XYZ and the real world coordinate system calculated and inserted into the database (1130). Vertex predecessor and successor entries for the new vertex are added (1140) pointing to the predecessor and successor vertices identified at step 1100. The real world location coordinates for the new vertex are calculated (1150) and stored in the point database entry for the new vertex.

As described above, a generic three-dimensional wire frame can be edited and modified to correspond to a different desired configuration. Thus, by using generic wire frames, much of the effort associated with creating a custom wire frame is obviated in favor of simple drag and drop editing.

Figure 74:
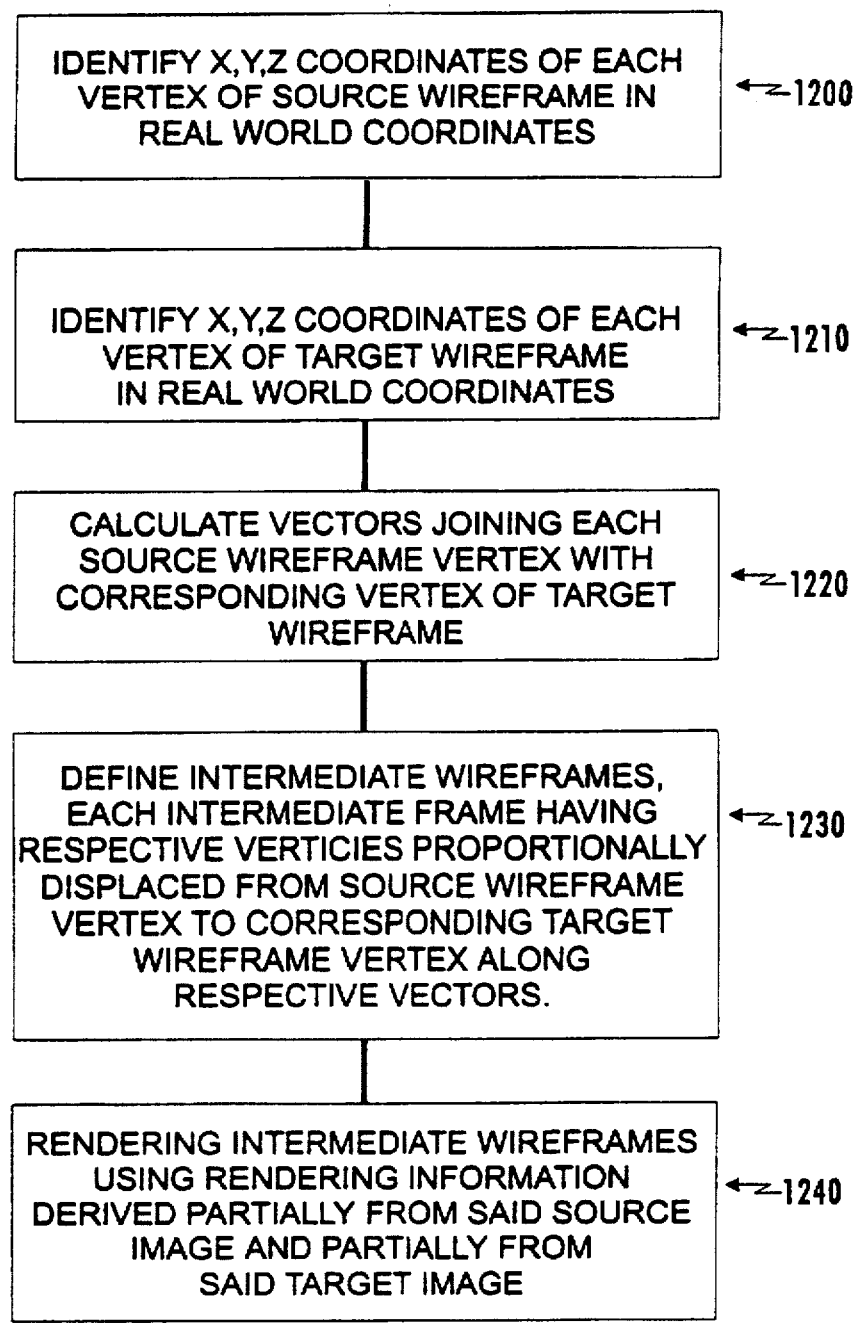
FIG. 74 is a flow chart of the process of stereo morphing one rendered wire frame stereo image into another rendered wire frame stereo image.

It is often desirable to change the shape of one image into that of another image in a relatively continuous manner. This process is called morphing. In accordance with the invention, it is possible to morph one three-dimensional wire frame into a different three-dimensional wire frame. This process is reflected in FIG. 74. The XYZ coordinates of each vertex of a source wire frame are identified in real world coordinates (1200). Similarly, the XYZ coordinates of each vertex of a target wire frame are identified in real world coordinates (1210). Points on the source wire frame are paired with points on the target wire frame and vectors are calculated between the source point and the target point (1220). The transition from a source wire frame to a target wire frame occurs by defining one or more intermediate wire frames, each intermediate wire frame having respective vertices proportioning displaced from the source wire frame vertex to corresponding target wire frame vertices along respective vectors (1230). Thus, by progressing through the intermediate wire frames, a source wire frame is gradually modified into the target wire frame. Thus, the shape of source wire frame is gradually morphed into the shape of the target wire frame.

To enable three-dimensional stereo morphing to appear realistically, each of the wire frames is appropriately rendered. The source wire frame is rendered with a particular "skin" to make it look realistic. Similarly, the target wire frame is rendered with its realistic skin which may be quite different from that of the source wire frame. In addition to changing the shape of the source wire frame into the target wire frame in the process of morphing, it is desirable to change the external or skin appearance gradually from the source appearance to the target appearance. This is done by rendering the intermediate wire frames using rendering information derived partially from the source wire frame and partially from the target wire frame (1240). As the morphing progresses from the rendered source wire frame to the rendered target wire frame through the intermediate frames, progressively more rendering information is taken from the rendered target wire frame so that the surface appearance changes gradually and in a step-wise manner which appears to be continuous when the frames are viewed in rapid succession.

The viewer's viewpoint of a photographic image, when the image is reproduced is essentially that captured by the camera. With a three dimensional wireframe, the viewer's perspective may be located anywhere and the view of the wireframe depicted accordingly.

In prior art (two dimensional) morphing, the viewer (camera) representation, discussed in connection with FIG. 67 above, could not and did not change. However, in accordance with stereo morphing the viewers viewpoint may change during the morphing process. This can be done by changing the apparent camera viewpoint from frame to frame between source and target viewpoints while the source wireframe is changed into the target wireframe. The bit mapped transformation of rendering information applied to surface elements during the morphing process can be adjusted to reflect the ongoing change (e.g. frame by frame) in camera (viewer) viewpoint.

In this way, stereo morphing can be achieved with the additional benefit that camera (viewer) perspective can be changed during the morphing process.

As discussed in conjunction with FIGS. 49–62, an accurate survey of a crime scene or an accurate "as built" construction of a building or an article of manufacture or a depth profile of a person or object can be obtained from two images captured from different perspectives of the scene. The process discussed there utilizes a calibration target of known dimensions which is utilized to establish a coordinate system, in three dimensions, with respect to which all points of interest in an image can be located. As shown in FIG. 49, as distances AB into AC are known, an entire set of camera parameters may be determined, namely camera location, azimuth, rotation and tilt. Once precise camera location and orientation is known, vis-a-vis the coordinate system established by the target, any other point in the scene can be accurately determined from the two images. As shown in FIG. 49, it is clear that the backside of the house can not be viewed from the two camera locations indicated. To obtain a full 360° wireframe, it is desirable to take additional pictures from additional perspectives so that the entire 360° object of interest may be determined completely. Similarly, top and bottom views would be desirable in some instances. As one walks around the building illustrated in FIG. 49, to take pictures, it is likely that calibration target ABC would not be visible from certain views. Thus, it is necessary to identify a different calibration target. This is very easy to do since the X, Y, Z coordinates of all visible points can be identified in the coordinate system defined by ABC and thus, three points identified with respect to coordinate system ABC can become the points for establishing a new coordinate system. Then points already identified using calibration target ABC can be transformed, using standard coordinate transformation mathematics which are well-known in the art to a different location, say to the bottom two corners and the upper left corner of the right side of the building as viewed in FIG. 49. Once the new coordinate system is established, then additional pictures can be taken and points identified from the backside of the building as viewed from the back and to the right of the building shown. Thus by taking photographs around the building, and by using coordinate transformations, an entire wireframe of the building can be created, which gives accurate measurement locations for all points on all parts of the object under consideration.

A number of techniques are available for determining calibration targets when creating wireframes of objects from the frames of a motion picture (movie). If the set, from which the movie was shot, is still in existence, one could measure, after the fact, the distances between certain identifiable points and they could serve as a calibration target. If models were created as part of the shooting sequence, either the design specifications or measurements from existing models could be utilized to create a calibration target.

Figures 75A, 75B:
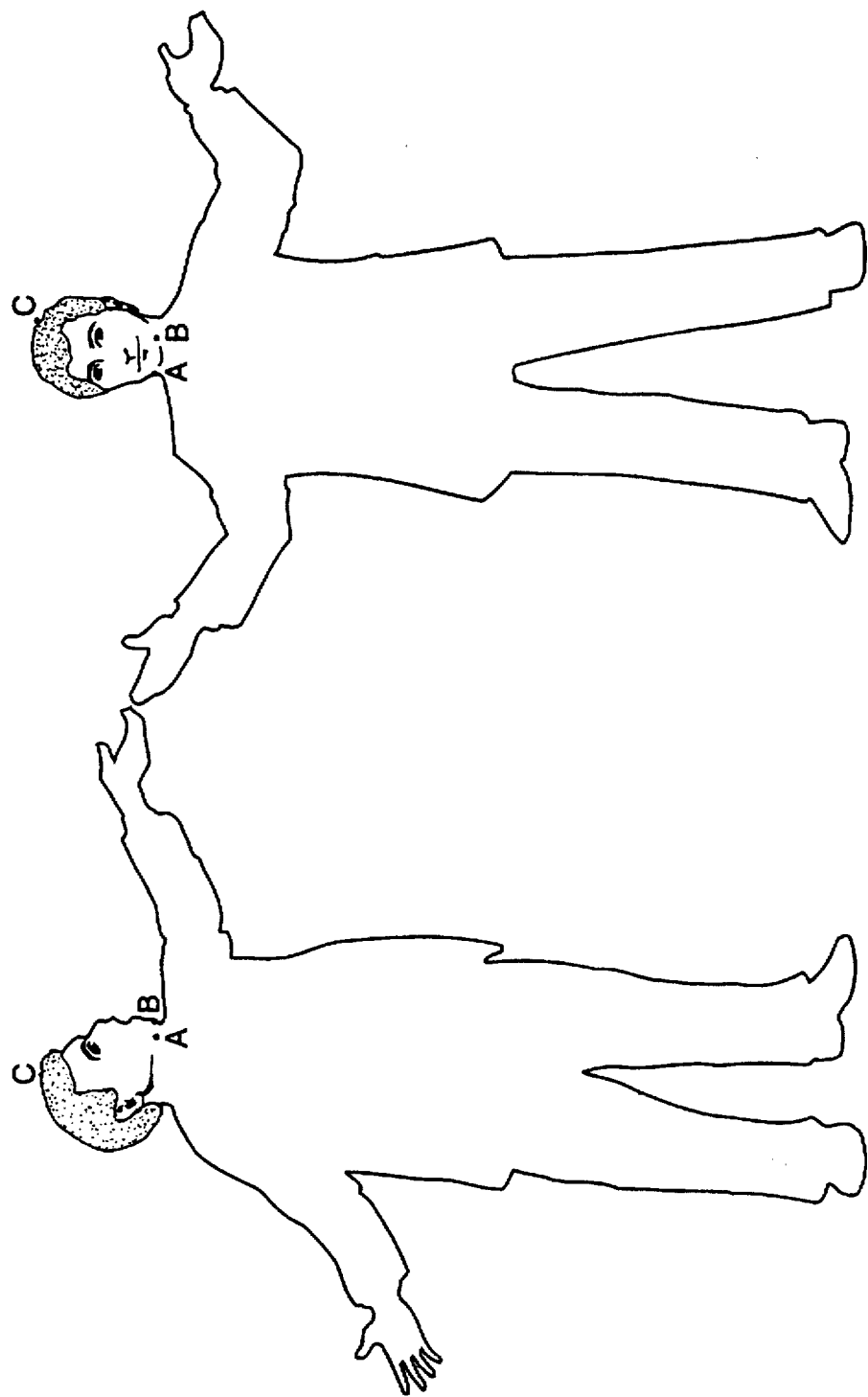
FIGS. 75A and 75B represent two different views of an object (character) taken from different frames of a movie.

FIGS. 75A and 75B show two different views of the same character taken from different frames of a 2 dimensional movie. These views may be located minutes or even hours apart in the movie. What is important, is that there are two views from different perspectives which will enable depth information to be calculated accurately for the creation of a wireframe to represent the object, in this case the character. In FIG. 75B, points A, B and C on a face serve as the basis for defining a coordinate system. The same points can be viewed in FIG. 75A, from a different perspective. If the helmet worn by an actor were the basis for a coordinate system an, if the helmet were still available, the distances between points A, B and C could be measured and used as a calibration target. Once a wireframe is created for the character, which accurately reflected the special relationships, then any image in which the actor was visible, could have a well-defined coordinate system based on points determined for the wireframe of the costume.

Figure 76:
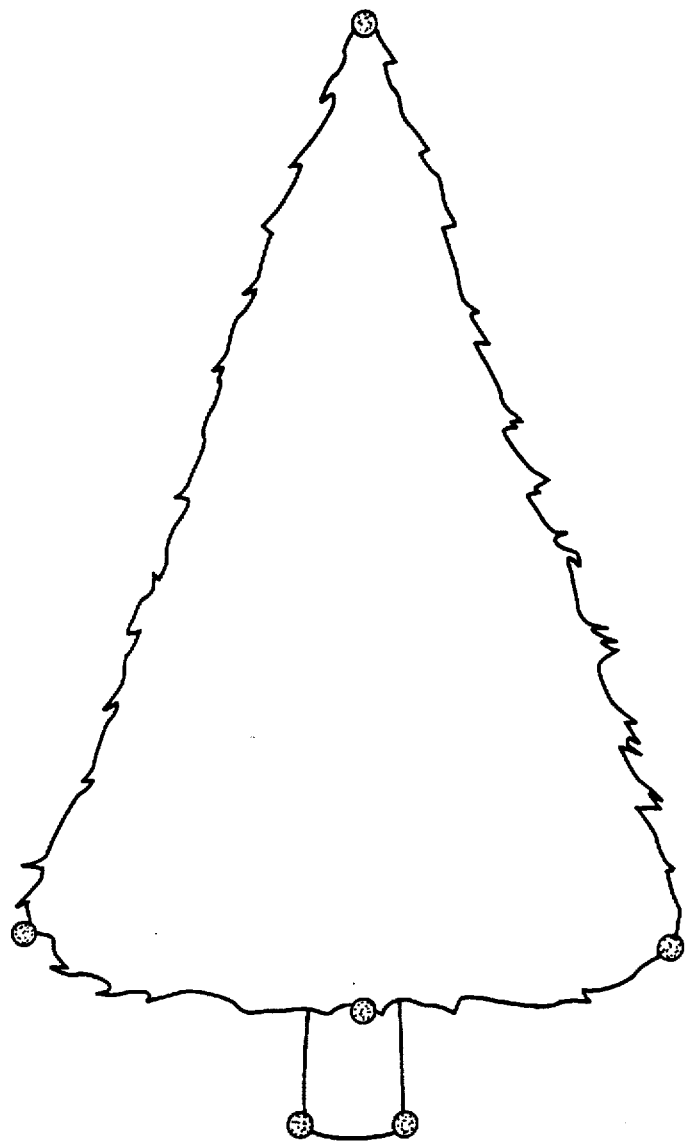
FIG. 76 shows an object for which only one view is available.

There may be certain circumstances in which two views are not available or where no measurement information may be available to establish a calibration target. There may be, nevertheless, the need to represent depth of an object in the scene. One alternative is shown in FIG. 76. The generic wireframe technique described in conjunction with FIG. 63-74 may be usefully applied. FIG. 76 represents a tree which exists in only one sequence of frames shot from a single location and orientation. Thus, actual depth information can not be directly calculated. However, one may still obtain a 3-dimensional stereo effect by taking a generic wireframe of a tree, superimposing it over the bit map of the tree found on the image, and by modifying the shape of the wireframe to coincide with that of the tree and the image utilizing the techniques discussed. In this manner, depth information can be artificially imposed upon an object in the scene from which no depth information can otherwise be obtained.

In another alternative, the relative X and Y positions are known from the image from the 2-dimensional frame. An estimate can be made of the depth value and the object wireframe generated based on that assumption. If the XYZ relationships are not reasonably accurate, wireframes tend to tilt or otherwise become distorted in ways which indicate that an error has occurred, some trial and error may be permissible in attempting to find a representation which looks good in the image. Estimation is used, of course, only when measurement data is not available.

A third technique that is often useful in establishing a calibration target involves the use of symmetry. Information about the front side of an object (e.g. distance from outerline of symmetry to a wheel on a car) may be reflected to an appropriate distance in back of the object under an assumption of symmetry. This also speeds up a generation of a full wireframe when only a few images are available.

Once the frame of reference is established, complete depth of profiles of all points in the images can be calculated with good accuracy.

Figure 77:
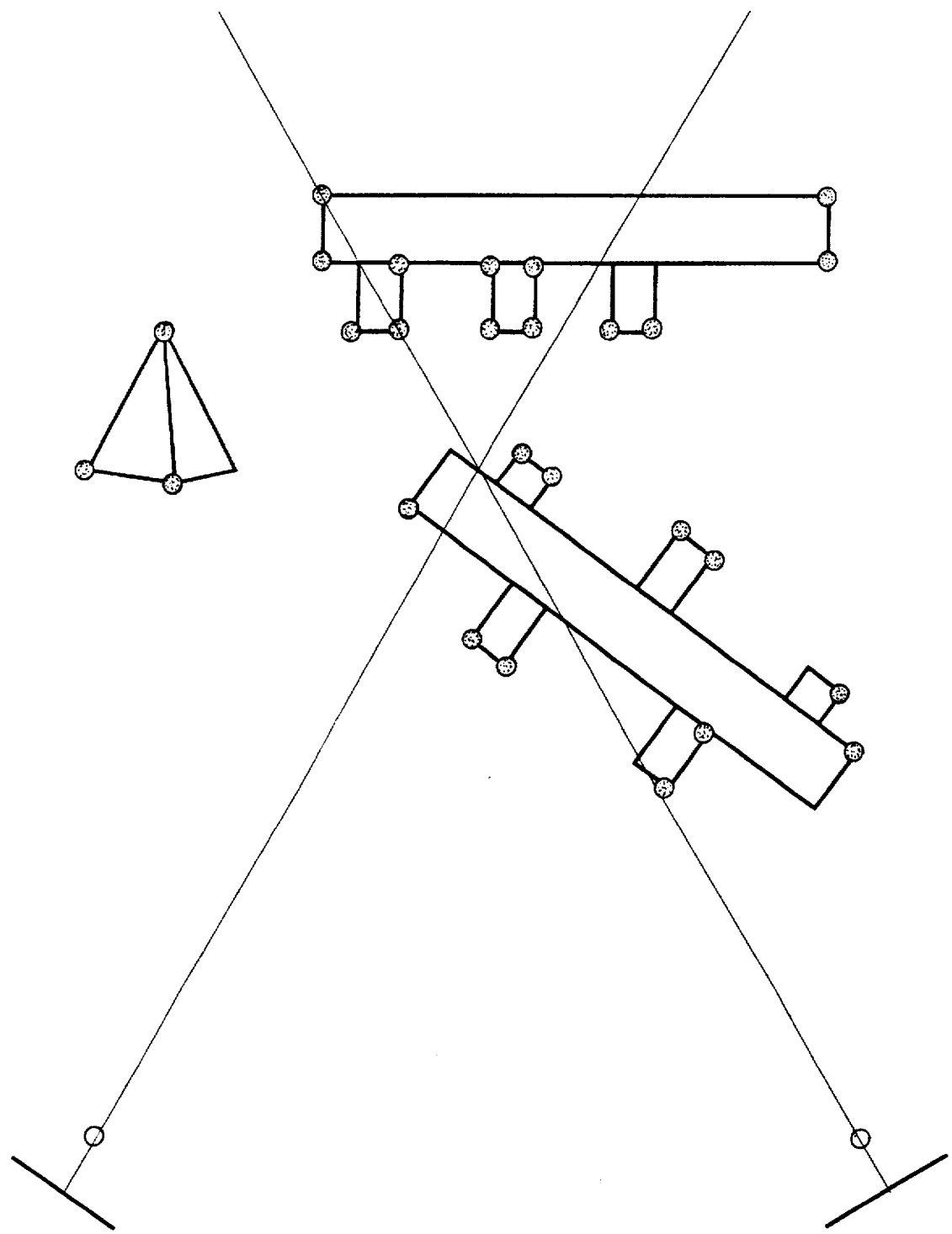
FIG. 77 shows a situation in which a 27 point solution to camera parameters may be required.

FIG. 77 depicts another method of solving for depth information needed to construct a wireframe in the event that no calibration target can be identified. For each of the cameras shown in FIG. 77, there are seven unknowns. Those unknowns include things like X, Y and Z location, rotation, azimuth and the like. There are thus fourteen unknowns for the two camera positions. As the number of points involved increases, more information is obtained about the camera on locations. It can be demonstrated that with 27 points, one can achieve 27 equations and 27 unknowns where those unknowns include, inter alia, the camera parameters. Mathematically, it can be demonstrated that 27 independent equations and 27 unknowns is sufficient to solve the entire system of equations and to obtain values for each of the unknowns.

Because of the calculation effort, it is often easier to try to utilize some of the other techniques for identifying a calibration target.

Figure 78:
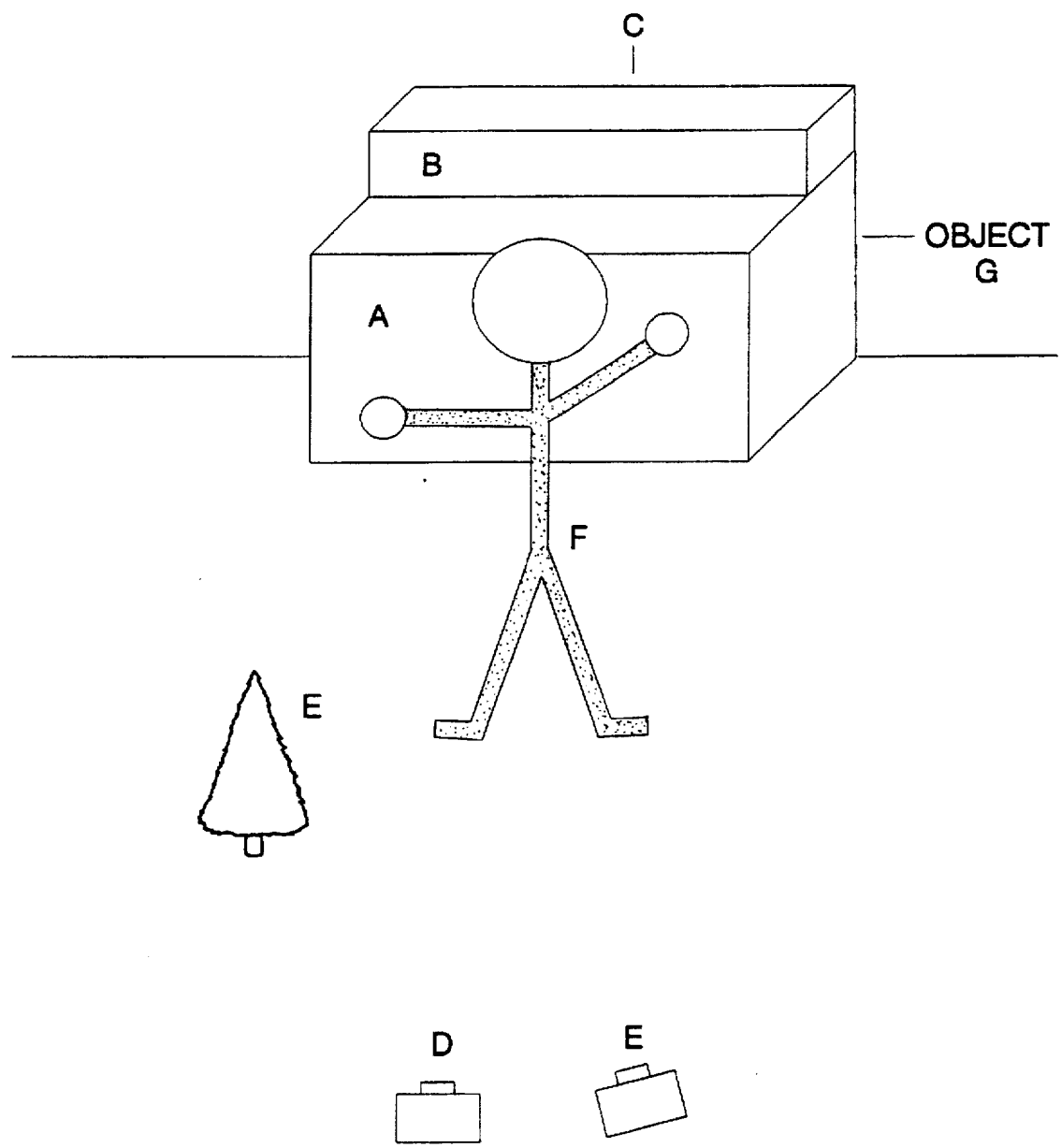
FIG. 78 shows a situation in which assignment or definition of depth planes might be employed to give depth information, such as object G.

There is another method of obtaining depth information when accuracy is not particularly required. FIG. 78 illustrates a scene in which this might be the case. Assume, a camera located at point D views tree E, person F and object G. Because of the way the scene is composed, if object G were not represented with depth information, the fact that there is a wireframe of person F and of tree E would be almost insignificant because the visual cues associated with object G say it should have depth also. The failure to provide depth to object G will lead to a totally artificial scene which will provoke ridicule with respect to the inadequacy of the representation. If, however, object G occurs in only onebscene, or only briefly, and there is not a second view from which depth information might be obtained, then another technique might be appropriate. The technique essentially involves assigning certain points or surfaces on the object to rely upon a mathematical plane defined with respect to the coordinate system. For example, a plane might be mathematically defined and surface A of object G arbitrarily defined to reside on that plane. Likewise, surfaces B and C would each lie on different planes. So although its exact measurements are unimportant, the depth values assigned to the surfaces can be relatively arbitrary as long as some sense of relative proportion is maintained. Using the plane definitions, X, Y and Z values for various points on the object G, are defined by the point at which a ray from camera location D intersects the point Y on the plane assigned to the mathematically defined surface. In this manner, depth information can be obtained for every point of interest and a wireframe can be constructed which can be utilized to represent a true stereo view of an object about which one knows very little in terms of his depth profile.

Continuing with FIG. 78, when the principal objects of a scene have been created in wireframe form, the wireframe is transformed in shape, size and orientation to correspond with the bit maps from the images utilized to create the wireframe so that 3-dimensional wireframe information can replace the 2-dimensional bit maps on the images being converted to stereo representations. A 2-dimensional bit map can be viewed as a 3-dimensional bit map with all depth values equal to zero. Once all wireframes are positioned appropriately and have more or less replaced the 2-dimensional information that was previously there, the wireframes are rendered with photorealistic surfaces. This can be done preferably utilizing the techniques disclosed in conjunction with FIGS. 28-37. In one approach, bit maps from at least the images used to create the wireframes are used to render the wireframes. Once the wireframes are rendered with photorealistic surfaces, it is then possible to obtain two different views of the wireframe images which together will constitute a stereo pair for viewing. The full and commercially available implementation of software for photorealistically rendering 3-dimensional wireframes is Quick-Look Rendering™ from Synthonics™, Incorporated of Westlake Village, Calif. Alternatively, the wireframe image can be imported into 3-D Studio, a product of AutoDesk™ Inc. of Sausalito, Calif. and rendering can occur in accordance with traditional technology.

Once the 3-dimensional wireframe image is imported into 3-D Studio, the capabilities of 3-D Studio for placing cameras at whatever locations desired and for placing lights may be utilized to create a stereo view. Using the camera parameters determined for the camera which originally took a 2-dimensional frame, one can position the 3-D Studio camera at that same location to get exactly the same view as the camera got when it took the 2-dimensional frame. To get a 3-dimensional stereo view, a second camera can be positioned near the first camera, and the separation controlled to produce a desired amount of disparity. Control of disparity is discussed in conjunction with FIGS. 37–48, above. This is represented in FIG. 78 by camera E.

Figure 79:
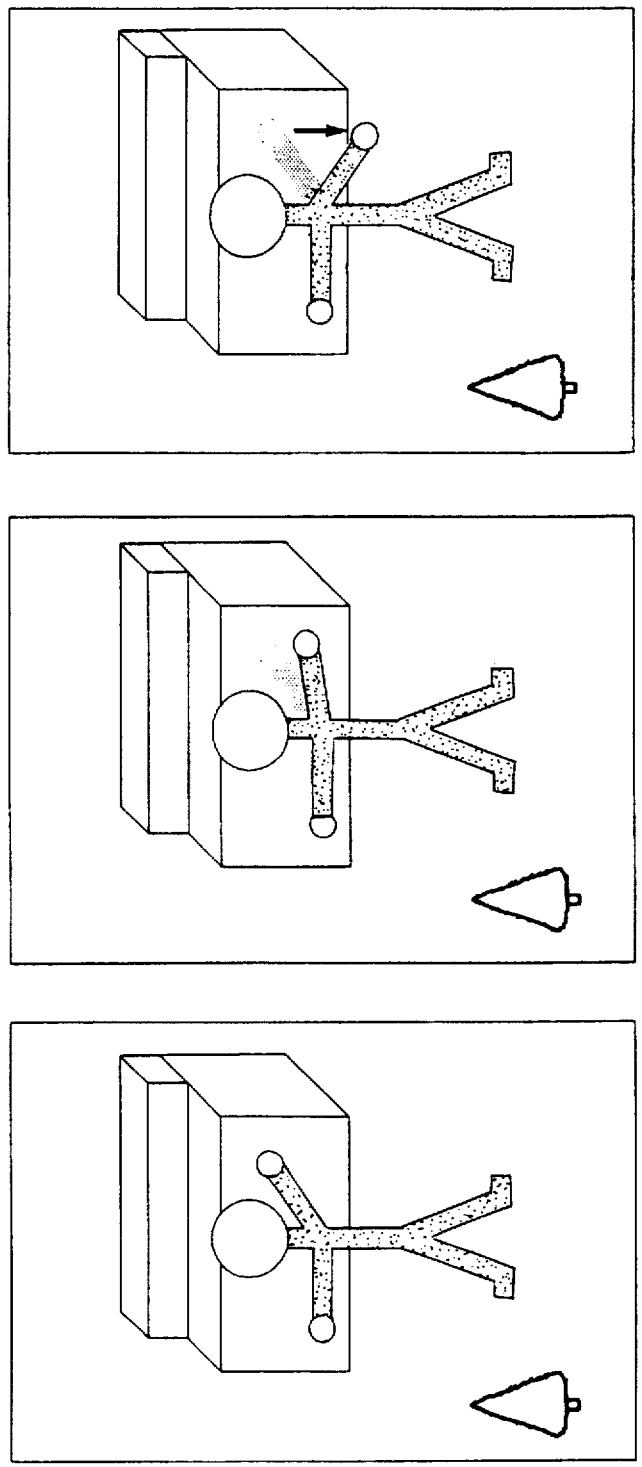
FIG. 79 illustrates a key frame sequence.

The frames of a movie tend to be grouped in sequences, called key frame sequences, in which subsequent frames differ but little from a first frame of the key frame. Typically, a key frame sequence might run for ten seconds. FIG. 79 shows such a key frame sequence. The first frame of the key frame sequence, the key frame itself, requires the most work. A 3-dimensional wireframe representation of the key frame is created as outlined above. As shown in FIG. 79, at the key frame, the individual's hand is raised above his head. Through successive frames, the hand is lowered until at frame KF plus M, the arm is below the waist. In fact, for purposes of illustration, it is assumed that the only motion is the lowering of the left hand. Since the frame-to-frame motion is so small, it is reasonable to expect that a very quick search algorithm could locate where the left hand went from one frame to the next. In fact, this is done utilizing simple correlation techniques described in conjunction with FIGS. 1–10, above. If a particular wireframe vertex were located directly at the junction of the arm and the hand as shown in the stick figure in FIG. 79, that point would be relatively easy to locate in frame KF plus 1 by searching beginning with the previous location. A group of pixels adjacent to the known location and the key frame is identified and a correlation search begun at the point where that vertex was last located in order to find the current location of the corresponding set of pixels in the image. When that corresponding set of pixels is identified, the amount of direction and motion can be determined because the start and finish positions are known. Therefore, the amount needed to move the wireframe vertex located near the junction of the arm and the wrist can be precisely identified because the vertex bears the same relationship to the pixels in the key frame as it does in the key frame plus 1 frame.

Figure 80:
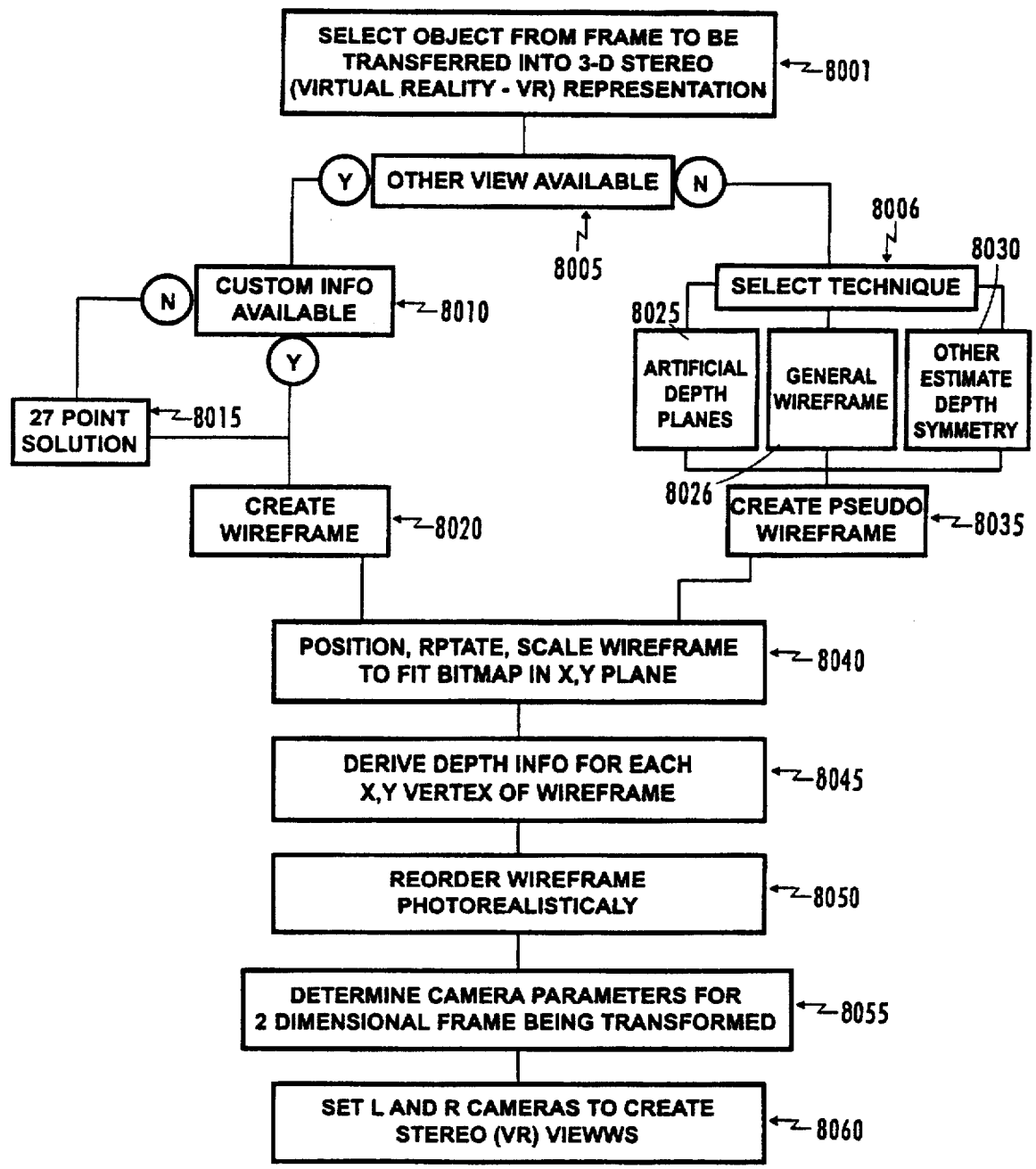
FIG. 80 is a flow chart of a key frame stereo set up process.

FIG. 80 illustrates the key frame set up process in flow chart form. At 8001, an object is selected to be rendered in 3-D stereo from the image frame. Another view of the object is located, if possible. If it is located (8005Y), one checks to determine if calibration information is available (8010). If it is not, a 27 point solution is affected (8015) but if it is, the information is utilized to create a 3-D wireframe at 8020. If there is no other view available, the technique utilizing artificial depth planes is employed (8025) or, alternatively, selected points are estimated or alternatively symmetry is utilized to generated a pseudo wireframe (8035). The 3-D wireframe or pseudo wireframe is positioned, rotated and scaled to fit the bit map which exists in a 2-dimensional XY plane of the image (8040). From the wireframe, depth information for each XY vertex of the wireframe of key frame as is calculated (8045). Once the wireframe is complete, photo realistic rendering of the wireframe occurs (8050). The camera parameters for the camera which originally took the 2-D image being converted to 3-D are determined (8055) and a camera is placed, relative to the wireframe at that location. A second camera is placed adjacent to capture the second stereo view (8060). In this way, using automated techniques, associated with identifying key frames, converting the key frames 3-dimensional wireframe representations, and modifying those wire frames representations on a frame-to-frame basis during the key frame sequence so that for the work of converting one key frame, many frames in a key frame sequence can be automatically generated in 3-dimensional stereo form.

Once the left and the right images are determined, using the wireframe representations, they may be applied directly to left and right eye displays of a virtual reality headset or may be combined to create an anaglyph type stereo representation or to utilize one of the other transmission techniques described in conjunction with FIGS. 11–24 above.

In this disclosure, there is shown and described only the preferred embodiment for converting a 2-dimensional motion picture to a 3-dimensional stereo virtual reality presentation in accordance with the invention, but, as aforementioned, it is to be understood that the invention is capable of use in various other combinations and environments and is capable of changes or modifications within the scope of the inventive concept as expressed herein.

What is claimed is:

1. A method for converting at least one two dimensional first image comprising part of a motion picture into a three dimensional stereo representation of the first image, comprising:
    a. for at least one object within said first image, identifying a view of said object from a second image of said motion picture;
    b. using the first image and the second image to construct a three dimensional wireframe representation of said object;
    c. transforming said wireframe representation to approximately match the size and orientation of said object in said first image;
    d. replacing said object of said first image with a transformed wireframe representation of said object to produce a composite image; and
    e. capturing two views of said composite image to form a three dimensional stereo representation of the first image.

2. The method of claim 1 additionally comprising:
    rendering said two views of the wireframe portion of the composite image with surfaces texture taken from bit maps.

3. The method of claim 2 in which the bit maps are from said first image.

4. The method of claim 2 in which the bit maps are from both said first image and said second image.

5. The method of claim 2 in which the bit maps are photorealistic.

6. The method of claim 1 in which a plurality of images of a motion picture constituting a key frame sequence are converted to three dimensional stereo representations of the images of the key frame sequence, said first image is the key frame of the key frame sequence and images subsequent to said first image are created by modifying the composite image of a previous frame in the key frame sequence by changing camera position from which the views of the composite image are captured and by morphing the three dimensional wireframe representation of said object from said previous frame.

7. The method of claim 6 in which modifying the composite image of a previous frame comprises:
    identifying a plurality of pixels in the neighborhood of at least one wireframe vertex of the composite image of said previous frame;
    finding corresponding pixels in the bit map of an image subsequent to said first image; and
    moving said at least one wireframe vertex of said composite image to a corresponding location in relationship to said corresponding pixels in said image subsequent to said first image as said vertex had with respect the said pixels in the neighborhood of the at least one wireframe vertex of said composite image to form a modified composite image which represents a composite image of said image subsequent to said first image.

8. The method of claim 7 in which the step of finding corresponding pixels in the bit map of an image subsequent to said first image comprises using correlation detection to find pixels in said image subsequent to said first image which correspond to said plurality of pixels.

9. The method of claim 6 in which the step of changing camera position from which the views of the composite image are captured comprises:

for each image in a key frame sequence, finding a first location and orientation of the camera used to capture an image of said key frame sequence, placing a first camera at a camera location relative to said composite image which corresponds to said first location; and placing a second camera at a location displaced from said camera location.

10. The method of claim 9 in which the location and orientation of a camera used to capture each image is determined for all images of a motion picture automatically.

11. The method of claim 9 in which the separation of said first and second cameras is determined by the amount an object is desired to be in front of or in back of a neutral plane.

12. The method of claim 1 in which the step of using the first image and the second image to construct a three dimensional wireframe representation of said object utilizes the software package 3D Maker from Synthonics.

13. The method of claim 1 in which at least one of the steps of transforming said wireframe representation to approximately match the size and orientation of said object in said first image;

replacing said object of said first image with a transformed wireframe representation of said object to produce a composite image; and capturing two views of said composite image to form a three dimensional stereo representation of the first image are accomplished using 3D Studio.

14. The method of claim 12 in which the step of changing camera position from which the views of the composite image are captured is accomplished using 3D Animator in 3D Studio.

15. The method of claim 2 in which the step of rendering said two views of the wireframe portion of the composite image with surfaces texture taken from bit maps is accomplished using Quick-Look Rendering.

16. The method of claim 1 in the which two views of said composite image used to form a three dimensional stereo representation of the first image are displayed using separate display media, one for each eye of a viewer.

17. The method of claim 1 in which two views of said composite image used to form a three dimensional stereo representation of the first image are combined so that when the combined views are displayed, at least portions of said two views may be directed to separate eyes of the viewer.

18. The method of claim 1 in which the step of using the first image and the second image to construct a three dimensional wireframe representation of said object comprises using symmetry of said object for inferring portions of said wireframe which cannot be directly determined from said first and second images.

* * * * *